United States Patent
Preston et al.

(10) Patent No.: US 11,781,097 B2
(45) Date of Patent: Oct. 10, 2023

(54) PREPARATIONS INCLUDING EXTRACTS OF NATURAL PRODUCTS SUCH AS WOOD AND USE THEREOF AS FLAVORINGS FOR FOOD AND ALCOHOLIC AND NON-ALCOHOLIC BEVERAGES

(71) Applicants: David R. Preston, San Diego, CA (US); Charles E. Nation, Jr., San Diego, CA (US)

(72) Inventors: David R. Preston, San Diego, CA (US); Charles E. Nation, Jr., San Diego, CA (US)

(73) Assignee: Liquid Wood, LLC, San Diego, CA (US)

( * ) Notice: Subject to any disclaimer, the term of this patent is extended or adjusted under 35 U.S.C. 154(b) by 314 days.

(21) Appl. No.: 16/907,232

(22) Filed: Jun. 20, 2020

(65) Prior Publication Data

US 2021/0017477 A1    Jan. 21, 2021

Related U.S. Application Data

(60) Provisional application No. 62/961,842, filed on Jan. 16, 2020, provisional application No. 62/942,083, (Continued)

(51) Int. Cl.
    *C12C 12/00* (2006.01)
(52) U.S. Cl.
    CPC .................... *C12C 12/00* (2013.01)
(58) Field of Classification Search
    CPC ........... C12C 5/026; C12C 12/00; C12G 3/07; C12G 3/06; C12G 2200/21; A23L 2/56; A23L 33/105
    (Continued)

(56) References Cited

U.S. PATENT DOCUMENTS

| 675,173 A | * | 5/1901 | Spink | ...................... | A23F 5/223 |
| | | | | | 426/422 |
| 1,523,578 A | | 5/1921 | Bredlik | | |

(Continued)

FOREIGN PATENT DOCUMENTS

WO    WO 2021/011210 A1    1/2021

OTHER PUBLICATIONS

"The Madcap Chemists of Booze," Smithsonian Magazine, Apr. 2019. From Smithsonianmag.com, obtained Jul. 6, 2019.

(Continued)

*Primary Examiner* — Vera Stulii
(74) *Attorney, Agent, or Firm* — David R. Preston

(57) ABSTRACT

The present invention recognizes that there is a long felt need for the ability to produce extracts of natural products, such as but not limited to wood, in order to provide flavoring to foods and beverages, including but not limited to non-alcoholic and alcoholic beverages. A first aspect of the present invention generally relates to a method of making a flavored extract of at least one natural product such as wood. A second aspect of the present invention generally relates to a product produced ty the method of the first aspect. A third aspect of the present invention generally relates to a method of making a food or beverage including a product of the first aspect. A fourth aspect of the present invention generally relates to a food or beverage produced by a method of the third aspect. A fifth aspect of the present invention generally relates to aspects of the present invention particularly adapted for beer.

66 Claims, 15 Drawing Sheets

Related U.S. Application Data filed on Nov. 30, 2019, provisional application No. 62/884,713, filed on Aug. 9, 2019, provisional application No. 62/875,551, filed on Jul. 18, 2019.

(58) Field of Classification Search
USPC .................................................. 426/16, 592
See application file for complete search history.

(56) References Cited

U.S. PATENT DOCUMENTS

| | | | |
|---|---|---|---|
| 2,037,001 A | 4/1936 | Aronovsky | |
| 2,092,866 A * | 9/1937 | Wisniewski | C12G 3/07 502/437 |
| 2,119,234 A * | 5/1938 | Krebs | C12G 3/07 435/197 |
| 2,132,435 A * | 10/1938 | Reiman | C12G 3/07 426/422 |
| 2,185,206 A * | 1/1940 | Little | B27M 1/06 217/88 |
| 2,347,783 A * | 5/1944 | Krebs | C12G 3/07 426/11 |
| 2,807,547 A * | 9/1957 | Nickol | C12G 3/07 99/277.2 |
| 3,787,587 A | 1/1974 | Weber | |
| 4,350,708 A * | 9/1982 | Ruiz de Palacios | A23L 27/11 426/429 |
| 4,463,024 A | 7/1984 | Nishizawa | |
| 4,576,826 A * | 3/1986 | Liu | A23L 27/72 426/651 |
| 4,956,194 A * | 9/1990 | Gos | C12G 3/07 426/489 |
| 5,102,675 A * | 4/1992 | Howell | C12G 3/07 217/88 |
| 5,238,680 A | 8/1993 | Connolly | |
| 5,356,641 A | 10/1994 | Bowen | |
| 5,424,417 A | 6/1995 | Torget | |
| 5,730,837 A | 3/1998 | Black | |
| 6,203,836 B1 | 3/2001 | Gross | |
| 6,703,060 B1 * | 3/2004 | Gross, II | C12G 3/06 426/422 |
| 6,846,503 B2 * | 1/2005 | Vickers, Jr. | C12G 3/06 426/330.4 |
| 6,966,250 B2 | 11/2005 | Eustis | |
| 7,357,069 B1 * | 4/2008 | Karasch | C12H 1/22 99/277.1 |
| 8,317,975 B2 | 11/2012 | Amidon | |
| 8,618,280 B2 | 12/2013 | Howard | |
| 8,889,206 B2 * | 11/2014 | Lix | C12H 1/22 426/11 |
| 8,940,133 B2 | 1/2015 | Amidon | |
| 9,212,343 B1 * | 12/2015 | Karasch | C12H 1/12 |
| 9,434,790 B2 | 9/2016 | Wiesbeck | |
| 9,624,449 B2 | 4/2017 | Howard | |
| 9,637,712 B2 | 5/2017 | Davis | |
| 9,637,713 B2 | 5/2017 | Davis | |
| 9,840,687 B2 | 12/2017 | May | |
| 9,885,010 B2 * | 2/2018 | Karasch | C12H 1/22 |
| 10,041,027 B2 * | 8/2018 | Evans | C12H 1/22 |
| 10,260,032 B1 * | 4/2019 | Karasch | B27H 5/08 |
| 10,590,370 B2 * | 3/2020 | Karasch | C12H 1/22 |
| 11,104,490 B2 * | 8/2021 | Azar | C12G 3/07 |
| 2003/0008036 A1 | 1/2003 | Huige | |
| 2009/0176286 A1 | 7/2009 | O'Connor | |
| 2011/0070331 A1 | 3/2011 | Watson | |
| 2011/0073264 A1 | 3/2011 | Liu | |
| 2014/0162324 A1 | 6/2014 | Howard | |
| 2015/0167234 A1 | 6/2015 | Von Schoultz | |
| 2016/0355771 A1 | 12/2016 | Davis | |
| 2018/0245030 A1 | 8/2018 | Mancosky | |
| 2018/0305649 A1 | 10/2018 | Hall et al. | |
| 2018/0320118 A1 | 11/2018 | Mancosky | |

OTHER PUBLICATIONS

"Lost Spirits," Wikipedia. From en.wikipedia.org, obtained Jul. 6, 2019.
"Lost Spirits—Timeline" From lostspirits.net, obtained Jul. 6, 2019.
"What you need to know about adding oak to beer" From fermentarium.com, obtained Aug. 3, 2019.
"Bear Flavored—Wood Ageing Experiment: Cherry, Hard Maple, Red Oak, White Ash—Recipe & Brew Day" Sep. 12, 2013. From bear-flavored.com, obtained Aug. 3, 2019.
"Wood-Aged Beer Recipes" From beerrecipes.org, obtained Aug. 3, 2019.
"Oak Essence for Beer and Wine—Barrel Aged Flavoring—4 oz" From homebrewing.org, obtained Aug. 3, 2019.
"Adding Wood Flaor To Your Homebrew" From brewminds.com, obtained Aug. 3, 2019.
"How to Add Wood Flavor To Your Beer Without Barrels" From beerandbrewing.com, obtained Aug. 3, 2019.
"Using Vodka to Extract Flavors and Aroma of Spices and as an Alternative to Dry Hopping" From barleypopmaker.info, obtained Aug. 3, 2019.
"Beer on Sterioids: How to Fortify Beer" From fermentarium.com, obtained Aug. 3, 2019.
"Need a Quick Drink? Might Be Time to Try Rapid—Aged Whiskeys" Wall Street Journal, Dec. 14, 2019.
"Stoak Technologies, The Science of Wood" From stoaktechnologies.com, obtained Aug. 4, 2020.

* cited by examiner

|   | 1 | 2 | 3 | 4 | 5 | 6 | 7 | 8 | 9 | 10 | 11 | 12 |
|---|---|---|---|---|---|---|---|---|---|---|---|---|
| A | 1 | 9 | 17 | 1<br>1:1<br>$dH_2O$ | 9<br>1:1<br>$dH_2O$ | 17<br>1:1<br>$dH_2O$ | 1<br>1:1<br>GFB | 9<br>1:1<br>GFB | 17<br>1:1<br>GFB | 17<br>1:4<br>$dH_2O$ | 17<br>1:4<br>GFB | $dH_2O$ |
| B | 2 | 10 | 18 | 2<br>1:1<br>$dH_2O$ | 10<br>1:1<br>$dH_2O$ | 18<br>1:1<br>$dH_2O$ | 2<br>1:1<br>GFB | 10<br>1:1<br>GFB | 18<br>1:1<br>GFB | 18<br>1:4<br>$dH_2O$ | 18<br>1:4<br>GFB | EtOH |
| C | 3 | 11 | 19 | 3<br>1:1<br>$dH_2O$ | 11<br>1:1<br>$dH_2O$ | 19<br>1:1<br>$dH_2O$ | 3<br>1:1<br>GFB | 11<br>1:1<br>GFB | 19<br>1:1<br>GFB | 19<br>1:4<br>$dH_2O$ | 19<br>1:4<br>GFB | GFB |
| D | 4 | 12 | 20 | 4<br>1:1<br>$dH_2O$ | 12<br>1:1<br>$dH_2O$ | 20<br>1:1<br>$dH_2O$ | 4<br>1:1<br>GFB | 12<br>1:1<br>GFB | 20<br>1:1<br>GFB | 20<br>1:4<br>$dH_2O$ | 20<br>1:4<br>GFB | $dH_2O$ |
| E | 5 | 13 | 21 | 5<br>1:1<br>$dH_2O$ | 13<br>1:1<br>$dH_2O$ | 21<br>1:1<br>$dH_2O$ | 5<br>1:1<br>GFB | 13<br>1:1<br>GFB | 21<br>1:1<br>GFB | 21<br>1:4<br>$dH_2O$ | 21<br>1:4<br>GFB | EtOH |
| F | 6 | 14 | 22 | 6<br>1:1<br>$dH_2O$ | 14<br>1:1<br>$dH_2O$ | 22<br>1:1<br>$dH_2O$ | 6<br>1:1<br>GFB | 14<br>1:1<br>GFB | 22<br>1:1<br>GFB | 22<br>1:4<br>$dH_2O$ | 22<br>1:4<br>GFB | GFB |
| G | 7 | 15 | 23 | 7<br>1:1<br>$dH_2O$ | 15<br>1:1<br>$dH_2O$ | 23<br>1:1<br>$dH_2O$ | 7<br>1:1<br>GFB | 15<br>1:1<br>GFB | 23<br>1:1<br>GFB | 23<br>1:4<br>$dH_2O$ | 23<br>1:4<br>GFB | $dH_2O$ |
| H | 8 | 16 | 24 | 8<br>1:1<br>$dH_2O$ | 16<br>1:1<br>$dH_2O$ | 24<br>1:1<br>$dH_2O$ | 8<br>1:1<br>GFB | 16<br>1:1<br>GFB | 24<br>1:1<br>GFB | 24<br>1:4<br>$dH_2O$ | 24<br>1:4<br>GFB | GFB |

FIG. 7

PREPARATIONS INCLUDING EXTRACTS OF NATURAL PRODUCTS SUCH AS WOOD AND USE THEREOF AS FLAVORINGS FOR FOOD AND ALCOHOLIC AND NON-ALCOHOLIC BEVERAGES

PRIORITY STATEMENT

The present application claims benefit of priority to:
U.S. Provisional Application Ser. No. 62/875,551, filed Jul. 18, 2019;
U.S. Provisional Application Ser. No. 62/884,713, filed Aug. 9, 2019;
U.S. Provisional Application Ser. No. 62/942,083, filed Nov. 30, 2019; and
U.S. Provisional Application Ser. No. 62/961,842, filed Jan. 16, 2020;
each of which is incorporated by reference herein.

TECHNICAL FIELD

The present invention relates generally to the field of extraction of natural products, notably but limited to being from wood, which can be used as flavorings for consumable products, including but not limited to food, drink, alcoholic beverages, non-alcoholic beverages, and the like.

BACKGROUND

Extracts of natural products have been used to enhance our diet, at least as far as tea as a flavoring for water, or forest herbs for food, to make our diet more palatable. The quest to identify and use flavorings, natural and otherwise, has been a driving force for many food and beverage industries, including but not limited to a wide variety of foods, snacks, beverages, non-alcoholic beverages, alcoholic beverages, and the like.

One natural product that has received attention for flavorings of food and drink is wood. Wood has been used as a flavoring in cooking, such as wood fires of hickory and mesquite for cooking meats, fruits, and vegetables. Wooden barrels have been used to store, preserve, age, and add flavorings to foods and beverages, notably spirits, wines, sake, mead, and beer. The wood used in these barrels can be pretreated by processes such a using flame to char the inside of a barrel. These processes aid to age and flavor notable spirits, such as whisky, scotch, tequila, mescal, and Bourbon. These types of extraction of flavors from wood take quite some time, and is used as an aging process. In general, the longer the aging process, the more potent the wood flavor that will be in the bulk solution within the barrel. Unfortunately, using these methods, aging times can take anywhere from months to years. Although barrel aging creates a desirable flavor, many factors such as long durations of time and costs, notably as to space to store barrels for such an extended period of time, and that a percentage of the bulk solution being lost to the environment, the so called "Angel's Share" lost by evaporation over long period of time in wooden barrels. Furthermore, barrels can have issues with leaking, lack of consistency, spoilage, overall loss, and taking up of space as well as equipment and safety issues. Overall, such barrel aging can be too costly for many business owners to reasonably use.

Rather than use wooden barrels, some have used from smaller pieces of wood, such as chips or sawdust. Wood that has been ground or chipped into shapes and sizes of convenience can be used to flavor spirits, wine, and beer. Such wood chips have been used in tank fermenters that are usually made of non-corrosive materials, for wine and beer flavorings. This method is more economically efficient than barrel aging because wood flavors are extracted, while yielding shorter residency times in the aging process.

U.S. Pat. No. 1,523,578 to Bredlick reports the extraction of soluble products from wood using pressure and volatile solvents such as benzol.

U.S. Pat. No. 2,037,001 to Aronovsky reports alcoholic treatment of ligneous cellulosic material using phase separation techniques; that use alcohols that form homogeneous mixtures under hotter conditions for digesting and separate into immiscible layers upon cooling.

U.S. Pat. No. 3,787,587 to Weber reports methods of ageing beer, wine, and spirits by irradiating the liquid with actinic light from about 4,000 Angstroms (A) to about 5,500 A.

U.S. Pat. No. 4,350,708 to Ruiz de Palacios reports natural oak aromas for accelerating ageing of alcoholic beverages, using multiple extractions using alcohol and water.

U.S. Pat. No. 4,463,024 to Nishizawa reports a flavoring materials from wood that use pressure and heat, including super-heated steam and discharge from pressure.

U.S. Pat. No. 5,102,675 to Howell report methods for producing and using oak in divided form for flavoring of wine, using water or ethanol and tasting to provide desired flavorings.

U.S. Pat. No. 5,238,680 to Connolly report tannin extractions from bark using aqueous washes and temperature and other procedures.

U.S. Pat. No. 5,356,641 to Bowen report a process for preparing an oak wood extract and distillate using water, alcohol, enzymatic digestion and other procedures.

U.S. Pat. No. 5,424,417 to Torget report prehydrolysis of lignocellulose using acidic or alkaline solutions under conditions of pH and temperature.

U.S. Pat. No. 5,730,837 to Black report methods of separating lignocellulosic material into lignin, cellulose, and dissolved sugars using temperature in a water and water immiscible solvents.

U.S. Pat. No. 6,966,250 to Eustis reports the ageing of wine or spirits using infusing oxygen into the wine or spirits.

U.S. Pat. No. 8,317,975 to Amidon report the pulping and bleaching of lignocellulosic materials using aqueous extracts.

U.S. Pat. No. 8,618,280 to Howard report biorefinery processes for extraction of fermentable saccharides and other useful compounds using water, heat, pressure, and pH, and other procedures as well.

U.S. Pat. No. 8,940,133 to Amidon report a product and process from an integrated forest biorefinery that pulps and bleaches lignocellosic materials.

U.S. Pat. No. 9,434,790 to Wiesbeck report processes for the extraction of wood using different sized wood particles and liquid extraction in a flow through configuration.

U.S. Pat. No. 9,624,449 to Howard report biorefinery processes for extraction of fermentable saccharides and other useful compounds using water, heat, pressure, and pH, and other procedures as well.

US Published Patent Application No. 2009/1076286 to O'Connor report a process for fractionating lignocellulosic biomass to liquid and solid products using temperature, pH and aqueous solutions, and other methodologies as well.

US Published Patent Application No. 2011/0073264 to Liu reports draft-pulping of hot water extracted wood chips using steam, temperature, pH and pulping chemicals.

US Published Patent Application No. 2014/016324 to Howard report biorefinery processes for extraction of fermentable saccharides and other useful compounds using water, heat, pressure, and pH, and other procedures as well.

US Published Patent Application No. 2015/0167234 to Von Schoultz report methods of extracting biomass using water under reduced pressure.

US Published Patent Application No. 2018/0245030 to Mancosky report aging of alcoholic beverages using controlled mechanically induced cavitation.

US Published Patent Application No. 2018/0320118 to Mancosky report aging of alcoholic beverages using controlled mechanically induced cavitation.

Recently, techniques to enhance the aging of spirits to produce a produce that is comparable to ageing in wooden barrels have been developed that report to reduce the aging time from about 20 years to much shorter times, such as about 6 days. Those techniques utilize temperature and strong light to accelerate the wood degradation process, and also allow the extracts to interact with each other and the bulk solution, notably ethanol.

U.S. Pat. No. 9,637,712 to Davis reports accelerated aging of wine and spirits in wood using light and temperature.

U.S. Pat. No. 9,637,713 to Davis reports accelerated aging of wine and spirits in wood using light and temperature.

The company Lost Spirits generally report the commercialization of the Davis U.S. Pat. Nos. 9,637,712 and 9,637,713 (see, for example, https://www.lostspirits.net/).

The company Stoak Technologies generally report oak wood concentrates for use in the alcoholic beverage industries (see, for example, www.stoaktechnologies.com).

In addition, U.S. Pat. No. 9,840,687 to May et al. reports the aging of wine and spirits using UV light, along with copper plate and electromagnetism.

SUMMARY

The present invention recognizes that there is a long felt need for the ability to produce extracts of natural products, such as but not limited to wood, in order to provide flavoring to foods and beverages, including but not limited to non-alcoholic and alcoholic beverages.

A first aspect of the present invention generally relates to a method of making a flavored extract of at least one natural product, such as but not limited to wood; A second aspect of the present invention generally relates to a product produced by the method of the first aspect above.

A third aspect of the present invention generally relates to a method of making a food or beverage including a product of the first aspect above.

A fourth aspect of the present invention generally relates to a food or beverage produced by a method of the third aspect above.

A fifth aspect of the present invention generally relates to aspects of the present invention particularly adapted for beer.

BRIEF DESCRIPTION OF THE FIGURES

FIG. 7 generally depicts a 96 well format key for spectrographic analysis of samples from Example 12. Key: 1:4 refers to a 1:4 dilution, 1 ml sample+4 ml diluent; dH2O refers to grocery store bulk filtered and otherwise purified water in outdoor dispensing machines; GFB refers to Green Flash Brewery Blonde Ale of that name; EtOH refers to 80 proof, 40% alcohol, Fleishmann's Vodka. Spectra that are not shown relative to FIG. 7 are present in at least one of the provisional priority documents, each of which are incorporated by reference.

FIG. 8A depicts ethanol control, in the dark, at room temperature.

FIG. 8X depicts pine wood extracted with ethanol, in the dark, at heated temperature.

DETAILED DESCRIPTION OF THE INVENTION

Definitions

Figure 1A:
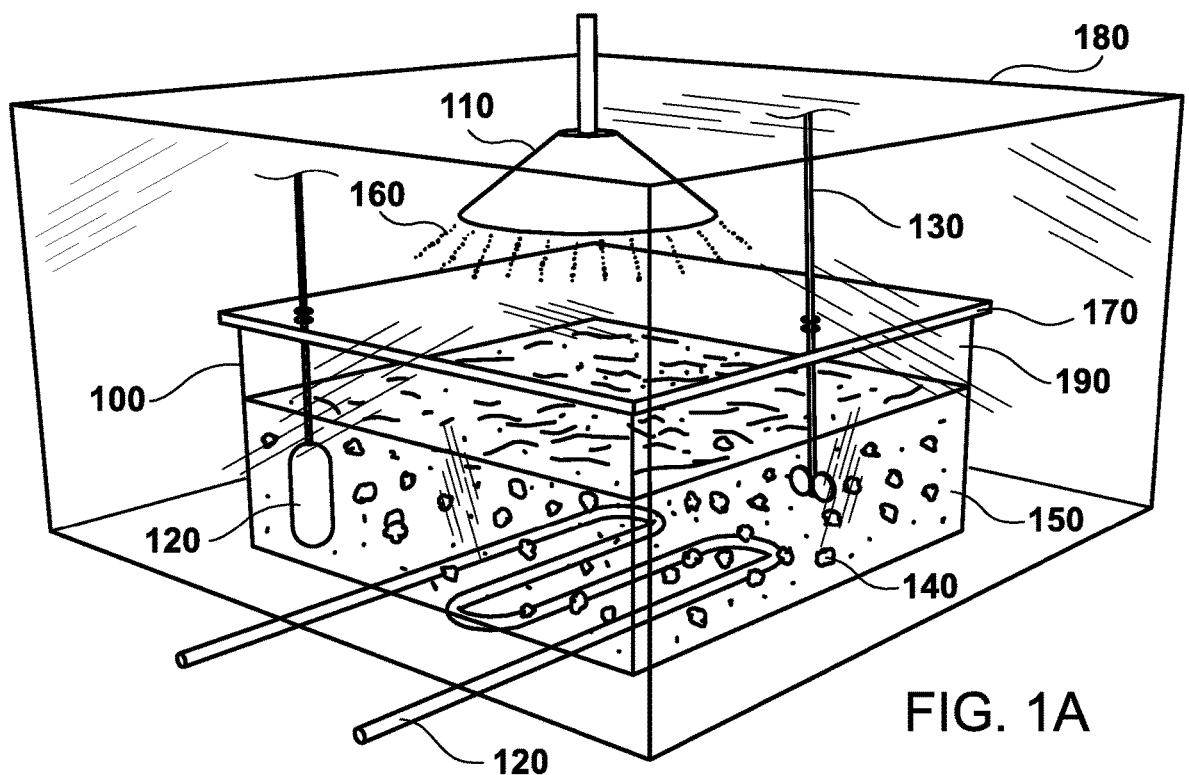
FIG. 1A and FIG. 1B generally depict certain aspects of the present invention to extract flavorings from wood in a batch extraction configuration as set forth in Example 1. These figures provide an introduction to some of the various elements of the extraction setups, how they can be preferably arranged (though other configurations are possible and presented herein), and how the elements interact. Element numbers are as follows: 100 generally refers to an open, semi-sealed, or sealed container; 110 generally refers to an optional light source; 120 generally refers to an optional heat source or temperature regulator, internal or external, such as but not limited to electric, gas, steam, and the like, and a combination thereof; 130 generally refers to an optional stirrer or mixer; 140 generally refers to one or more samples of wood such as but not limited to wood chips; 150 generally refers to a reaction mixture; 160 generally refers to energy emitted from the light source, which can be a source of light, heat, or a combination thereof; 170 generally refers to an optional cover for reduction of evaporation and/or sealing of a semi-sealed (such as but not limited to a Crock Pot cover, or sealed container (such as but not limited to a sealed Ball Jar or a Pressure Cooker such as but not limited to an Instant Pot, an autoclave, or a combination thereof); 180 generally refers to an outside chamber for evaporation reduction and/or sealing of a semi-sealed or sealed container (see generally element 170); and 190 generally refers to a head space of air or other gas.
Figure 1B:
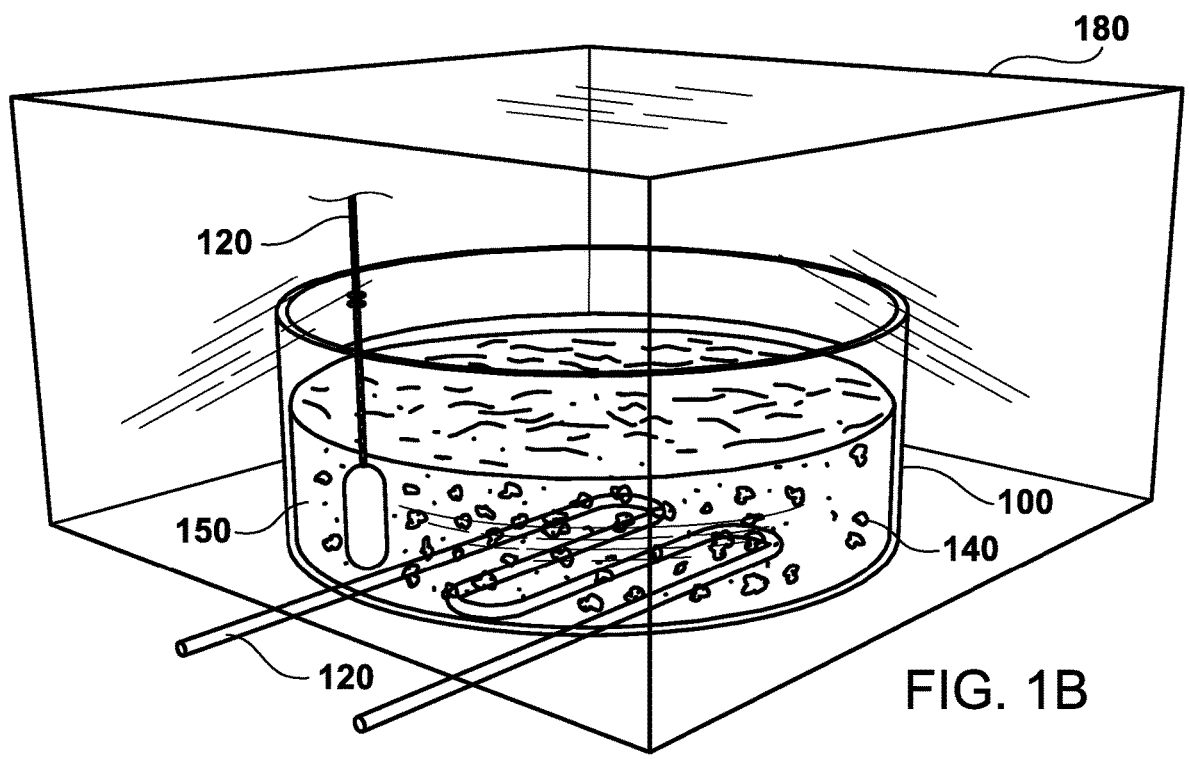

Unless defined otherwise, all technical and scientific terms used herein have the same meaning as commonly understood by one of ordinary skill in the art to which this invention belongs. Generally, the nomenclature used herein and the laboratory and production procedures in fermentation, distillation, extraction, and the like described below are well known and commonly employed in the art. Conventional methods are used for these procedures, such as those provided in the art and various general references in the field of fermentation, distilling, extracting, aging of alcoholic beverages, and the like. Where a term is provided in the singular, the inventors also contemplate the plural of that term. Where the term is provided in the plural, the inventors also contemplate the singular of that term. The nomenclature used herein and the laboratory procedures described below are generally those well-known and commonly employed in the art. As employed throughout the disclosure, the following terms, unless otherwise indicated, shall be understood to have the following meanings:

"Directly" refers to direct causation of a process that does not require intermediate steps.

"Indirectly" refers to indirect causation that requires intermediate steps.

Other technical terms used herein have their ordinary meaning in the art that they are used, as exemplified by a variety of technical dictionaries.

Introduction

The present invention recognizes that there is a long felt need for the ability to produce extracts of natural products, such as but not limited to wood, in order to provide flavoring to foods and beverages, including but not limited to non-alcoholic and alcoholic beverages.

As a non-limiting introduction to the breath of the present invention, the present invention includes several general and useful aspects, including but not limited to:

1) a method of making a flavored extract of art least one natural product such as but not limited to wood;

2) a product produced by the method of 1);
3) a method of making a food or beverage including a product of 1);
4) a food or beverage produced by a method of 3); and
5) aspects of the present invention particularly adapted for beer.

These aspects of the invention, as well as others described herein, can be achieved by using the methods, articles of manufacture and compositions of matter described herein. To gain a full appreciation of the scope of the present invention, it will be further recognized that various aspects of the present invention can be combined to make desirable embodiments of the invention.

I. Method of Making Flavored Extracts of Natural Products Such as Wood

The present invention includes a method of making flavored extracts of at least one natural product, such as but not limited to wood.

A first aspect of the present invention includes a method of making a flavored extract of at least one natural product such as wood; including:
  a) providing at least one natural product such as wood;
  b) providing at least one solvent;
  c) providing at least one container;
  d) providing at least one of:
    i. at least one light source;
    ii. at least one heat source;
    iii. at least one pressure source;
  e) contacting the at least one natural product such as wood with the at least one solvent in the at least one container to provide at least one reaction mixture including at least one bulk solvent;
  f) exposing the at least one container with the at least one reaction mixture to at least one of:
    i. light from the at least one light source;
    ii. heat from the at least one heat source;
    iii. pressure from the at least one pressure source;
  g) reacting the at least one reaction mixture under a regime of conditions comprising one or more of the variables:
    i. temperature;
    ii. light;
    iii. pressure;
    iv. time;
  wherein the regime of conditions results in at least one natural product such as wood, its components, or a combination thereof, being extracted, degraded, reacted, solubilized, fermented, or a combination thereof, into the at least one bulk solvent.

A. Flavored Extract of Natural Products Such as Wood

Another aspect of the present invention includes wherein the flavored extract of at least one natural product such as wood is suitable for human consumption.

The characteristics of the flavored extract can be determined by simple tasking. The subjective taste tests can be compared to more objective analytical laboratory methods such as sample analysis by spectroscopy, chromatography, GC, GC/MS, FPLC, HPLC, and the like. The results of analytical tests and taste tests can be compared to identify peaks and compounds that can have desirable flavorings, either alone or in combination.

A further aspect of the present invention includes wherein the flavored extract of at least one natural product, such as wood, is suitable for use in alcoholic and non-alcoholic beverages.

The alcoholic beverages can be any such beverage, including but not limited to beer, wine, sake, mead, spirits (such as but not limited to Bourbon, Gin, Vodka, Scotch, Tequila, Mescal, and the like, and a combination thereof.

The non-alcoholic beverages can be any such beverage, including but not limited to soft drinks, water, soda, diet soda, carbonated water, flavored water, a combination thereof, or other non-alcoholic beverages.

B. Suitable for Human Consumption

An additional aspect of the present invention includes wherein the flavored extract of at least one natural product such as wood is suitable for human consumption when present in food, drink, or a combination thereof, when present in an effective amount for flavoring the food, drink, or a combination thereof.

The determination of what is suitable for human consumption can be determined by methods known in toxicology. Those methods include but are not limited to in vitro and in vivo tests. Once can also look to the literature as to whether the target natural product has toxic properties, either alone or when extracted by various solvents such as but not limited to ethanol and water. The literature can hold keys to what compounds can be modified by the fermentation process as well.

The drink can be any beverage, alcoholic or non-alcoholic, as described herein. The extract of the present invention used as an additive during preparation of the beverage, after preparation of the beverage, during consumption of the alcoholic, or a combination thereof.

The food can be any food, and the extract of the present invention used as an additive during cooking or preparation, after cooking or preparation, during consumption, or a combination thereof.

C. Natural Product Such as Wood

Another aspect of the present invention includes wherein the at least one natural product such as wood includes wood, spices, botanicals, minerals, vegetables, fruits, berries, fresh or dried or otherwise prepared, or a combination thereof.

Any natural product can be used, such as in the old "animal, vegetable, or mineral" 20 question childhood game. Preferred natural products are those used in brewing and distilling and food flavorings and such, including but not limited to wood, spices, botanicals, vegetables, fruits, berries, or a combination thereof.

The natural product, including but not limited to wood, can be provided in the reaction mixture at any effective amount. Preferred amounts include but are not limited to between about 0.1 g/L and about 1,000 g/L, preferably between about 1 g/L and 500 g/L, more preferably between about 10 g/L and about 500 g/L, and more preferable between about 20 g/L and 100 g/L, and more preferably between about 30 g/L and about 50 g/L. The amount of natural product used is dependent on such factors as the strength of the flavors in the natural product, how well those flavors are extracted by the solvent used, the time of extraction, the temperature of extraction, the pressure of extraction, the amount of light during extraction, and the like.

The methods described herein and as known in the art, can be used to screen samples made by the present invention for desirable flavor profiles in the extract. The extracts can be added to food or beverage to further taste test. Analytical methods can be used to analyze the samples, and can be used alone or in combination with taste testing, to identify peaks and compounds that have desirable flavorings.

D. Wood

A further aspect of the present invention includes wherein the wood is untreated wood, treated wood, charred wood, wood soaked (in spirt, wine, sake, mead, beer, the like, or a combination thereof), bulk wood, chipped wood, sawdust, or a combination thereof.

Any wood can be used in the present invention. One needs to be mindful of potential toxicities of woods and other natural products, as has been described herein. The wood can be of any source, such as but not limited to lumber, scrap, fruit or nut tree waste or trimmings or whole tree, or as present in barrels (treated such as by, untreated, unused, or used such as but not limited to barrels used for aging beer, wine, sake, mead, spirits, or the like, or a combination thereof). Barrels that have been pre-used can be "wet" meaning that the barrel contains some of the spirit, wine, sake, mead, or beer that is residual in the wood, or is not completely voided during the emptying of the barrel, such as at the spirit aging facility and bottling facility from which the barrels were obtained. The source of wood can be organic, such as USDA Certified Organic, such as by growth under those conditions, or by age of the wood before offending pesticides or other chemicals were used. One aspect of the invention is using old barrels using for alcoholic beverages that were made before such offending pesticides or other chemical were used.

Treated wood can be treated by charring, soaking in spirits, wine, sake, mead, beer, or other flavored or unflavored liquid, alcoholic beverage, or non-alcoholic beverage, or a combination thereof.

In one preferred aspect of the present invention, the wood chips can be soaked in beer, spirits, wine, sake, mead, the like, or a combination thereof, in order to saturate or substantially saturate the wood chips with the spirit to enhance the flavor of the wood chips, and may also enhance to extraction of the wood flavors as well. Such soaking can be for any appropriate period of time and conditions. Times for soaking can be any as appropriate, preferably between about 0.5 days and about 1 week, and more preferably between about 1 day and about 3 days. Temperatures can be any as appropriate, preferably from about above freezing to about boiling of water, or higher under pressure, preferably between room temperature and about 200 F, and more preferably between about room temperature and about 185 F. Pressure can be any as appropriate, preferably between about 0.5 atmospheres and about 10 atmospheres pressure, more preferably between about 1 atmospheres and about 5 atmospheres. Other variables can be likewise accounted for.

The wood can be provided in pieces, such as but not limited to as lengths of wood, planks, sticks, chunks, chips, sawdust, or a combination thereof. The pieces can be made by cutting or breaking of the wood, or other appropriate process or combinations thereof.

An additional aspect of the present invention includes wherein the wood includes fruit tree wood, nut wood, BBQ wood, cherry, mesquite, apple, hickory, cedar, oak, pine, avocado, or a combination thereof.

These woods are preferred and are not limiting to the present invention. Such woods can be obtained in the form of lumber, tree trimmings, cut down trees, harvested trees, barrels, sawdust, scrap, a combination thereof, and the like.

Another aspect of the present invention includes wherein the wood is from unused or used barrels from brewing, wine making, sake making, mead making, spirit making, or a combination thereof.

In the case of barrels, they can be dismantled and the wood can be used as is or further broken or cut into pieces. Also for barrels, the inside surface of barrels, notably those used for storing and aging of beer, wine, sake, mead, spirits, the like, or a combination thereof, can be scraped or cut to obtain samples of the inner surface of the barrel, which is believed to house flavors related to the ageing of the prior beverage residents, notably for wine, sake, mead, and spirits. Those scraping or cuttings can be used in the present invention and can represent a preferred aspect of the present invention for beer as these types of extracts can mimic the barrel aging process in barrels that have been pre-used in the wine-making, sake making, mead making, and distilling process.

Used barrel chips can also be purchased on the open market. Such chips are sold for use in BBQ cooking.

The barrel chips can also be soaked in sprits, wine, sake, mead, beer, and the like, or a combination thereof, before or during the extraction processes of the present invention to further mimic the barrel aging process in "wet" barrels as described herein.

E. Solvent

A further aspect of the present invention includes wherein the solvent is suitable for human consumption.

A variety of solvents can be used in the present invention, and FDA approved solvents for human consumption are preferable. Solvents include organic, inorganic, hydrophilic, hydrophobic, miscible, not miscible, a combination thereof, and the like.

An additional aspect of the present invention includes wherein the solvent includes ethanol, water, or a combination thereof. Of course, most preparations of ethanol include at least some water, as they are miscible and commercial products containing ethanol tend to be focused on particular ranges of alcohol concentration, such as but not limited to the "proof" system for spirits and Alcohol By Volume (ABV) system for wine, sake, mead, and beer.

Water and ethanol, either alone or in combination, are preferred solvents in the present invention. When in combination, ethanol and water can be used in any ratio, and other compounds and solvents can be used in combination with water and ethanol as well.

Another aspect of the present invention includes further wherein ethanol in the flavored extract of wood can optionally be removed or reduced in concentration.

There are well known methods to remove ethanol from a sample. Those include but are not limited to heating, distillation, evaporation, freezing, rotary evaporation, freeze drying, a combination thereof and the like. Preferably, ethanol can be removed by heating to a temperature for a period of time to remove the ethanol and retain the water extract and its components, or most of them as some volatile components of the extract may be removed with the ethanol.

F. Container

A further aspect of the present invention includes wherein the container can be substantially airtight when in operation.

The container can be used in a variety of sealed, semi-sealed, or unsealed configurations, or a combination thereof. The sealed configuration is such as but not limited to Ball Canning Jars, which are filled to near the top and sealed with a pressure indicating cap and a screw top bank to seal the container. Other such sealed container can be used, such as a glass carboy with a sealed top.

Ball Canning Jars are considered sealed or substantially air-tight as there may be some escape of air or heated vapors when heated or otherwise, but generally these types of configurations are not subject to leaking while at room temperature.

Crock Pots and Instant Pots (which include a pressure cooker function along with heating), and the like, can also be used as the container in the present invention.

An additional aspect of the present invention includes wherein the container is made of glass, plastic, wood, ceramic, metal, stainless steel, the like, or a combination thereof.

The containers can be made of any appropriate material or materials. Preferably, the components are not reactive with the contents and are not toxic. Glass and stainless steel are preferable and readily available. Some containers include more than one material, such as Ball Canning Jars, which are glass with metal and rubber sealing structures, though surfaces in contact with the contents of the jar are coated so that the metal does not contact the sample within.

Another aspect of the present invention includes wherein the container is at least in part light transmitting.

In the instance where light is being used in the extraction reactions, the transmission of light through the container so as to reach the sample inside is important. Of course, the container can be light opaque, and a light source can be inserted into the reaction container. The light transmission characteristics of the container are preferably so that incident light (visible, UV, IR, or a combination thereof being preferable) can pass through the container with minimal or no interference from the container. Transmission of light information of various materials are readily available, and can be tested using light meters, spectrophotometers, and such.

A further aspect of the present invention includes wherein the container is at least in part light transmitting in the visual range, UV range, IR range, or a combination thereof.

An additional aspect of the present invention includes wherein the container is sealed, unsealed, open, semi-sealed, or a combination thereof.

The container can be used in a variety of sealed or unsealed configurations. The sealed configuration is such as but not limited to Ball Canning Jars, which are filled to near the top and sealed with a pressure indicating cap and a screw top to seal the container. Other such sealed container can be used, such as a glass carboy with a sealed top.

Ball Canning Jars are considered sealed or substantially air-tight as there may be some escape of air or heated vapors when heated or otherwise, but generally these types of configurations are not subject to leaking while at room temperature and exhibit no or little leaking during heating procedures.

Pressure cookers can also be used in the present invention and are considered sealed. Instant Pots and such are included in this classification, and can be in the sealed or unsealed, or semi-sealed, configurations, or a combination thereof, based on the flexibility of that type of system.

A covered crock pot or slow cooker or Ball Canning Jar water bath device configuration is considered semi-sealed and the cover does not particularly seal again pressure escaping (though what appears to be a condensation of liquid seal) but does reduce evaporation and can keep temperatures more constant than perhaps a double boiler setup for heating.

Open configurations are those where the containers, such as Ball Canning Jars, Crock Pots, Instant Pots, Ball Jar Cookers, are left open to the environment that they are in, being without the sealing cap and screw top.

G. Light Source

Another aspect of the present invention includes wherein the light source is an artificial source of light, a natural source of light, or a combination thereof.

Any light source is applicable to the present invention, though high intensity and full spectrum light is preferred. Sources of light include but are not limited to incandescent light, natural light, amplified light (through lenses and such), compact fluorescent lights, fluorescent lights, high intensity lights, sodium vapor lights, LED lights, grow lights, a combination thereof, and the like.

The emission profile of the lights is readily available from the manufacture, and that information can be used to assist in selecting a light source.

Some lights produce heat, sometimes high amount of heat, and that is to be considered when making a set up for extraction. Heat from lights can be used to advantage as heat and light together can be used to enhance extraction.

H. Heat Source

A further aspect of the present invention includes wherein the heat source is a light source, a hot water source, a steam source, an electric source, a gas source, or a combination thereof.

Any source of heat can be used in the present invention. Preferred heat sources are as is known in the art, such as but not limited to by electric heat, gas heat, chemical, hot air, hot water, steam, a combination thereof or the like). Heated water is a preferable source of heat for the reactions, such as a double boiler configuration, a Ball Canning Jar heating set up, crock pots, slow cookers, pressure cookers, Instant Pots, autoclaves, a combination thereof, or the like. In some instances, the self-contained heating sources such as in crock pots and Instant Pots are the reaction container itself becomes the container. The heat source can be internal as to the bulk solution or other component of containers (such as but not limited to a submersible heating element, steam heated tubes, and the like), or external (such but not limited to an electric heating element, steam heated tubes, and the like).

I. Pressure Source

An additional aspect of the present invention includes wherein the pressure source is a pressure cooker, an autoclave, a sealed container, a semi-sealed container, air pressure, water pressure, steam pressure, heat generated pressure, or a combination thereof.

The pressure source can be any known in the art. Interestingly, Ball Canning Jars have a built in pressure source, that is measured and reported by a "click" sound when the thin metal cover is pressed outward by positive pressure when heating, and clicks back by negative pressure in the container relative to atmospheric pressure upon cooling. The amount of pressure in such Ball Canning Jars is apparently dependent up on the head space of air in the container before heating, or if a pressure cooker is used rather than a covered heated water bath. The pressure source can also be a pressure cooker configuration, such as an Instant Pot.

Temperature can increase pressure in a closed container, and should follow the Ideal Gas Law (PV=nRT). For closed and sealed containers or jars with little head space of air or gas, the pressure is assumed to be about 1 atmosphere.

Another aspect of the present invention includes wherein the pressure source provides pressure at between about 1.0 atmospheres and about 100 atmospheres pressure, or between about 0.1 psi and about 1,000 psi.

The pressure can be any as appropriate and can be measured or obtained from the literature for a particular pressure source. Preferred pressure is between about 0.5 atmospheres and about 1,000 atmospheres, preferably between about 1.0 atmospheres and about 100 atmospheres, more preferably between about 2 and about 50 atmospheres, more preferably between about 3 and 20 atmospheres of pressure. Preferred pressure is between about 0.1 psi and about 1,000 psi, more preferably between about 1 psi and about 100 psi, more preferably between about 5 psi and about 75 psi, and more preferably between about 10 psi and about 50 psi.

J. Reaction Mixture

A further aspect of the present invention includes wherein the reaction mixture includes ethanol, water, or a combination thereof.

The amount of water and ethanol (including 100% ethanol or 100% water) is a choice depending on what natural product is being extracted and the particular components. Generally, ethanol extraction should extract more organics and more hydrophobic materials than water alone, though unique flavor profiles can be obtained using ethanol or water alone, or in various combinations of characteristics. All ranges of ethanol and water combinations are applicable to the present invention.

An additional aspect of the present invention includes wherein the reaction mixture includes at least one yeast, other ethanol producing organism, or a combination thereof.

Any ethanol producing organism is applicable to the present invention. Preferred are yeast, such as but not limited to *Saccharomyces*, notably *Saccharomyces cerevisiae*, also known as brewers or baker yeast, with innumerable strains available. Other organisms such as some bacteria also produce ethanol along with unique flavor profiles. These ethanol producing organisms provide ethanol along with unique flavor profiles to the fermented product.

K. Bulk Solvent

Another aspect of the present invention includes wherein the bulk solvent includes ethanol, water, or a combination thereof.

Any appropriate solvent or solution can be used in the present invention. Water and ethanol, alone or in any combination, are preferable but not limiting solvents for use in the present invention.

A further aspect of the present invention includes wherein the bulk solvent includes one phase or multiple phases.

In the present invention, there are multiple phases involved, including liquid, gas, and solid. The wood is solid, the extraction solutions liquid, and when heated a gas phase is enhanced. Gelled portions of extracts have been noted, along with a haze or precipitate.

L. Exposing Reaction Mixture to Source of Light

An additional aspect of the present invention includes wherein the container, reaction mixture, or a combination thereof, is exposed to light from the source of light in a natural environment, a controlled environment, or a combination thereof.

The reaction mixture can be exposed to light in any appropriate manner. In general, the light source can be external or internal to the reaction container, as set forth herein an in the figures, and as known in the art. Particulars for this aspect of the present invention, and others, can be found at least in Example 1 herein.

M. Reacting

Another aspect of the present invention includes wherein the reacting is run to completion, substantial completion, or to an incomplete reaction.

In the present invention, a time course of extraction can be obtained, similar to a growth curve in microbiology. The character and composition of the extract is expected to change over time while other variables such as temperature are held constant. Samples can be taken over time, or separate reaction containers stopped at different times, and the extract evaluated for taste on its own, or when added to food or drink and tasted then. There is expected to be a time course of change in the reaction mixture, which would likely become asomtopic at some point in time. Thus, for a given natural product and extraction procedure and purpose for the extract, there will likely be a minimal time of extraction and a point of diminishing returns.

A further aspect of the present invention includes wherein the reacting is in bulk, in batch, in flow through, or a combination thereof.

These types of configurations are presented in the FIGs, as well as within the text of this document, and in some instances are readily available in the art and on the open market.

N. Light

An additional aspect of the present invention includes wherein the light is substantially constant throughout the reaction, or variable throughout the reaction.

Light, and temperature, and other variables can be independently controlled and variable over time. For example, the extraction process can take place continuously, intermittently, or a combination thereof. Continuous extraction is considered preferable, though intermittent extraction may be required as to not have a heat source or light running 24 hours a day unattended, for example.

Another aspect of the present invention includes wherein the light is at a range between about 100 Lux and about 1,000,000 lux.

Any appropriate range of light intensity is applicable to the present invention. In Lux, the ranges are preferably between about 100 Lux and about 1,000,000 Lux, more preferably between about 1,000 Lux and about 100,000 Lux, and more preferably between about 10,000 and about 50,000 Lux.

Light refers to more than normal and not purposeful level ambient light (artificial, natural, and a combination thereof), and dark need not be absolute darkness.

O. Temperature

A further aspect of the present invention further includes a temperature controlling device or system.

Any appropriate temperature controlling device is applicable to the present invention. For example, but not limiting in nature, preferred temperature regulating devices include thermostats, rheostats, a combination thereof, and the like. In the end, any temperature controlling device that can keep the temperature of the reaction mixture at a constant or variable temperature or range of temperatures, as desired by the operator, is appropriate for the present invention. Temperature control can be manual, automated, or a combination thereof.

An additional aspect of the present invention includes wherein the temperature is substantially constant or constant throughout the reaction, or variable, throughout the reaction.

The present invention recognized that constant or variable temperature profiles are desirable in the present invention. The temperature can be regulated by a temperature regulating device as described herein or as known in the art.

Another aspect of the present invention includes wherein the temperature is at a range between about 33 F and about 300 F.

Any appropriate temperature or range of temperatures is applicable to the present invention. A preferred temperature range (constant or maximum when variable) is between about 33 F and about 300 F, more preferably between about 60 F and about 200 F, more preferably between about 100 F and about 190 F, and more preferably between about 150 and about 185 F. A temperature of about 180 F or above, at least at some point in time during the extraction for an appropriate period of time, is preferred as that temperature has pasteurizing characteristics.

P. Time

A further aspect of the present invention includes wherein the reaction is run at a time between about 1 hour and about 1 year.

Any appropriate time of extraction is applicable to the present invention. If continuous, the time is as indicated. If discontinuous, the time is the sum of time at the temperature or range of temperatures. Gaps at being at temperature can be caused by breaks desirable for safety reasons, for example, so as not to have high heat on while unattended. Preferred time of extraction is between about 1 hour and about 1 year, more preferably between about 5 hours and about 9 months, more preferably between about 10 hours and about 6 months, more preferably between about 1 day and about 3 months, more preferably between about 2 days and about 2 months, more preferably between about 2 days and about 4 weeks, more preferably between about 2 days and about 3 weeks, more preferably between about 5 days and about 2 weeks, and more preferably between about 2 days and about 7 days.

Q. pH

A further aspect of the present invention includes wherein the bulk solvent added to natural product is at a pH between about 1 and about 12, more preferably between about 2 and about 11, more preferably between about 3 and about 10, more preferably between about 4 and about 9, more preferably between about 5 and about 8, more preferably between about 6 and about 7.

A further aspect of the present invention includes wherein the finished product is at a pH between about 1 and about 12, more preferably between about 2 and about 11, more preferably between about 3 and about 10, more preferably between about 4 and about 9, more preferably between about 5 and about 8, more preferably between about 6 and about 7.

R. ppm

A further aspect of the present invention includes wherein the bulk solvent added to natural product is at a ppm between about 1 and about 5,000, more preferably between about 5 and about 2,000, more preferably between about 10 and about 1,000, more preferably between about 10 and about 750, more preferably between about 50 and about 500, more preferably between about 75 and about 250, and more preferably between about 100 and about 200.

A further aspect of the present invention includes wherein the finished product is at a ppm between about 1 and about 5,000, more preferably between about 5 and about 2,000, more preferably between about 10 and about 1,000, more preferably between about 10 and about 750, more preferably between about 50 and about 500, more preferably between about 75 and about 250, and more preferably between about 100 and about 200.

S. Wood and its Components

An additional aspect of the present invention includes wherein the wood and its components includes cellulose, lignin, beer residue, wine residue, sake residue, mead residue, spirit residues, or a combination thereof.

The present invention recognizes that the extracts of natural products, including wood, can be quite complex in nature and include a wide range of components. Various analytical methods described herein and known in the art can be used to investigate the nature of these compounds, and to aid in correlating the flavors experienced with the compounds in the extracts, though such determinations are certainly not required for the operation of the present invention.

T. Extracted, Degraded, Reacted, Solubilized. Fermented

Another aspect of the present invention includes wherein the extracted, degraded, reacted, solubilized, and fermented refer to biological reactions, organic chemistry reactions, inorganic chemistry reactions, or a combination thereof.

The present invention recognizes that there are a wide variety of reactions that can take place, be they an extraction from the natural product such as wood, or a reaction of components in the reaction solution. Furthermore, once the extracts are provided within food or drink, at any time during the processing or consumption thereof, that various chemical reactions can take place with the food or drink as well. For fermented products, there may also be microbial modification of compounds during the fermentation process, which can result in desirable and undesirable taste and other profiles.

U. Finishings

A further aspect of the present invention further includes separating at least a portion of the at least one wood from the at least one bulk solvent.

Any appropriate finishing of the extract are appropriate. For example, wood, precipitate, haze, and the like can be removed, if desired by, for example, decanting, centrifugation, filtration, fractionation, and the like. However, it can be the case that such precipitate and haze and such can have desirable flavorings. For wood extracts, it is generally believed that such precipitates and haze are the result of tannins and other flavorings or components of wood such as lignin and cellulose, but that may not be the case and applicants are not desiring to be limited to any mechanism described herein. Any mechanisms set forth or suggested herein are mere suggestions and offered as general explanations rather than being limitations for the invention.

An additional aspect of the present invention further includes concentrating flavors from the bulk solution, the flavored extract of wood, or a combination thereof.

Any appropriate concentration methods are applicable to the present invention. Concentration of extracts is desirable as during use, the extracts are diluted. Routine concentration methods include but are not limited to heating, boiling, evaporating, vacuum evaporation, freeze drying, filtration, rotary evaporation, a combination thereof, and the like.

Another aspect of the present invention includes wherein the flavored extract of wood is diluted before being consumed by a human.

As part of the present invention, it is likely that the extract will be diluted before consumption. Thought the extracts can be consumed neat, they are diluted when added to food or drink.

A further aspect of the present invention includes further wherein the flavored extract of wood is added to a food substance, a drink substance, or a combination thereof.

As set forth herein, an aspect of the present invention is adding an extract of the present invention to food, drink, or a combination thereof, to enhance the flavor profile of the food or drink substance. Food substance refers to a food product that may or may not be natural in origin, such as highly processed food substances. The amount of extract added to food or drink is one of choice, as is with spices and such. The amount of extract used in a food or drink product can be readily determined by routine taste testing, and other appropriate methods, that can be used in conjunction with analytical methods as described herein and known in the art, but that need not be the case.

An additional aspect of the present invention includes further wherein the flavored extract of wood is a food or beverage product.

As set forth herein, an aspect of the present invention is adding an extract of the present invention to food, drink, or a combination thereof, to enhance the flavor profile of the food or drink product. Food product refers to a food product that is natural or not natural in origin. The amount of extract added to food or drink is one of choice, as is with spices and such. The amount of extract used in a food or drink product can be readily determined by routine taste testing, and other appropriate methods, that can be used in conjunction with analytical methods as described herein and known in the art, but that need not be the case.

Another aspect of the present invention includes wherein the method of making flavored extracts is a fermentation method, an aging method, or a combination thereof.

After an extract is added to food or drink the food or drink can be fermented (as with beer or wine or sauerkraut, for example) or aged (such as with beer or wine or sake or mead) in order to complete the food or beverage product and to enhance the flavor profile of the food or drink.

A further aspect of the present invention includes wherein the method of making flavored extracts takes place in a single device or location, in multiple devices or locations, at least in part in a single device or location, at least in part in multiple devices or locations, or a combination thereof.

The reactions and steps of the method can take place in one physical location or many, all at once or sequentially, or a combination thereof. There is not a prohibition for splitting up the methods in this way.

An additional aspect of the present invention includes wherein ethanol in the flavored extract of wood is removed or reduced in concentration by distillation, fractionating column distillation, heating to about 176 F but less than about 212 F to drive off ethanol and retain water, freezing to freeze water but not ethanol, rotary evaporation, freeze drying, or a combination thereof.

In some aspects of the present invention, it is desirable to concentrate the extracts made by the methods of the present invention. A wide variety of such concentration methods are available and a few are provided herein.

Furthermore, the extracts can be clarified if desired, should there be haze or precipitate, or particles present. Such clarification can be accomplished in whole or in part by a variety of methods known in the art, such as but not limited to settling, decanting, centrifugation, filtering, flocculating, precipitating, the like, or a combination thereof.

II. Product Produced by a Method of the Present Invention

The present invention also includes a product produce by a method of the present invention.

A second aspect of the present invention includes a product produced by the method of the present invention in Section I above.

III. Method of Making a Food or Beverage Including a Product of the Present Invention The present invention includes a method of making a food or beverage including a product of the present invention.

A third aspect of the present invention includes a method of making a food or beverage product that includes a flavored extract of wood, including:
  a) providing at least one food, beverage, or a combination thereof;
  b) providing at least one product made by the process of Section I above;
  c) combining the at least one food, beverage, or a combination thereof with the at least one product made by the process of Section I above.

In many ways, the extract of the present invention are like spices (such as herbs) or extracts (such as Liquid Smoke) that can be added to food or drink to enhance the flavor profile of the food or drink.

Any appropriate amount of extract can be added to the food, beverage, or combination thereof. The amount of extract added to the food or beverage can be expressed as a dilution rate or ratio of X:Y, where X is the amount of extract; and Y is the amount of food or beverage. For example, for the dilution rate or ratio of 1:2, there would be 1 (one) part X mixed with 2 (two) parts Y. The dilution rate or ratio can be expressed as w/w (weight to weight), v/v (volume to volume), or a combination thereof (w/v or v/w). Preferred ranges of such dilution rate or ratio is such that X can be between about 1 and about 10; and Y between about 1 and 100,000. More preferably X can be about 1, 2, 3, 4, 5, 6, 7, 8, or 9; and Y can be about 1, 2, 3, 4, 5, 6, 7, 8, 9, 10, 20, 30, 40, 50, 60, 70, 80, 90, 100, 1,000, 10,000, or 100,000. More preferably X can be about 1, 2, 3, 4, 5, 6, 7, 8; and 9, and X can be about 1, 2, 3, 4, 5, 6, 7, 8, 9, 10, 20, 30, 40, 50, 60, 70, 80, 90, and 100. Other dilution rates and ratios can be used, and can be a choice for the user of the present invention.

Another aspect of the present invention includes wherein the beverage is an alcoholic or non-alcoholic beverage.

A further aspect of the present invention includes wherein the alcoholic beverage includes spirits, wine, sake, mead, beer, the like, or a combination thereof.

An additional aspect of the present invention includes wherein the alcoholic beverage includes beer.

IV. Food or Beverage Produced by a Method of the Present Invention.

The present invention also includes a food or beverage produced by a method of the present invention.

A fourth aspect of the present invention includes a product made by the process of Section III above.

The Examples section of this application provides the development of extracts for use in beer. These teachings are readily adaptable to other food or drink.

V. Beer Related Aspects of the Present Invention

The present invention also includes preferred aspects of the present invention directed towards use in beer.

A fifth aspect of the present invention includes a method of making a flavored extract of at least one natural product comprising wood; including:
  a) providing at least one type of wood;
  b) providing at least one solvent comprising water;
  c) providing at least one sealed container;
  d) providing at least one of:
    i. at least one heat source;
    ii. at least one pressure source;
  e) contacting the at least one type of wood with the at least one solvent in the at least one sealed container to provide at least one reaction mixture comprising at least one bulk solvent;
  f) exposing the at least one container with the at least one reaction mixture to at least one of:
    i. heat from the at least one heat source;
    ii. pressure from the at least one pressure source;
  g) reacting the at least one reaction mixture under a regime of conditions including one or more of the variables:
    i. temperature;
    ii. pressure;
    iii. time;
  wherein the regime of conditions results in at least one wood, its components, or a combination thereof, being extracted, degraded, reacted, solubilized, fermented, or a combination thereof, into the at least one bulk solvent.

The Examples section of this application provides the development of extracts for use in beer. These teachings are readily adaptable to other food or drink.

Another aspect of the present invention includes a product produced by the method of this aspect or section of the present invention.

A further aspect of the present invention includes a method of making a beer product that includes a flavored extract of wood, including:
a) providing at least one base beer product;
b) providing at least one flavored extract of wood made by the process of this aspect and section of the present invention;
c) combining the at least one base beer product with the at least one flavored extract of wood made by the process of this aspect and section of the present invention.

An additional aspect of the present invention includes a product made by the process of this aspect or section of the present invention.

EXAMPLES

Unless otherwise apparent from the writings themselves, the working examples that follow are mostly "kitchen chemistry," that is using that type of facility and instrumentation. As such, the values presented are approximate, believed to be accurate to within 2% to 10%, with an average of 5%, of the indicated value. Also, the Taste Tests are somewhat subjective in nature, and during taste tests there can be some adding of a bit more extract or diluent by the taster or group of tasters along the way, being the norm for such things in the industry in general. Also, the stated dilutions are believed to be accurate to within 2% to 10%, with an average of 5%, of the indicated value for the reasons above. Such accuracy is thus considered to be related to what is to be considered "about" in this application when referring to values.

Example 1: Batch Extraction

This non limiting example establishes that the present invention can be utilized in a bulk solution, or batch extraction, configurations. Batch extractions are generally depicted in FIG. 1, FIG. 3, FIG. 4, and FIG. 6, for example.

One aspect of the present invention is to provide an extract of wood that provides flavorings the bulk solution, such as but not limited to in a single reaction chamber, but includes the case of multiple reaction chambers. The bulk solution can be the final product, preferably after some simple post production processing, such as removal of wood or other particulates by way of filtering, centrifugation, or other methods known in the art. In the alternative, the extract of wood can be used as an additive for flavorings to food or beverage, such as vanilla extract being used to flavor a wide variety of foods and drinks.

In the present example, wood, such as white oak that is used in aging distilled spirits, or other woods, preferably flavorful woods, such as but not limited to fruit tree woods, such as but not limited to apple or cherry, or nut woods, such as but not limited to almond, though any appropriate wood can be used. The wood is preferably provided in chunk form, chip form, plank form, stick form, sawdust form, other types of forms, or a combination thereof. The wood material is contact with ethanol as the solvent (ethanol is miscible in water, and thus water would also be present), such as a distillate of between about 30 proof and about 99 proof; preferably between about 50 proof and about 90 proof, more preferably between about 70 proof and 80 proof. The ethanol is provided in an amount sufficient to cover the wood.

The wood and ethanol (or water or other solvents, or combinations thereof) are mixed and placed within a transparent container of any appropriate shape and size that allows transmission of desired wavelengths of light or other electromagnetic radiation. Preferred materials include but are not limited to glass, plastic, polymers, and the like. The spectral transmission of a material can be readily determined and evaluated using methods known in the art.

Desired wavelengths are full spectrum of the sun, and preferably as set forth in the Davis U.S. Pat. Nos. 9,637,712 and 9,637,713, preferably between about 400 nm and about 1,000 nm. Other preferred wavelengths include but are not limited to blue and ultraviolet. Light of less intensity, or no light at all, is applicable to the present invention. Light intensity is preferably measured within the reaction chamber to account for the loss of light in general and particular wavelengths as well, though incident light is also of interest. The amount and type of light lost transmitting through the wall of a container can be readily determined by methods described herein, such as but not limited to spectroscopy, and as available in the art.

The intensity of the light is preferably high, preferably more than the light of the sun at the equator at noon, preferably in the range as set forth in the Davis U.S. Pat. Nos. 9,637,712 and 9,637,713, preferably between about 1,000 and 3,000,000 lux hours.

The light can be of any spectrum and/or combination of wavelengths, and preferably includes actinic light, preferably including light at about 420 nm.

The lighting can be of any appropriate type and source, such as but not limited to incandescent, fluorescent, compact fluorescent, LED, sodium vapor, or others known in the art, or combinations thereof. A summary of appropriate lighting can be found in the Davis U.S. Pat. Nos. 9,637,712 and 9,637,713, and Cervantes, "Marijuana Horticulture, The Indoor/Outdoor Medical Growers Bible," Van Patten Publishing, copyright 2006.

The configuration of the container and lights are rather variable, and one can look to the state of the art of this field, the Davis U.S. Pat. Nos. 9,637,712 and 9,637,713, and other sources such as indoor grow lights and such for indoor agriculture, notably for tomatoes and marijuana.

The reaction takes place at least in part in the reaction container. Notably, light is shone on and/or through the reaction container, the bulk solution, or a combination thereof.

The reaction temperature is preferably as set forth in the Davis U.S. Pat. Nos. 9,637,712 and 9,637,713, preferably between about 60 F and about 200 F, more preferably between about 140 F and about 190 F, and more preferably between about 150 F and about 180 F. Temperature can be modulated by way of any type of appropriate heating regulating device, such as but not limited to a fish tank heater, crock pot, slow cooker, Ball Canning Jar heater, canning jar water bath, gas heat source, electric heat source, a combination thereof, or others, and if a higher temperature is needed, then the steam loop and other methods and hardware of the Davis U.S. Pat. Nos. 9,637,712 and 9,637,713, and other sources can be utilized.

The container is preferably substantially air tight in order to control evaporation, but this need not be the case. In some instanced, the top, for example, can be open and light shone on the surface of the liquid.

The time of exposure of the wood and solvent to light is variable and can preferably be between about 1 hour and 1 year, more preferably between about 1 day and 9 months, more preferably between about 6 days and 6 months, more preferably between about 1 month and 3 months, more preferably between about 12 hours and bout 336 hours, and more preferably between about 10 hours and about 100 hours. The examples provide guidance as to preferred time for some exemplary extracts. The longer the contact time, the more materials are to be extracted, thus allowing a range of strengths and compositions of extracts.

The temperature of the reaction solution can be controlled by way of devices as are known in the art. For example, a fish tank heater, or other devices such as but not limited to crock pots and hot water baths as described herein and as known or available in the art, can be used to keep the temperature of the reaction solution at a desired temperature or range of temperatures, and can be programmed or otherwise changed to change the temperature of the reaction solution.

The mixture is preferably stirred or mixed at least occasionally to aid in the extraction, but mixing is not required. The stirring can be done mechanically and optionally automated, such as through an agitator having paddles and the like, including recycling flow of reaction liquid or mixture or bubbling of air. Stirring can also take place manually by an instrument or human operator at prescribed times. In some instances, it can be important to have the wood settle in the reaction mixture, and in others having the wood be suspended, deepening on the reaction and desired product.

The pressure of the reaction vessel can be any as appropriate and can be regulated by appropriate pressure means and regulators. Temperature can increase pressure in a closed container, and should follow the Ideal Gas Law (PV=nRT). For closed and sealed containers or jars with little head space of air or gas, the pressure is assumed to be about 1 atmosphere. Pressure can be increased by external pressurized air or other gas such as inert nitrogen. Pressure can be measured by an appropriate meter, and can be regulated by a computer controlled device, or by a human, for example. The pressure within the reaction chamber can be modulated and measured by standard methods, such as by sensors and monitors as are known in the art. Pressure can be modulated by air pressure, heating a closed container (such as but not limited to Ball Canning Jars, pressure cookers, crock pots, slow cookers, hot water baths, Ball Jar hot water baths for canning), or other methods known in the art. Pressure can be inferred by indicators, such as but not limited to pop up/down indicators such as in Ball Jars with "click" sound to indicate positive or negative pressure, or other methods and hardware as is known in the art. Pressure regulators and sensors and meters can be used as well.

The methods of the present invention are subject to automation as there are a limited number of identifiable variable in play that can be monitored and adjusted manually or automatically.

The various variables discussed herein, such as but not limited to light, solvent concentration, pressure, time, and temperature, and others, can be constant or variable during the extraction process.

The composition of the bulk solution can be monitored by taste test, and also by analytical chemical means, such as but not limited to gas chromatography (GC) and optionally mass spectroscopy (MS), and preferably together (GC/MS).

In one scalable configuration, white oak for use in wooden barrels for aging whisky are chipped into about 1 inch square size. Alternatively, wood from used or unused barrels can be used (charred or uncharred, or otherwise treated or untreated), with by chipping the whole barrel, or by scrapping or otherwise removing and collecting the internal surfaces of the barrel where flavorings unique to used barrels are likely to be in higher concentration and be more readily extracted in useful concentrations. These chips can be placed in, for example, a 10 gallon glass fish tank with fitted with an airtight glass top. The glass is known to not substantially interfere with the transmission of visible light. The chips can take up about 50% of the volume of the container, but more or less is appropriate. The container is filled with 80 proof commercial grade ethanol (unflavored vodka), though other solvents such as but not limited to water or water/ethanol mixtures can be used, so that the wood chips are preferably completely covered and the container is preferably about 90% full, though smaller or larger volumes are appropriate.

Figure 6A:
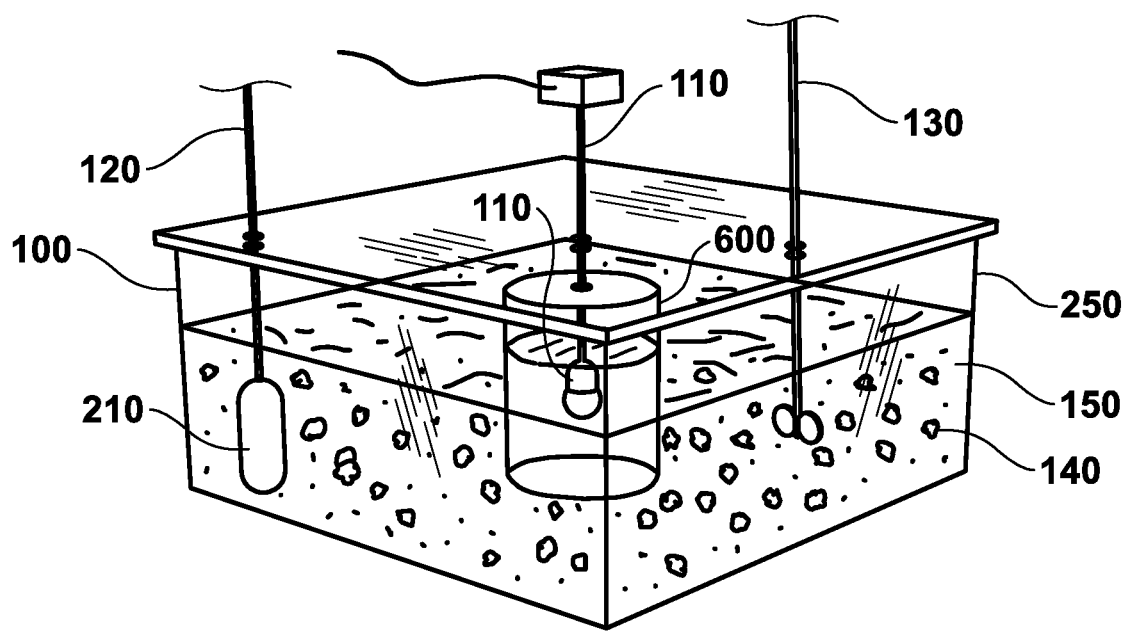
FIG. 6A generally depicts one aspect of the present invention to extract flavorings from wood showing a variety of locations for light sources as to the reaction vessel and reaction liquid. Element numbers are as follows: 600 generally refers to a glass tube or other structure to allow passage of light into the bulk solution.
Figure 6B:
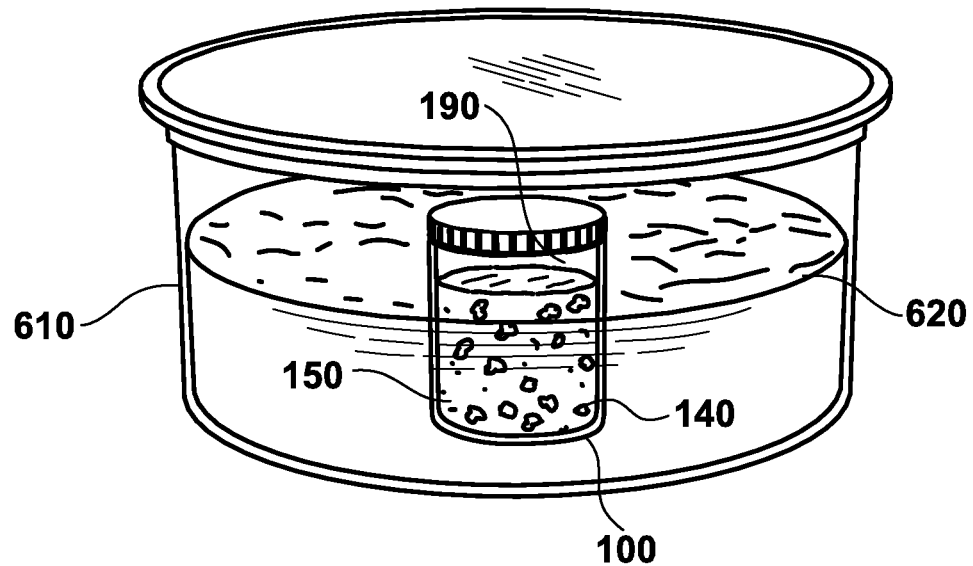
FIG. 6B generally depicts one aspect of the present invention to extract flavorings from wood, notably a preferred aspect of the present invention, lacking external light or stirring mechanism, and heat and pressure source from a Ball Jar Cooker (hot water bath), the sealed container itself, or a combination thereof, as set forth in the examples. Element numbers are as follows: 610 generally refers to a hot water bath (such as but not limited to a Ball Jar Cooker) or pressure cooker (such as but not limited to an Instant Pot, or an autoclave), and in this instance, the container is depicted as a sealed Ball Jar with solvent and wood with little head space, with hot water level in the hot water bath or pressure cooker indicated by 620. This is a preferred configuration, though in a pressure cooker, no reaction container is needed as the pressure cooker acts as a sealed container.
Figure 6C:
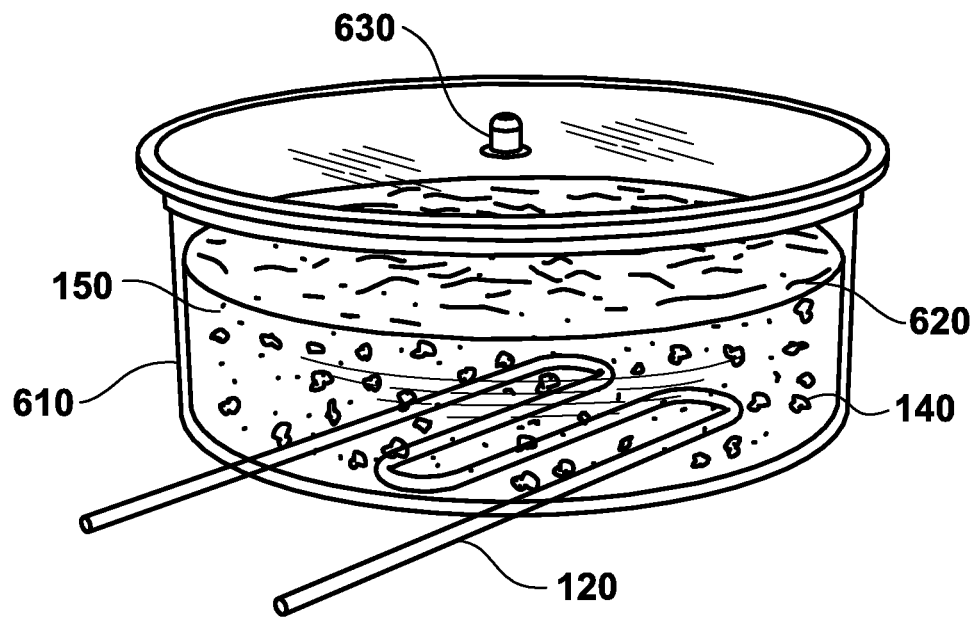
FIG. 6C generally depicts one aspect of the present invention to extract flavorings from wood, notably a preferred aspect of the present invention that utilizes a pressure cooker, such as but not limited to an Instant Pot. Element numbers are as follows: 630 generally depicts a pressure relief valve as are commonly found on pressure cookers, including autoclaves.
Figure 8A:
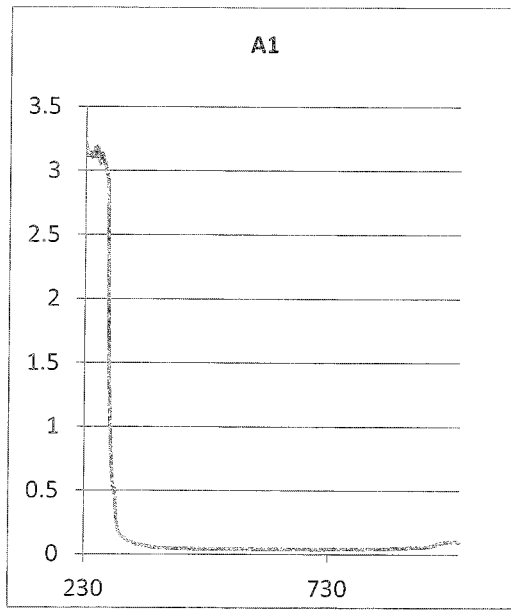
FIG. 8A through FIG. 8X generally depict the spectrographic analysis of samples set forth in FIG. 7 and Example 12. Spectra that are not shown relative to FIG. 7 are present in at least one of the provisional priority documents, each of which are incorporated by reference. In particular.
Figure 8B:
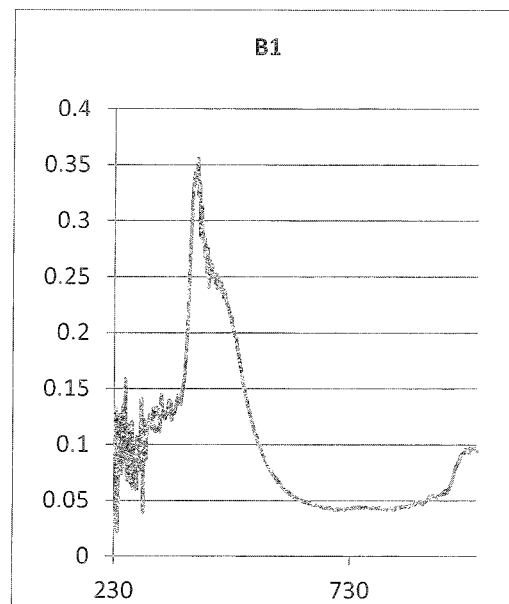
FIG. 8B depicts cherry wood extracted with ethanol, in the dark, at room temperature.
Figure 8C:
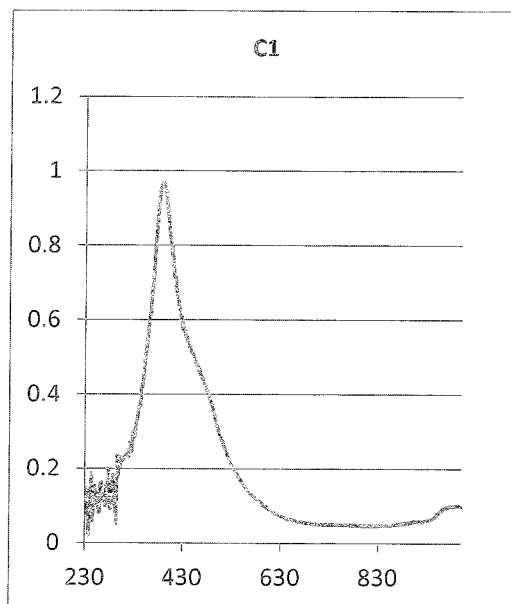
FIG. 8C depicts mesquite wood extracted with ethanol, in the dark, at room temperature.
Figure 8D:
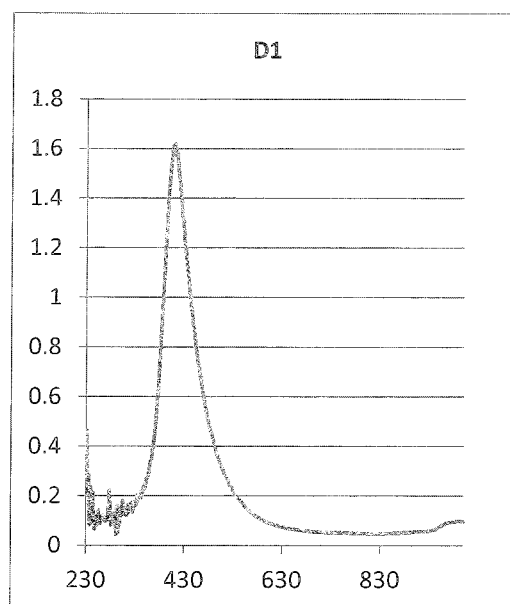
FIG. 8D depicts apple wood extracted with ethanol, in the dark, at room temperature.
Figure 8E:
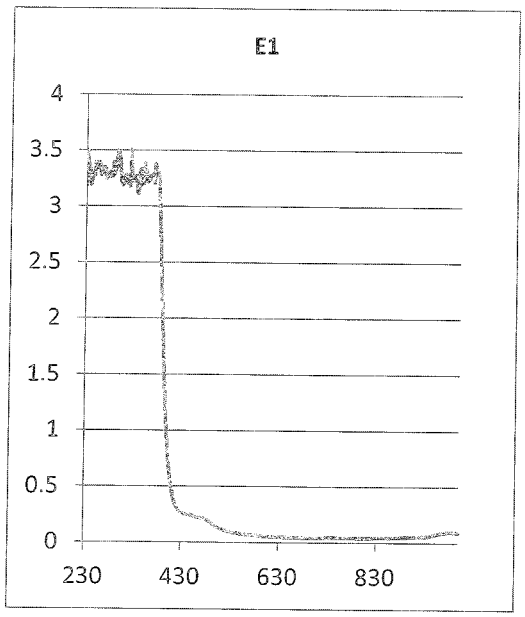
FIG. 8E depicts hickory wood extracted with ethanol, in the dark, at room temperature.
Figure 8F:
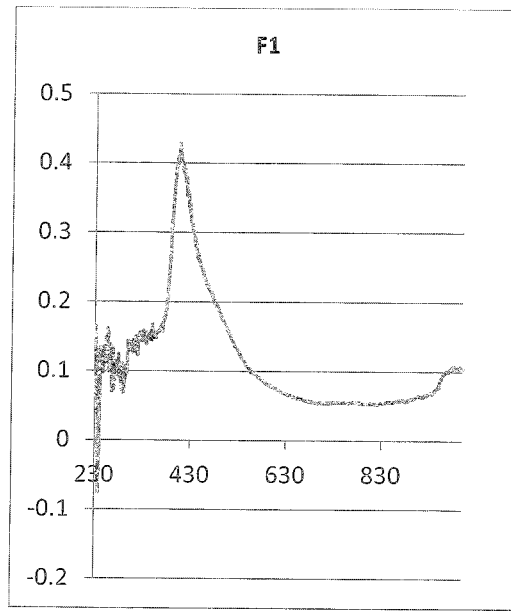
FIG. 8F depicts cedar wood extracted with ethanol, in the dark, at room temperature.
Figure 8G:
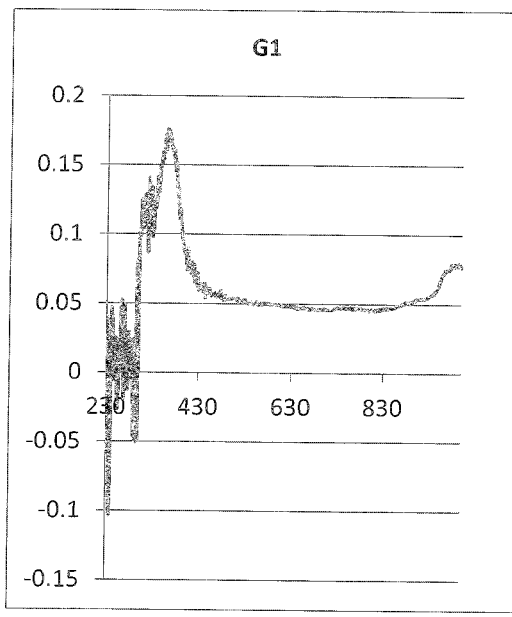
FIG. 8G depicts oak (red) wood extracted with ethanol, in the dark, at room temperature.
Figure 8H:
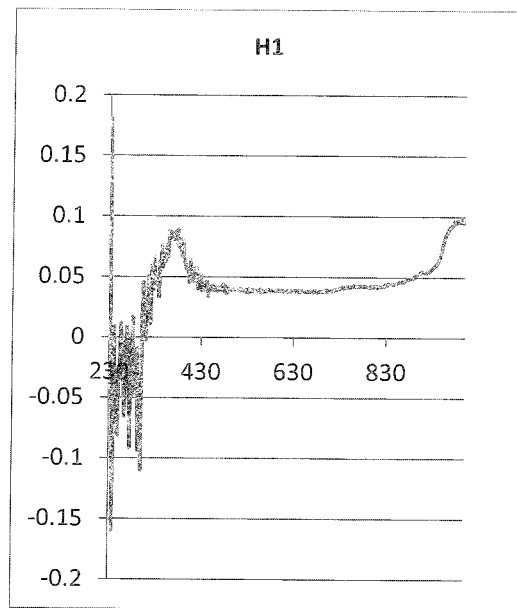
FIG. 8H depicts pine wood extracted with ethanol, in the dark, at room temperature.
Figure 8I:
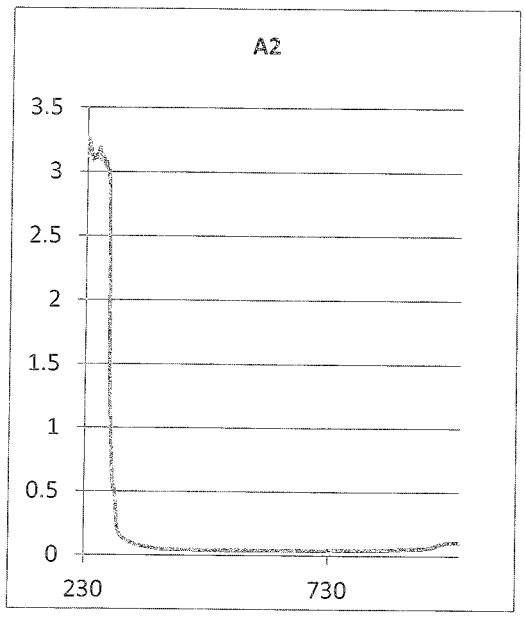
FIG. 8I depicts ethanol control, in the light, at room temperature.
Figure 8J:
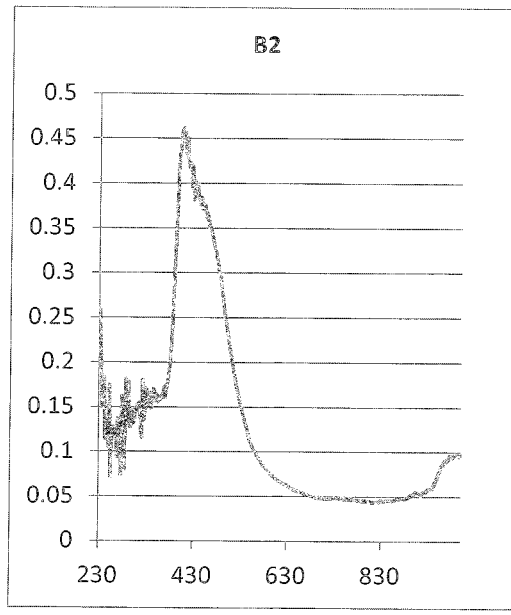
FIG. 8J depicts cherry wood extracted with ethanol, in the light, at room temperature.
Figure 8K:
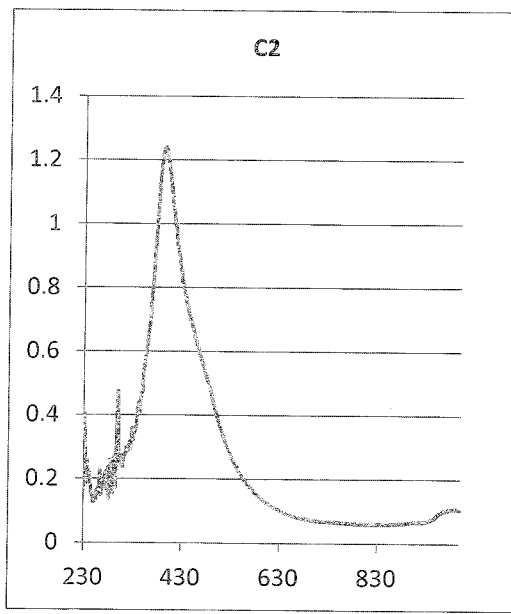
FIG. 8K depicts mesquite wood extracted with ethanol, in the light, at room temperature.
Figure 8L:
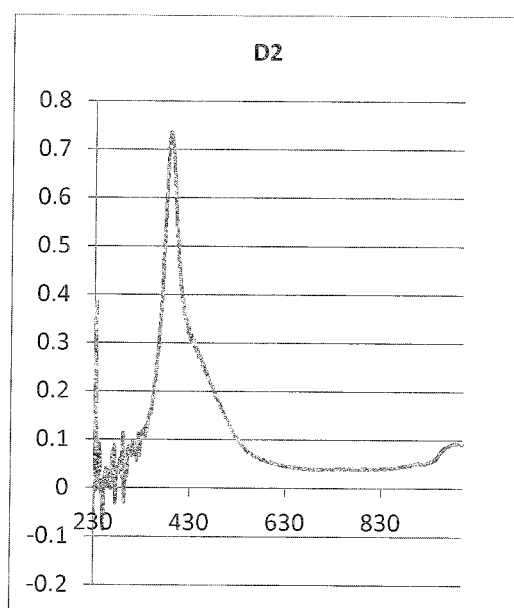
FIG. 8L depicts apple wood extracted with ethanol, in the light, at room temperature.
Figure 8M:
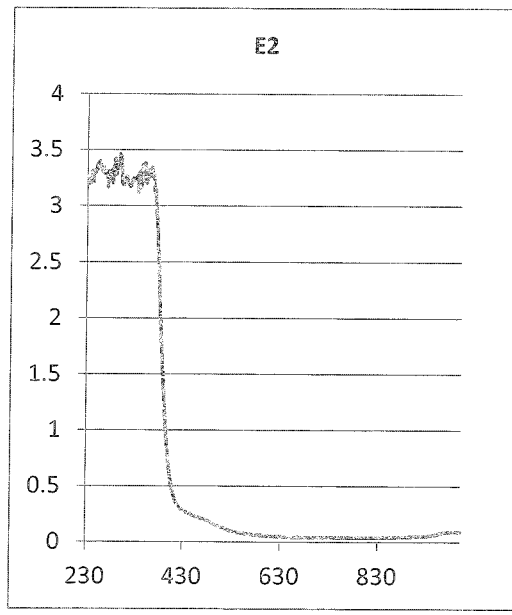
FIG. 8M depicts hickory wood extracted with ethanol, in the light, at room temperature.
Figure 8N:
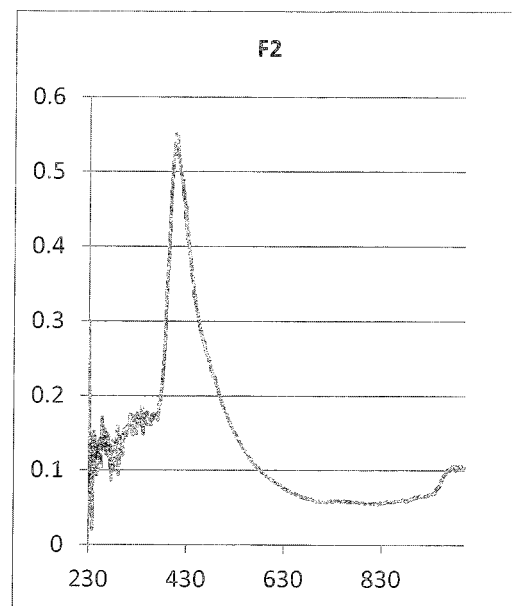
FIG. 8N depicts cedar wood extracted with ethanol, in the light, at room temperature.
Figure 8O:
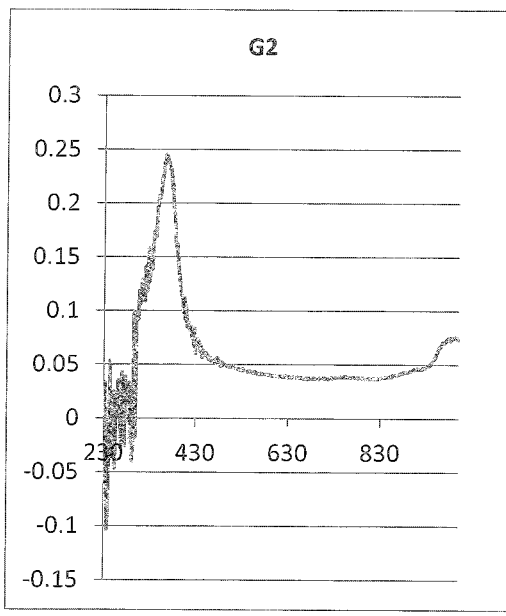
FIG. 8O depicts oak (red) wood extracted with ethanol, in the light, at room temperature.
Figure 8P:
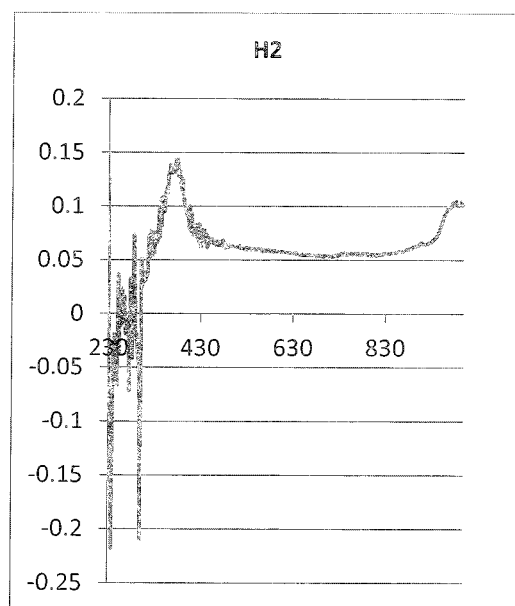
FIG. 8P depicts pine wood extracted with ethanol, in the light, at room temperature.
Figure 8Q:
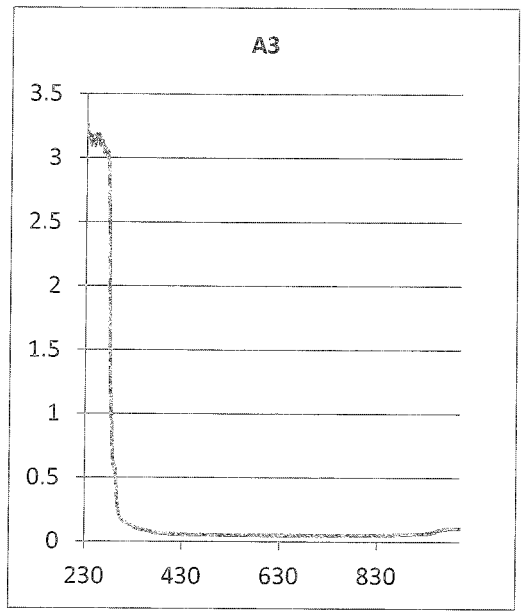
FIG. 8Q depicts ethanol control, in the dark, at heated temperature.
Figure 8R:
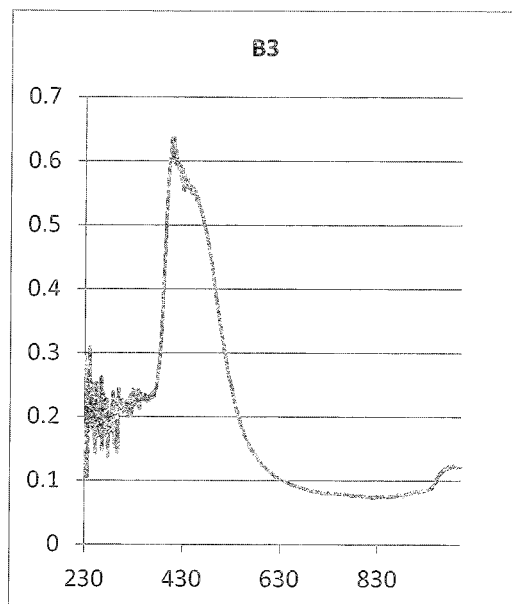
FIG. 8R depicts cherry wood extracted with ethanol, in the dark, at heated temperature.
Figure 8S:
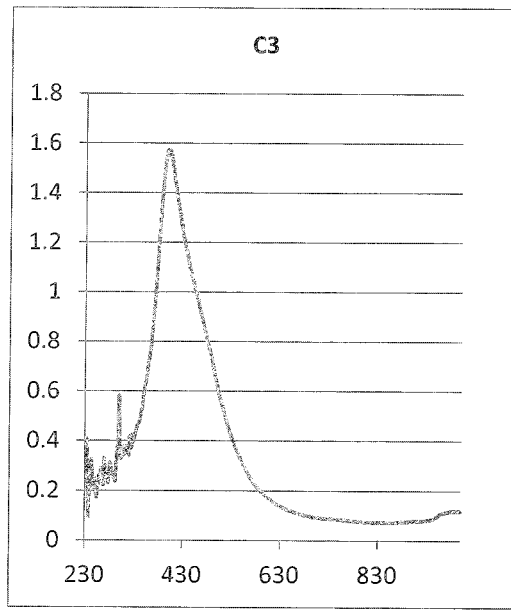
FIG. 8S depicts mesquite wood extracted with ethanol, in the dark, at heated temperature.
Figure 8T:
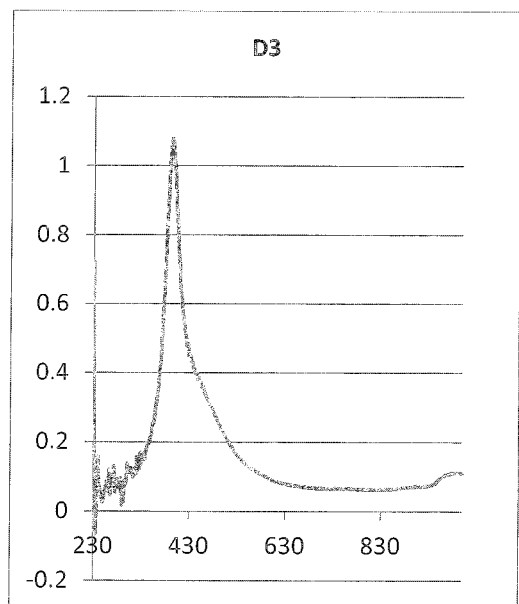
FIG. 8T depicts apple wood extracted with ethanol, in the dark, at heated temperature.
Figure 8U:
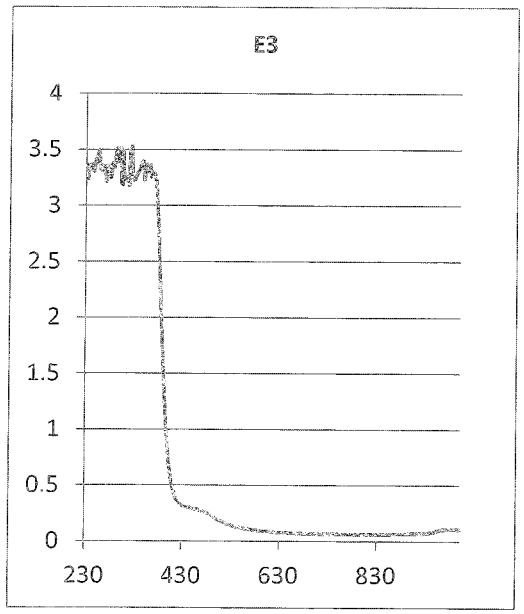
FIG. 8U depicts hickory wood extracted with ethanol, in the dark, at heated temperature.
Figure 8V:
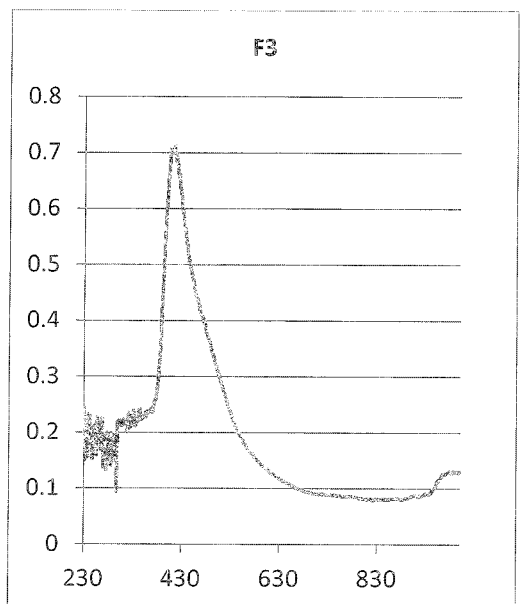
FIG. 8V depicts cedar wood extracted with ethanol, in the dark, at heated temperature.
Figure 8W:
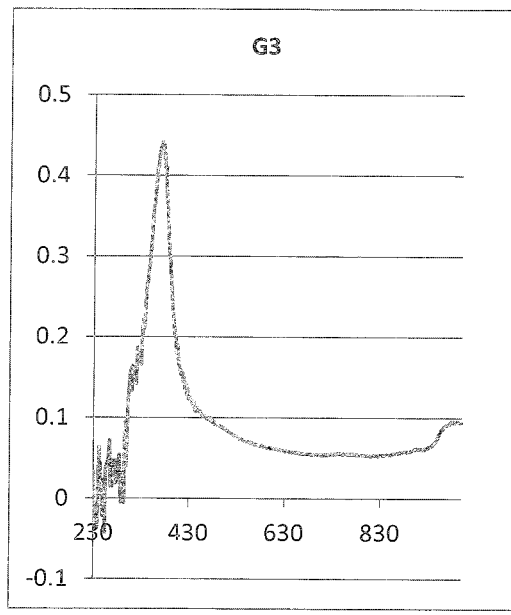
FIG. 8W depicts red oak wood extracted with ethanol, in the dark, at heated temperature.
Figure 8X:
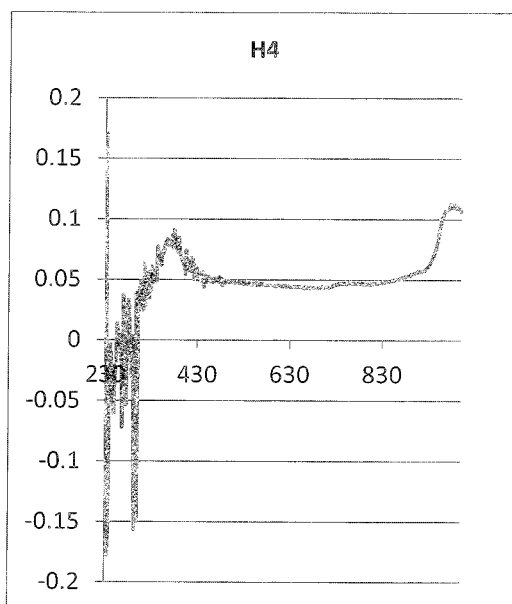

The container is preferably surrounded on the four/all sides and the top by high intensity lights, and more preferably around all sides. Alternatively, the light source can be placed within the reaction liquid, or in a transparent vessel that protects the light source from liquid, such as a glass tube with a sealed bottom and an open top placed within the reaction liquid such that the open top is not in the reaction liquid, but at least part of the glass tube is within the reaction liquid, such as is generally depicted in FIG. 6. Preferred lights are as set forth in the Davis U.S. Pat. Nos. 9,637,712 and 9,637,713 with an output of at least 2,280,000 Lux hours and others are readily available such as those used in the indoor agriculture industry.

Samples of the input solvent are saved, along with liquid only samples taken over time, such as hourly or daily, depending on the desired product or evaluation. Those samples are evaluated by taste and by GC/MS.

The reaction can run to completion, where there is no longer a change in the GC/MS profiles, for example, or to incomplete reaction. Different ages of product can result in different flavor profiles.

In the end, the flavoring of choice can be determined by tasking, and preferably in combination with the GC/MS or other types of analytical testing such as but not limited to routine spectroscopy, notably spectra over a range of wavelengths.

After the extraction is completed, then the product can optionally be finished, such as but not limited to separation of wood from bulk solution by filtering, decanting, centrifugation, pasteurizing, sterilization, similar methods, and a combination thereof.

The final product is bottled in airtight containers and stored at room temperature, or under refrigeration. Containers such as bottles of colored glass can be tinted, such as green or brown, to reduce the transmission of undesired wavelengths of light into the sample which could promote spoiling of the product in the container.

A final product can be pasteurized or sterilized using methods known in the art. Such methods include but are not limited to the use of heat, pressure, radiation, UV light, chemical, mechanical such as sheer force though a nozzle, or a combination thereof or other such methods. Such sterilization or pasteurization can increase shelf life.

The final product can be used as is, or added to other foods or drinks, alcoholic or non-alcoholic. In one example, the product is added to beer (before fermentation, during fermentation, after fermentation, after finishing (such as but not limited to filtering, pasteurizing, sterilizing, bottling, canning, kegging, long term large tank storage, and the like), or a combination thereof) in order to add flavor, and possibly ethanol content, to the beer. Total final ethanol content of the beer can be calculated and determined using analytical chemistry methods and the ethanol level adjusted, if any is present.

Example 2: Flow Through Extraction

Figure 2A:
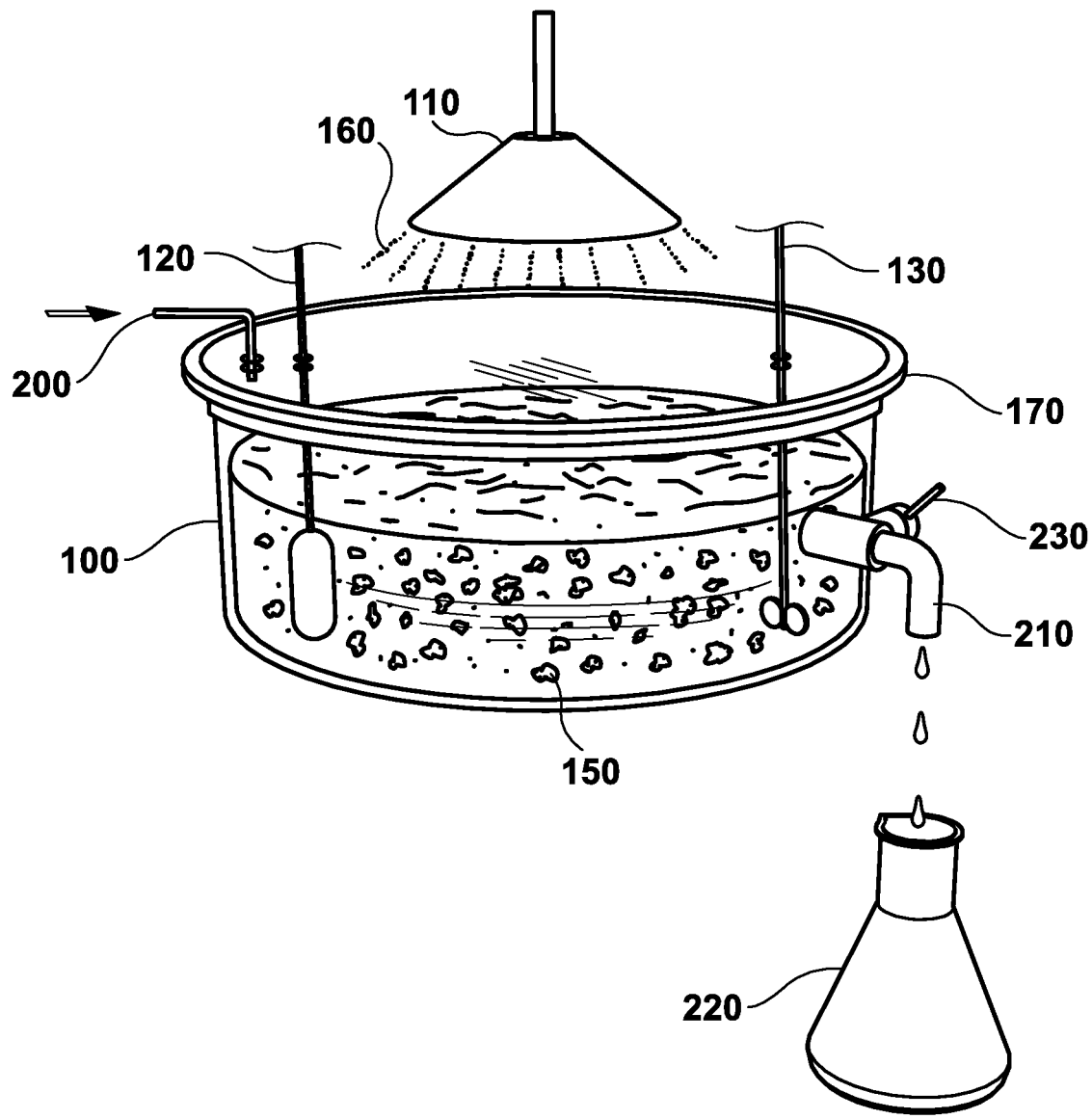
FIG. 2A generally depicts one aspect of the present invention to extract flavorings from wood in a flow through extraction configuration, steady state configuration, as set forth in Example 2. Element numbers are as follows: 200 generally refers to a conduit to allow inflow of materials into the container; 210 generally refers to a conduit to allow outflow of materials from the container; and 220 generally refers to a collection vessel; and 230 refers to a fluid flow regulator, such as but not limited to a stop cock, valve, pump, or other such device.
Figure 5:
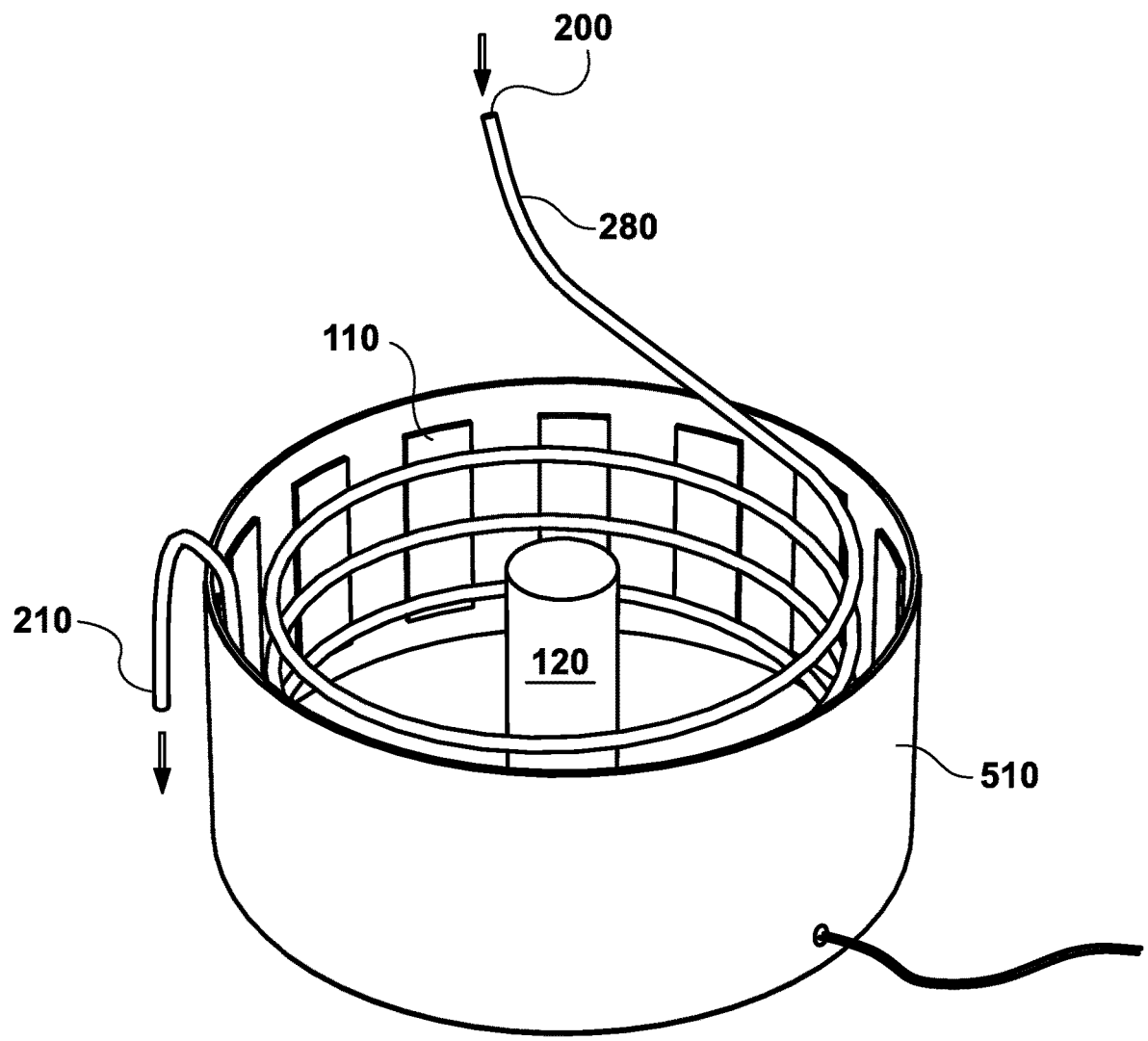
FIG. 5 generally depicts one aspect of the present invention to extract flavorings from wood using a high intensity light configuration with lights on essentially all sides of a flow through configuration using a tube. Columns or other containers, including batch reactions, can also be used in this configuration. Element numbers are as follows: 510 generally refers to a light reaction apparatus having a bank of lights. The lights can provide heat, light, or a combination of both.

This non limiting example establishes that the present invention can be utilized in a flow through configuration. Flow through extraction examples are generally depicted in at least FIG. 2A, FIG. 2B, and FIG. 5.

As opposed to the batch configuration of extraction in Example 1, there are also flow through extraction configurations of the present invention. For these types of configurations, the extraction process is continuous and the flow rate can be adjusted to modify the retention time within a reaction chamber, the ability to alter the composition of inflow materials, and other variables of extraction as well. The continuous nature of the extraction can be done by a variety of configurations, such as but not limited to steady state configuration (such as but not limited to such as chemostat), continuous flow (such as through a flowing reaction tube), reciprocating loops through the same material (effluent becomes influent in this instance), other such configurations as known in the art, and a combination thereof. One benefit of this configuration is flexibility in that the flow rate of the reaction liquid through the can be changed, along with other variables, such as but not limited to changing of the inflow material over time.

A. Steady State Configuration

In a steady state configuration, for example, there is a reservoir acting as a reaction chamber, and inlet to allow entry of new reaction material, and an outlet to remove reacted material. Generally, the volume of the reaction chamber will remain relatively constant while the outflow of reacted materials equals the inflow of new reaction materials. This sort of configuration is reminiscent of a water clock, or a chemostat reactor.

In the present example, the reaction chamber can be the bulk reaction container of Example 1, which would include, but not be limited to, the bulk solution and wood. An inflow of unreacted material, such as but not limited to bulk solution without wood (though wood can be added to the reaction chamber in that manner, or other manners), can flow into the reaction chamber. The inflow of such unreacted material is offset by removal of reacted materials from the reaction chamber. Preferably, in that way, the volume of material in the reaction chamber remains relatively constant.

The reaction takes place at least in part in the reaction container. Notably, light is shone on and/or through the reaction container, the bulk solution, or a combination thereof, as in Example 1.

In a preferred configuration, inflow of material takes place by way of a conduit, such as but not limited to a tube, which deposits materials at the surface, in the middle, or at the bottom of the reaction container. The reaction container is preferably stirred or otherwise agitated to mix the reaction mixture, such as but not limited to by a paddle stirring device. Preferably, the outflow is collected by way of a conduit, such as a tube, notably and preferably as an outflow from or toward the top of the reaction container in order to keep the volume of material in the reaction container relatively constant.

The flow of material into the reaction container, as well as the composition of the unreacted materials into the reaction chamber, can be modified in order to change the residence time of material in the reaction chamber. In that way, the characteristics of the outflow product can be adjusted so that the outflow reaction product is as desired, or can be the basis of experimentation to develop new flavorings and products.

In addition to unreacted liquid material into the reaction chamber, natural products (preferably solid but can be liquid or gas as well) can also be added. Such natural products include but are not limited to wood, other botanicals, and other materials desired in the reaction mixture, such as but not limited to yeast, finings, and other materials associated with the fermenting, brewing, and distilling processes, as well as for food substance processing.

B. Continuous Flow Configuration

In a continuous flow configuration, the reaction container is in the form of a flow through device, such as but not limited to a tube. The tube forms the reaction container and includes the natural products such as but not limited to wood and other solids, as well as reaction fluids. New reaction materials, notably unreacted materials, such as but not limited to unreacted liquid, is added to one end. Pressure (positive pressure, negative pressure, or a combination thereof), or gravity flow, can be used to introduce such unreacted liquid. The unreacted liquid travels through the tube with the wood and the reaction takes place along the way, such as by shining of light on and through the tube. The reacted product, or effluent, exits the other end of the tube and is collected. The residence time in the tube is one variable to consider and the effluent can be monitored for flavoring and chemical composition.

Figure 2B:
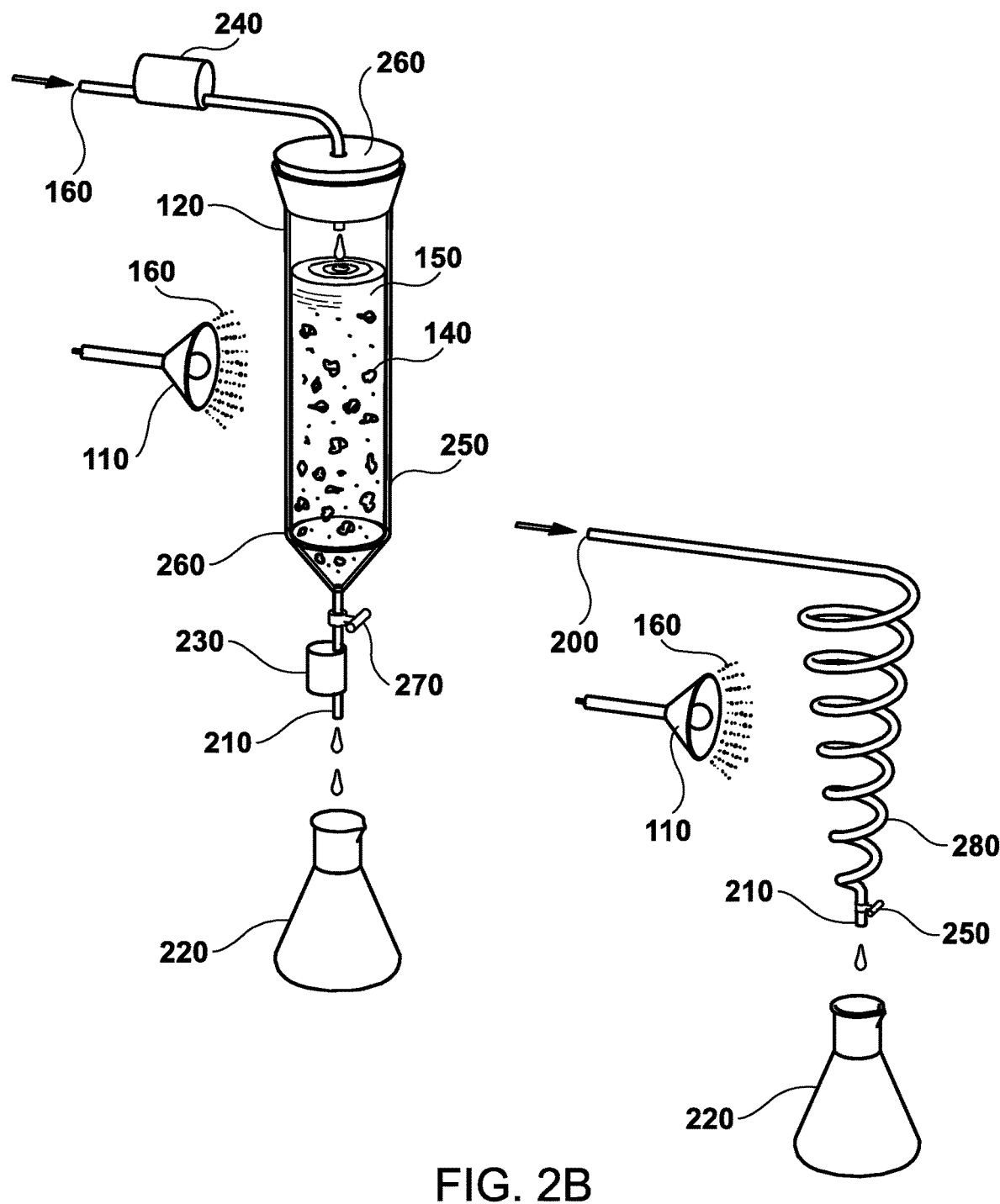
FIG. 2B generally depicts one aspect of the present invention to extract flavorings from wood in a flow through extraction configuration, continuous flow configuration (in a column or tube), as set forth in Example 2. Element numbers are as follows: 240 generally refers to a pump or other fluid flow regulator as generally in 230; 250 generally refers to a reaction column or tube that contains the reaction mixture; 260 generally refers to a filter or sealing structure such as but not limited to sintered glass, a rubber stopper, or the like, or a combination thereof; 270 generally refers to a fluid flow regulator as in 230; and 280 generally refers to a reaction tube that contains the reaction mixture (as opposed to a column) for a flow through configuration.
Figure 3:
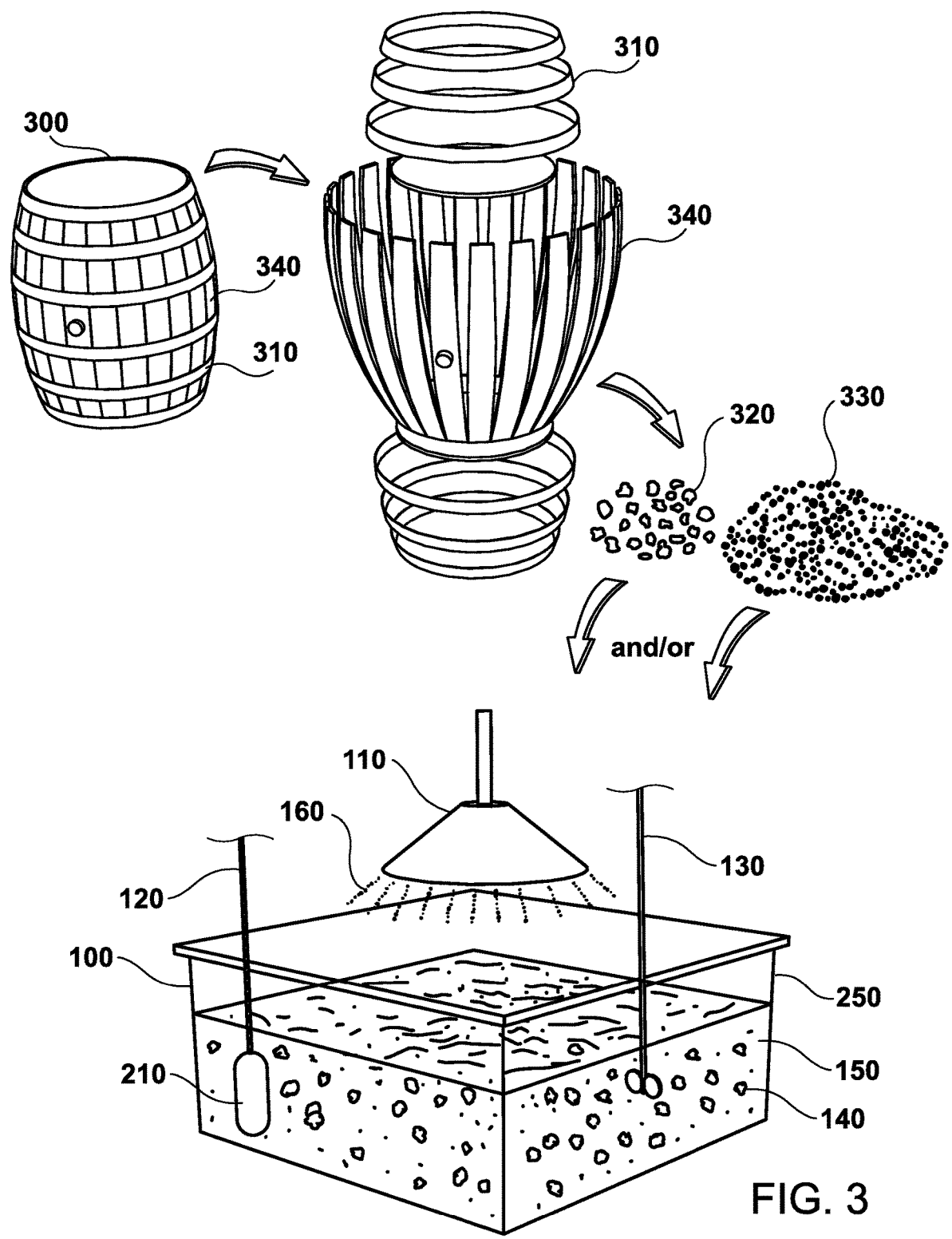
FIG. 3 generally depicts one aspect of the present invention to extract flavorings from wood from a barrel, either unused or used in the brewing, wine making, sake making, mead making, or spirit making industries, or the like, or combinations thereof, as set forth in Example 3 and Example 4. Element numbers are as follows: 300 generally refers to a wooden barrel, used or unused, wet or dry, as per the beer, wine, sake, mead, spirit industries, and the like; 310 generally refers to the metal rings on such a barrel; 320 generally refers to chipped wood from such barrels; 330 generally refers to sawdust from such barrels; and 340 generally refers to the wood slats that make up the barrel.
Figure 4:
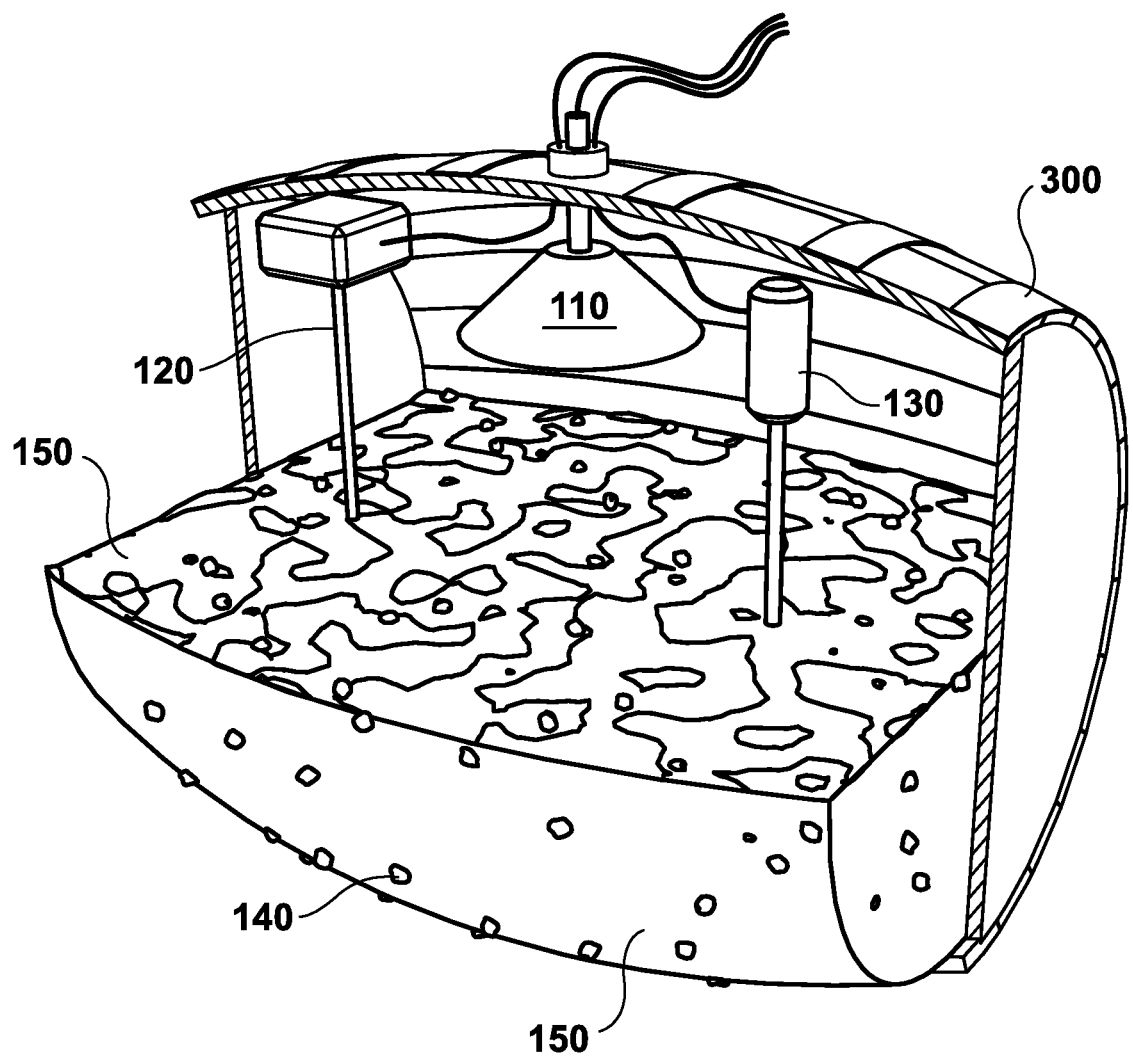
FIG. 4 generally depicts one aspect of the present invention to extract flavorings from wood from a barrel in situ as set forth in Example 3.

Configurations can be similar to those of column chromatography, gas chromatography, HPLC, FPLC, or a combination thereof. For example, FIG. 2B provides a visual description of those types of configurations, which are routinely used in, for example, purification of biological moieties such as proteins and carbohydrates.

The flow of material into the reaction container (in this instance, such as a tube), as well as the composition of the unreacted materials into the reaction chamber, can be modified in order to change the residence time of material in the reaction chamber. In that way, the characteristics of the outflow product can be adjusted so that the outflow reaction product is as desired, or can be the basis of experimentation to develop new flavorings and products.

The reaction takes place at least in part in the reaction container. Notably, light is shone on and/or through the reaction container, the bulk solution, or a combination thereof, as in Example 1 and above in the steady state configuration.

In addition to unreacted liquid material into the reaction chamber, solid materials can also be added. Such natural products such as wood include but are not limited to wood, other botanicals, and other materials desired in the reaction mixture, such as but not limited to yeast, finings, and other materials associated with the fermenting, brewing, and distilling processes, as well as for food substance processing.

Example 3: Wooden Barrel Extraction, In Situ

This non limiting example establishes that the present invention can be utilized within a wooden barrel such as an unused barrel (untreated or treated, such as by charring) or a barrel previously used in the beer, wine, sake, mead, or spirits industry.

In this example, the reaction container is a wooden barrel itself. That wooden barrel is preferably one that can be used to age beer, wine, sake, mead, or spirits, or has already performed that function as a used beer barrel, used wine barrel (such as but not limited to white wine, red wine, or others), a used sake barrel, a used mead barrel, a used spirit barrel (such as but not limited to Bourbon, scotch, tequila, mescal, rum, or others).

The wooden barrel is filled to an appropriate level with ethanol (or water, a combination of water and ethanol, or other solvents), preferably 80 proof or higher, such as unflavored generic vodka or industrial ethanol. The ethanol, when present, of course should not be denatured or otherwise adulterated.

The at least one source of light can be provided within the barrel itself. For example, a light bulb can be place within the barrel in an air space, or within the bulk solution using appropriate lighting materials, or in an air chamber within the bulk solution.

The temperature of the reaction solution can be controlled by way of devices as are known in the art. For example, a fish tank heater, or other devices, can be used to keep the temperature of the reaction solution at a desired temperature or range of temperatures, and can be programmed or otherwise changed to change the temperature of the reaction solution.

The pressure inside of the reaction container can be modulated and monitored using materials and methods described herein and as known in the art.

The extraction of the wood in the barrel takes place as in Example 1 and other Examples, and the specification as a whole as well.

This configuration can be used for the bulk reaction, bulk extractions, and flow through extractions (such as but not limited to steady state extraction and flow through extraction) configurations of the examples and otherwise set forth herein.

Example 4: Wooden Barrel Extraction, Dismantled, Broken, Cut Up, Chipped or Saw Dusted This non limiting example establishes that the present invention can be utilized using dismantled, broken, cut up, chipped or saw dusted unused barrels or barrels that have been previously used in the beer, wine, sake, mead, or spirits in bulk solution configuration.

In this instance, the wood in the new or used barrels themselves, or portions or combinations thereof, are used as the wood for the extraction reactions. Barrels that have been charred for use, or otherwise pre-treated before introduction of beer, wine, sake, mead, or spirits, can also be used. Wood that has been charred or pretreated can be used as well, being prior to the effort to make the barrels themselves.

The barrels are preferably dismantled and not wooden materials removed. The resulting wood can be used in the reaction vessel as is, or can be chipped or broken up or cut up to a desired size, preferably about 1 in cubed in volume, but any size can be used. The barrels can be reduced to sawdust as well.

This woodstock can be used in any of the extraction configurations and methods set forth herein, either alone or in combination. A preferred configuration is to have the wood chips from barrels being pre-treated by soaking in the home spirit/wine/sake/mead/beer/other food or beverage (what the original container had within it prior to being used in the present invention), or a not home spirit/wine/sake/ mead/beer/other food or beverage. For example, a home spirit for Jack Daniel's® used barrels would be Jack Daniels® Bourbon.

Example 5: In Situ Beer Fermentation

This non limiting example establishes that the present invention can be utilized for in situ beer fermentation.

In this example, the beer fermentation process is performed using the hardware, materials, and methods of the present invention. In short, the fermentation mix that would go into large tanks for fermentation would be used as the starting reaction mixture, including yeast, for the extraction methods set forth herein.

Furthermore, an extract of the present invention can be added at any time during the fermentation process. For example, but not limited to during the setup, heat to boil, the boil, cooling, and when in the fermentation container and before yeast is added. The extracts an also be added after yeast is added at any time.

Is it believed that flavor profiles of the extracts of the present invention can be altered during the fermentation process, which has been noted in the Examples section below. It is possible that chemical or biochemical reactions are involved in these changes, noting that the inventors are not wishing to be bound to any particular mechanism or mode of action. Such changes can be desirable and undesirable, can be reduced by adding the extract later in the fermentation process, or after fermentation is complete, or before bottling/canning/kegging/storing, or after dispensing for consumer consumption, such as an added tincture or flavor additive.

Example 6: Unfinished Beer Additive

This non limiting example establishes that the present invention can be utilized for unfinished beer, being before fermentation is complete or substantially complete, but before bottling, canning, kegging, large volume long term storage containers, a combination thereof, or other storage methods. In this example, beer that is partially fermented, with our without yeast being present, is used as the bulk solution. In that way, the unfinished beer, is in that way "aged" using the methods of the present invention to enhance the flavor profile of the beer.

Example 7: Beer Ageing Mimetic

This non limiting example establishes that the present invention can be utilized for beer "ageing" that is accomplished by adding the extract to beer to result in flavor profiles consistent with long term barrel or other ageing. In this example, beer that has been made to completion or near completion is used as the bulk solution in the methods of the present invention. In that way, the finished, or unfinished beer, is in that way "aged" using the methods of the present invention to enhance the flavor profile of the beer.

Example 8: Finished Beer Additive

This non limiting example establishes that the present invention can be utilized for finished beer in the form of an additive to beer. Finished beer referring to after fermentation is complete or substantially complete, and before or after bottling, canning, kegging, large volume long term storage containers, a combination thereof, or other storage methods. In this example, a product of the methods of the present invention is used to add flavoring and optionally alcohol content, to beer. In short, the product of the methods of the present invention are a flavoring additive which can be used to add to solutions that are to be fermented, are in the process of fermentation, are finished fermenting, or are dispensed and ready to be served. The solution can be added before bottling/kegging/long term storage containers, or after, and can be added to beer after being dispensed for consumption from a bottle, keg, or other storage container (similar to a "pump" of flavoring extract added to a coffee at a coffee shop. When adding an extract of the present invention to beer, the alcohol content of the added materials (if any) and the new product need to be taken into account if there is alcohol present in the added materials such as an extract of the present invention. However, not all extracts of the present invention contain ethanol or other solvents. A preferred solvent is water alone. See, for example, Example 12 through Example 17.

Example 9: Wine, Spirits, and Food/Beverage Additive

This non limiting example establishes that the present invention can be utilized for wine, sake, mead, spirits, and food or other alcoholic or non-alcoholic beverages. The methods described herein, notably but not limited to beer, can also be used for wine, sake, mead, spirits, and food. As the processes and products of the present invention are flavorings, they can be added to essentially any food or beverage.

Example 10: Light and Dark Considerations

This non limiting example establishes certain conditions to be aware of as to the effects of light on food and beverages.

It is known that light, notably but not exclusively UV light, can cause degradation of a food or beverage product. Notably, in the instance of beer, UV light can cause off flavors to develop. This is sometimes known as "skunking" and is avoided by the use of brown or green bottles for storing beer. One needs to be mindful of this phenomenon and take precautions not to produce off flavorings in the product while using the present invention.

Variables to consider include but are not limited to light intensity, time of exposure to light, the wavelength of light, and the like.

For these examples at least, "dark" for storage refers to storage at room temperature in a household cabinet, or in a household kitchen refrigerator with a light that turns on when the door is opened, which is under normal use. "Dark" for extraction refers to being exposed to normal household kitchen light, with a window, taking care to have the containers and reaction chambers covered, with light blocking, opaque, or clear material. "Light" refers to the purposeful exposure to high levels of light of defined characteristics as opposed to ambient light as described above.

Example 11: Preferred Wood Extracts, Methods of Making, and Beer that Includes the Wood Extract This non limiting example establishes one aspect of preferred wood extracts, methods of making same, and beer that includes the wood extracts.

The methods of the Examples above, such as Example 1 and Example 8. Generally, the wooden barrel is scraped of the inside about 0.25 inches to about 0.5 inches of wood, notably the layer of wood that is discolored due to the introduction of wine or sake or mead or spirits, the aging of the wine or sake or mead or spirits, and any pre-treatment of the internal surface of the wooden barrel, such as by charring. That wood is placed in a reaction chamber with ethanol, 80 proof or higher (such as generic unflavored vodka). A fish tank heater, or other source of heat described herein or known or available in the art, is used to control temperature, and a paddle stirring device is used to agitate the mixture over time. The light source is preferably LED (relatively low heat emitted) or incandescent (relatively high heat emitted) based light that can deliver at least about 2,280,000 Lux hours.

The reaction is run for between about 1 and about 20 days, and a sample taken every day (and a sample of the untreated ethanol (or water or other solvents or combination of solvents) is held back for analysis and comparison later as a control). The samples are taste tested and analyzed by GC/MS. The samples are also added to a variety of beers, such as of differing aggressiveness in flavors (such as light, amber, red, stout, and the like) in an amount that increases the alcohol content of the beer 1%, 2%, or 3% to make supplemented beer when ethanol is present in the extracts, though no ethanol or other solvents other than water are a preferred aspect of the present invention.

The supplemented beer is subjected to taste testing and also analysis by GC/MS, along with appropriate controls.

The results of the taste testing identify various variables and products that lead to other screens for desirable variables as set forth herein.

The most desired methods and products are identified and the resulting methods are then scaled up to larger volumes according to the Examples herein and the specification in general.

Example 12: Evaluation of Dark, Light, Sealed Containers and Heat on Ethanol Extraction of Various Woods This non limiting example establishes one aspect of preferred materials and method for evaluation of dark, light, and heat on ethanol extraction of various woods. Also addressed are various screening methods associated therewith. In general, 1 liter (L) is assumed for the purpose of these "kitchen chemistry" type experiments to be equivalent to 1 Quart, and that equivalence is used for various reports and calculations thought this document.

Unless otherwise apparent from the writings themselves, the working examples that follow are mostly "kitchen chemistry," that is using that type of facility and instrumentation. As such, the values presented are approximate, believed to be accurate to within about 5% of the indicated value. Also, the Taste Tests are somewhat subjective in nature, and during taste tests there can be some adding of a bit more extract or diluent by the taster or group of tasters along the way, being the norm for such things in the industry in general, and the stated dilutions are believed to be accurate to about 10% of the indicated value.

A. Effects of Ethanol at Room Temperature in Dark, Sealed Containers, on Extraction of Various Woods
  Materials:
  Ethanol: Fleishmann's Vodka, 80 proof (40% ethanol)
  Woods:
  Cherry: Kingsford Smoking Chips
  Mesquite: Kingsford Smoking Chips
  Apple: Weber Fire Spice
  Hickory: Weber Fire Spice Cedar (a): Wood Grilling Plank, The Companion Group
Oak, Red (a): Home Depot, 1"×¼" hobby board
Pine (a): Home Depot, 1"×½" hobby board
All woods are chunked, except for (a), which were cut into about 1" segments for use in experiments.
Containers:
Ball Jars (Canning Jars with red rubber gaskets for sealing integral to cap) 8 oz or 237 ml.
Procedure:
Clean containers, rims, and sealing lids win warm soapy water.
Weight out about 10 gm dry weight of wood, unless otherwise indicated.
Put wood in container.
Add ethanol (40%) to containers up to about ¼" to top to form a small head space.
Seal containers to finger tight
Conditions:
Dark in a cabinet at room temperature.

| Sample | Description |
| --- | --- |
| 1 | Control, Ethanol only |
| 2 | Cherry, Ethanol |
| 3 | Mesquite, Ethanol |
| 4 | Apple, Ethanol |
| 5 | Hickory, Ethanol |
| 6 | Cedar, Ethanol |
| 7 | Oak - Red, Ethanol |
| 8 | Pine, Ethanol |

Extraction:
Containers were evaluated visually every 24 hours for 10 days. After the 10 days, the results were as follows:

| Sample | Comments after 10 days' time |
| --- | --- |
| 1. | Clear liquid |
| 2. | Light Brown liquid, wood sinks |
| 3. | Medium Brown liquid, wood sinks, precipitate/hazy |
| 4. | Medium Brown liquid, wood sinks, ppt/hazy |
| 5. | Light Brown liquid, wood sinks, ppt/hazy |
| 6. | Light Brown liquid, wood floats, ppt/hazy |
| 7. | Very Light Brown liquid, wood sinks, ppt/hazy |
| 8. | Clear liquid, wood floats, ppt/hazy |

After the 10 days, about 7 oz of the liquid only, screened to remove large wood particles and the like, were collected after shaking the container, and stored in an 8 oz Ball Jar. The original Ball Jars with the remaining liquid and wood were retained.
Taste Tests:
Small 10 day samples were tasted undiluted or "neat," or 1:4 (1 part sample plus 4 parts beer (beer being Green Flash Brewery (San Diego, Calif.) Blonde Ale.

| Sample | Neat or In Beer | Comments |
| --- | --- | --- |
| 1 | Neat | Hot, Harsh |
|   | 1:4 Beer | Tastes of beer, a little vodka flavor |
| 2 | Neat | Smoother than 1 |
|   | 1:4 Beer | Beer plus some other flavor |
| 3 | Neat | Smoother than 1, some unique flavors |
|   | 1:4 Beer | Beer plus some flavors |
| 4 | Neat | Noticeably smoother than 1, some flavors |
|   | 1:4 Beer | Beer plus some flavor |
| 5 | Neat | Noticeably smooth than 1, some flavors |
|   | 1:4 Beer | Beer plus some flavor |
| 6 | Neat | Smooth, very noticeable flavors |
|   | 1:4 Beer | Beer plus cedar flavoring |
| 7 | Neat | Smooth, noticeable flavors |
|   | 1:4 Beer | Beer plus some oak flavors, smooth |
| 8 | Neat | Smooth, noticeable flavors |
|   | 1:4 Beer | Beer with some flavors, smooth |

Spectral Analysis:
Liquid samples were subjected to spectral analysis in a 96 well spectrophotometer. The layout of samples in the 96 well configuration are provided in FIG. 7. Results are provided in FIG. 8.
Conclusion:
Wood flavors can be extracted within 10 days with Ethanol in the Dark at Room Temperature.
B. Effects of Ethanol at Room Temperature, Sealed Containers, with Full Spectrum Grow Light on the Extraction of Various Woods
Materials:
Same as Example 12 A above.
Woods:
Same as Example 12 A above, but Oak 15 gm, and Pine 21 gm (due to special considerations to get wood in the container so that light would strike the wood.
Containers:
Same as Example 12 A above.
Procedure:
Same as Example 12 A above.
Lighting:
LED Plant Grow Light 449 nm-630 nm Low Heat "Spot Light" configuration, 9 Watts (LED), Full Spectrum, FEIT Electric Item #BR30/GROW/LEDG2.
Conditions:
Jars as close to sides of jars as possible, 24 hours per day, at room temperature.
Light is cool and does not increase temperature of the sample jars.
Incident light on outside of jar surface about 9,000 LUX.
Incident light on inside of jar surface about 9,000 LUX.
Light LUX measured with house plant light meter

| Sample | Description |
| --- | --- |
| 9 | Control, Ethanol only |
| 10 | Cherry, Ethanol |
| 11 | Mesquite, Ethanol |
| 12 | Apple, Ethanol |
| 13 | Hickory, Ethanol |
| 14 | Cedar, Ethanol |
| 15 | Oak - Red, Ethanol |
| 16 | Pine, Ethanol |

Extraction:
Containers were evaluated visually every 24 hours for 10 days. After the 10 days, the results were as follows:

| Sample | Comments after 10 days' time |
| --- | --- |
| 9. | Clear liquid |
| 10. | Medium Brown liquid, wood sinks |
| 11. | Medium Brown liquid, wood sinks, precipitate/hazy |
| 12. | Light Brown liquid, wood sinks, ppt/hazy |
| 13. | Light Brown liquid, wood sinks, ppt/hazy |
| 14. | Light Brown liquid, wood floats, ppt/hazy |

-continued

| Sample | Comments after 10 days' time |
|---|---|
| 15. | Very Light Brown liquid, wood sinks, ppt/hazy |
| 16. | Clear liquid, wood floats, ppt/hazy |

After the 10 days, about 7 oz of the liquid only, screened to remove large wood particles and the like, were collected after shaking the container, and stored in an 8 oz Ball Jar. The original Ball Jars with the remaining liquid and wood were retained.

Taste Tests:

Small 10 day samples were tasted undiluted or "neat," or 1:4 (1 part sample plus 4 parts beer (beer being Green Flash Brewery (San Diego, Calif.) Blonde Ale.

| Sample | Neat or In Beer | Comments |
|---|---|---|
| 9 | Neat | Hot, Harsh |
|  | 1:4 Beer | Tastes of beer, pleasant |
| 10 | Neat | Harsh, some flavors noted |
|  | 1:4 Beer | Beer plus some other flavor |
| 11 | Neat | Smoother than 9, some unique flavors |
|  | 1:4 Beer | Beer plus some flavors, pleasant |
| 12 | Neat | Noticeably smoother than 9, some flavors |
|  | 1:4 Beer | Beer plus some flavor, pleasant |
| 13 | Neat | Smooth, some flavors |
|  | 1:4 Beer | Beer plus some flavor, pleasant |
| 14 | Neat | Smooth, very noticeable flavors |
|  | 1:4 Beer | Beer plus cedar flavoring |
| 15 | Neat | Smooth, noticeable flavors |
|  | 1:4 Beer | Beer plus some oak flavors, smooth |
| 16 | Neat | Smooth, noticeable flavors |
|  | 1:4 Beer | Beer with some flavors, smooth |

Spectral Analysis:

Liquid samples were subjected to spectral analysis in a 96 well spectrophotometer. The layout of samples in the 96 well configuration are provided in FIG. 7. Results are provided in FIG. 8.

Conclusion

Wood flavors can be extracted within 10 days with Ethanol With Full Spectrum Light at Room Temperature.

C. Effects of Ethanol with Heat in the Dark, Sealed Containers, on the Extraction of Various Woods Materials:

Same as Example 12 A above.

Woods:

Same as Example 12 A above, but Oak 15 gm, and Pine 21 gm (due to special considerations to get wood in the container so that light would strike the wood.

Containers:

Same as Example 12 A above.

Procedure:

Same as Example 12 A above.

Heat Source:

Double boiler set up.

Conditions:

Between about 150 F and about 170 F, about 2 hours per day for a total of 20 hours of heat over 10 days' time. Jars were stored in the dark in a cabinet when not heating or cooling.

| Sample | Description |
|---|---|
| 17 | Control, Ethanol only |
| 18 | Cherry, Ethanol |
| 19 | Mesquite, Ethanol |
| 20 | Apple, Ethanol |
| 21 | Hickory, Ethanol |
| 22 | Cedar, Ethanol |
| 23 | Oak - Red, Ethanol |
| 24 | Pine, Ethanol |

Extraction:

Containers were evaluated visually every 24 hours for 10 days. After the 10 days, the results were as follows:

| Sample | Comments after 10 days' time |
|---|---|
| 17. | Cloudy, hazy |
| 18. | Medium Brown liquid, wood sinks, hazy |
| 19. | Dark Brown liquid, wood sinks, very/hazy |
| 20. | Light Brown liquid, wood sinks, ppt/hazy |
| 21. | Light Brown liquid, wood sinks, ppt/hazy |
| 22. | Light Brown liquid, wood floats, ppt/hazy |
| 23. | Light Brown liquid, wood sinks, ppt/hazy |
| 24. | Very Light Brown liquid, wood floats, ppt/hazy |

After the 10 days, about 7 oz of the liquid only, screened to remove large wood particles and the like, were collected after shaking the container, and stored in an 8 oz Ball Jar. The original Ball Jars with the remaining liquid and wood were retained.

Taste Tests:

Small 10 day samples were tasted undiluted or "neat," or 1:4 (1 part sample plus 4 parts beer (beer being Green Flash Brewery (San Diego, Calif.) Blonde Ale.

| Sample | Neat or In Beer | Comments |
|---|---|---|
| 17 | Neat | Hot, Harsh |
|  | 1:4 Beer | Tastes of beer and a little more |
| 18 | Neat | Smooth, some cherry flavors noted |
|  | 1:4 Beer | Beer plus some other flavor |
| 19 | Neat | Smoother than 10, some mesquite flavors |
|  | 1:4 Beer | Beer plus some mesquite flavors, smoky |
| 20 | Neat | A bit harsh, some flavors |
|  | 1:4 Beer | Beer plus some flavor, pleasant |
| 21 | Neat | A bit harsh, some flavors |
|  | 1:4 Beer | Beer plus some flavor, pleasant |
| 22 | Neat | Smoother, very noticeable cedar flavors |
|  | 1:4 Beer | Beer plus cedar flavoring |
| 23 | Neat | Noticeable oak flavors, smooth |
|  | 1:4 Beer | Beer plus some oak flavors, pleasant |
| 24 | Neat | Smooth, noticeable flavors, pleasant |
|  | 1:4 Beer | Beer with some flavors, smooth |

Spectral Analysis:

Liquid samples were subjected to spectral analysis in a 96 well spectrophotometer. The layout of samples in the 96 well configuration are provided in FIG. 7. Results are provided in FIG. 8.

Conclusion

Wood flavors can be extracted within 10 days with Ethanol With Heat and Dark.

D. Screening Methods

The above non limiting examples establish screening methods to evaluate various woods or other biological materials for extraction of flavors under a variety of conditions. The resulting extracts can be added to a variety of food and beverages, or used as is, with or without the wood being present in the samples. The results assist in further developing extract of desired characteristics when provided as is or when provided in food or beverages.

As an example, in these experiments, the screen identified mesquite, cedar, and oak as particularly interesting woods, and the light and heat/dark experiments show that those extraction methods are more robust than in the dark alone. Other woods of particular interest were cherry, apple, and pine. Some woods can be desirable as to their established taste, such as pine, which is relatively high in resin and has a desirable flavor profile. Conditions that favor preferred extracts can be tailored for such woods and other botanical samples as well.

E. Effects of Ethanol with Heat and Light, Sealed Containers, on the Extraction of Various Woods Materials:
Same as Example 12 A above.
Woods:
Same as Example 12 A above, but Oak can be about 15 gm, and Pine can be about 21 gm (due to special considerations to get wood in the container so that light would strike the wood.
Containers:
Same as Example 12 A above.
Procedure:
Same as Example 12 A above.
Heat Source:
Double boiler set up.
Light Source:
Same as Example 12 B above.
Conditions:
Between about 150 F and about 170 F, about 2 hours per day for a total of 20 hours of heat over 10 days' time. Jars are stored under lighting as per Example 12 B above when not heating or cooling.

| Sample | Description |
| --- | --- |
| A | Control, Ethanol only |
| B | Cherry, Ethanol |
| C | Mesquite, Ethanol |
| D | Apple, Ethanol |
| E | Hickory, Ethanol |
| F | Cedar, Ethanol |
| G | Oak - Red, Ethanol |
| H | Pine, Ethanol |

Extraction:
Containers are evaluated visually every 24 hours for 10 days. After the 10 days, the results are as follows:
The samples are thought to behave about the same as in Example 12 C with a potential additive or desirable synergistic effect as to Example 12 B.
After the 10 days, about 7 oz of the liquid only, screened to remove large wood particles and the like, are collected after shaking the container, and stored in an 8 oz Ball Jar. The original Ball Jars with the remaining liquid and wood are retained.
Taste Tests:
Small 10 day samples are tasted undiluted or "neat," or 1:4 (1 part sample plus 4 parts beer.
The samples are thought to behave about the same as in Example 12 C with a potential additive or desirable synergistic effect as to Example 12 B.

Example 13: Evaluation of Dark, Light, and Heat, Sealed Containers, on Water Extraction of Various Woods This non limiting example establishes one aspect of preferred materials and method for evaluation of dark, light, and heat on water extraction of various woods. Also addressed are various screening methods associated therewith.

A. Effects of Water at Room Temperature in Dark, Sealed Containers, on Extraction of Various Woods Materials:
Water: Filtered water for water dispenser at Vons Grocery Store, San Diego, Calif.
Woods:
Cherry: Kingsford Smoking Chips
Mesquite: Kingsford Smoking Chips
Apple: Weber Fire Spice
Hickory: Weber Fire Spice
Cedar (a): Wood Grilling Plank, The Companion Group
Oak, Red (a): Home Depot, 1"×¼" hobby board
Pine (a): Home Depot, 1"×½" hobby board
All woods are chunked, except for (a), which were cut into about 1" segments for use in experiments.
Containers:
Ball Jars (Canning Jars with red rubber gaskets for sealing integral to cap) 8 oz or 237 ml.
Procedure:
Clean containers, rims, and sealing lids win warm soapy water.
Weight out about 10 gm dry weight of wood, unless otherwise indicated.
Put wood in container.
Add water to containers up to about ¼" to top to form a small head space.
Seal containers to finger tight
Conditions:
Dark in a cabinet at room temperature.

| Sample | Description |
| --- | --- |
| 25 | Control, Water only |
| 26 | Cherry, Water |
| 27 | Mesquite, Water |
| 28 | Apple, Water |
| 29 | Hickory, Water |
| 30 | Cedar, Water |
| 31 | Oak - Red, Water |
| 32 | Pine, Water |

Extraction:
Containers were evaluated visually every 24 hours for 10 days. After the 10 days, the results were as follows:

| Sample | Comments after 5 days' and 10 days' time |
| --- | --- |
| 25. | Clear liquid |
| 26. | Very Light Brown liquid, wood sinks, ppt/hazy |
| 27. | Light Brown liquid, wood sinks/floats, ppt/hazy |
| 28. | Light Brown liquid, wood sinks, ppt/hazy |
| 29. | Very Light Brown liquid, wood sinks, ppt/hazy |
| 30. | Very Light Brown liquid, wood floats, ppt/hazy |
| 31. | Very Light Brown liquid, wood sinks, ppt/hazy |
| 32. | Clear liquid, wood floats, hazy |

After the 10 days, about 7 oz of the liquid only, screened to remove large wood particles and the like, were collected after shaking the container, and stored in an 8 oz Ball Jar. The original Ball Jars with the remaining liquid and wood were retained.

For all wood samples in this section, what is at least somewhat likely microbial contamination was noted (turbidity for example) by the end of the extraction period, though taste tests were performed before such presumptive microbial contamination was detected.

Taste Tests:

Small 5 day samples were tasted undiluted or "neat," or 1:4 (1 part sample plus 4 parts beer (beer being Green Flash Brewery (San Diego, Calif.) Blonde Ale. Taste test at 10 days was not possible due to what is somewhat likely to be microbial contamination.

| Sample | Neat or In Beer | Comments |
|---|---|---|
| 25 | Neat | Water |
|  | 1:4 Beer | Not done |
| 26 | Neat | Slight flavors |
|  | 1:4 Beer | Not done |
| 27 | Neat | Some smoky flavors |
|  | 1:4 Beer | Note done |
| 28 | Neat | Some wood flavors |
|  | 1:4 Beer | Not done |
| 29 | Neat | Some wood flavors |
|  | 1:4 Beer | Not done |
| 30 | Neat | Clear cedar wood flavors |
|  | 1:4 Beer | Not done |
| 31 | Neat | Some wood flavors |
|  | 1:4 Beer | Not done |
| 32 | Neat | Some flavors noted |
|  | 1:4 Beer | Not done |

Spectral Analysis:

Liquid samples were subjected to spectral analysis in a 96 well spectrophotometer. The layout of samples in the 96 well configuration are provided in FIG. 7. Results are provided in FIG. 8.

Conclusion

Wood flavors can be extracted within 10 days with Water in the Dark at Room Temperature.

B. Effects of Water at Room Temperature, Sealed Containers, with Full Spectrum Grow Light on the Extraction of Various Woods Materials:
Same as Example 13 A above.

Woods:
Same as Example 13 A above, but Oak can be 15 gm, and Pine can be 21 gm (due to special considerations to get wood in the container so that light would strike the wood.

Containers:
Same as Example 13 A above.

Procedure:
Same as Example 13 A above.

Lighting:
LED Plant Grow Light 449 nm-630 nm Low Heat "Spot Light" configuration, 9 Watts (LED), Full Spectrum, FEIT Electric Item #BR30/GROW/LEDG2.

Conditions:
Light source as close to sides of jars as possible, 24 hours per day, at room temperature.

Light is cool and does not increase temperature of the sample jars.

Incident light on outside of jar surface about 9,000 LUX.
Incident light on inside of jar surface about 9,000 LUX.
Light LUX measured with house plant light meter

| Sample | Description |
|---|---|
| I | Control, Water only |
| J | Cherry, Water |
| K | Mesquite, Water |
| L | Apple, Water |
| M | Hickory, Water |
| N | Cedar, Water |
| O | Oak - Red, Water |
| P | Pine, Water |

Extraction:

Containers are evaluated visually every 24 hours for 10 days. After the 10 days, the results were as follows:

The samples are thought to behave about the same as in Example 12 B with a potential enhanced desirable effect as ethanol appears to be a generally superior extraction solution.

After the 10 days, about 7 oz of the liquid only, screened to remove large wood particles and the like, are collected after shaking the container, and stored in an 8 oz Ball Jar. The original Ball Jars with the remaining liquid and wood are retained.

Taste Tests:

Small 10 day samples are tasted undiluted, or "neat," or 1:4 (1 part sample plus 4 parts beer.

The samples are thought to behave about the same as in Example 12 B with a potential enhanced desirable effect.

C. Effects of Water with Heat in the Dark, Sealed Containers, on the Extraction of Various Woods Materials:
Same as Example 13 A above.

Woods:
Same as Example 13 A above, but Oak can be 15 gm, and Pine can be 21 gm (due to special considerations to get wood in the container so that light would strike the wood.

Containers:
Same as Example 13 A above.

Procedure:
Same as Example 13 A above.

Heat Source:
Double boiler set up.

Conditions:
Between about 150 F and about 170 F, about 2 hours per day for a total of 20 hours of heat over 10 days' time. Jars were stored in the dark in a cabinet when not heating or cooling.

| Sample | Description |
|---|---|
| 33 | Control, Water only |
| 34 | Cherry, Water |
| 35 | Mesquite, Water |
| 36 | Apple, Water |
| 37 | Hickory, Water |
| 38 | Cedar, Water |
| 39 | Oak - Red, Water |
| 40 | Pine, Water |

Extraction:

Containers were evaluated visually every 24 hours for 10 days. After the 10 days, the results were as follows:

| Sample | Comments after 5 days' time and 10 days' time. |
| --- | --- |
| 33. | Clear liquid |
| 34. | Medium Brown liquid, wood sinks/floats, ppt/hazy |
| 35. | Medium Brown liquid, wood sinks/floats, ppt/hazy |
| 36. | Medium Brown liquid, wood sinks, ppt/hazy |
| 37. | Medium Brown liquid, wood sinks, ppt/hazy |
| 38. | Light Brown liquid, wood floats, ppt/hazy |
| 39. | Very Light Brown liquid, wood sinks, ppt/hazy |
| 40. | Clear, wood floats liquid, ppt/hazy |

After the 10 days, about 7 oz of the liquid only, screened to remove large wood particles and the like, were collected after shaking the container, and stored in an 8 oz Ball Jar. The original Ball Jars with the remaining liquid and wood were retained.

Taste Tests:

Small 5 day samples were tasted undiluted or "neat," or 1:4 (1 part sample plus 4 parts beer (beer being Green Flash Brewery (San Diego, Calif.) Blonde Ale.

| Sample | Neat or In Beer | Comments |
| --- | --- | --- |
| 33 | Neat | Water |
|  | 1:4 Beer | Not done |
| 34 | Neat | Clear cherry flavors |
|  | 1:4 Beer | Not done |
| 35 | Neat | Very clear mesquite flavors, pleasant, smoky |
|  | 1:4 Beer | Not done |
| 36 | Neat | Clear flavors, pleasant, but a little weak. |
|  | 1:4 Beer | Not done |
| 37 | Neat | Some wood flavors noted |
|  | 1:4 Beer | Not done |
| 38 | Neat | Clear cedar wood flavors, pleasant |
|  | 1:4 Beer | Not done |
| 39 | Neat | Some oak flavors, pleasant |
|  | 1:4 Beer | Not done |
| 40 | Neat | Some flavors noted |
|  | 1:4 Beer | Not done |

Spectral Analysis:

Liquid samples were subjected to spectral analysis in a 96 well spectrophotometer. The layout of samples in the 96 well configuration are provided in FIG. 7. Results are provided in FIG. 8.

Conclusion

Wood flavors can be extracted within 10 days with Water With Heat and Dark.

D. Effects of Water with Heat and Light, Sealed Containers, on the Extraction of Various Woods Materials:

Same as Example 13 A above.

Woods:

Same as Example 13 A above, but Oak can be 15 gm, and Pine can be 21 gm (due to special considerations to get wood in the container so that light would strike the wood.

Containers:

Same as Example 13 A above.

Procedure:

Same as Example 13 A above.

Heat Source:

Double boiler set up.

Light Source:

Same as Example 12 B above

Conditions:

Between about 150 F and about 170 F, about 2 hours per day for a total of 20 hours of heat over 10 days' time. Jars are stored under lighting as per Example 12 B above when not heating or cooling.

| Sample | Description |
| --- | --- |
| Q | Control, Water only |
| R | Cherry, Water |
| S | Mesquite, Water |
| T | Apple, Water |
| U | Hickory, Water |
| V | Cedar, Water |
| W | Oak - Red, Water |
| X | Pine, Water |

Extraction:

Containers are evaluated visually every 24 hours for 10 days. After the 10 days, the results are as follows:

The samples are thought to behave about the same as in Example 12 C with a potential additive or synergistic effect as to Example 12 B.

After the 10 days, about 7 oz of the liquid only, screened to remove large wood particles and the like, are collected after shaking the container, and stored in an 8 oz Ball Jar. The original Ball Jars with the remaining liquid and wood are retained.

Taste Tests:

Small 10 day samples were tasted undiluted or "neat," or 1:4 (1 part sample plus 4 parts beer (beer being Green Flash Brewery (San Diego, Calif.) Blonde Ale.

The samples are thought to behave about the same as in Example 12 C with a potential additive or synergistic effect as to Example 12 B.

Spectral Analysis:

Liquid samples are subjected to spectral analysis in a 96 well spectrophotometer.

Conclusion

Wood flavors can be extracted within 10 days with Water with heat and light.

E. Screening Methods

The non-limiting above examples, as well as other examples in the present application, establish screening methods to evaluate various woods or other natural products such as but not limited to biological materials for extraction of flavors under a variety of conditions. The resulting extracts can be added to a variety of food and beverages, or used as is, with or without the wood being present in the samples. The results assist in further developing extract of desired characteristics when provided as is or when provided in food or beverages.

As an example, in these experiments, the screen identified cherry, mesquite, cedar, and oak as particularly interesting woods, and the light and heat/dark experiments show that those extraction methods are more robust than in the dark alone for ethanol extractions and water only extractions. Other woods of particular interest were apple and pine, though all woods tested provided unique and interesting flavor and color profiles. Some woods can be desirable as to their established taste, such as pine, which is relatively high in resin and has a desirable flavor profile. Conditions that favor preferred extracts can be tailored for such woods and other natural products, notably not limited to biological samples and botanical samples as well.

Example 14: Removal of Ethanol from Preparations for Use in Beverages and Foods

This non limiting example establishes that the present invention can be used by utilizing samples where any ethanol in the samples is removed or reduced in concertation from samples, if ethanol is so present in the samples.

In some instances, it is undesirable or even illegal to add ethanol to food or drink. Under those circumstances, extracts of the present invention should be free of ethanol. One way is to use the water extraction preparations. Another is to remove ethanol from the samples. For example, the samples can be heated such that the ethanol is evaporated or "boiled off" before water, such as in classic high school chemistry distillation experiments. Here, for example, samples can be heated in a double boiler (or crock pot, or slow cooker, or canning jar water bath, or water bath, or other sufficient and appropriate heat source) at the desired temperatures using open containers rather than sealed containers. The removal of ethanol by heat can result in the removal of certain volatiles other than ethanol, and drive chemical reactions as well.

Interestingly, it is illegal in some jurisdictions to supplement commercial beer with ethanol. An exception may be the home brew industry. Thus, for commercial beer and other foods and drinks, it is preferable to use water extraction samples, samples where ethanol is removed, or a combination thereof.

In brief, Example 12 C above was used, extended to 70 hours in 4×1 Cup (8 oz) Ball Jars. Only Cherry Wood was used.

Observations:

The extraction process and observations followed that of Example 12 A for Cherry Wood. The end result was a medium brown liquid with wood that sinks, and clear to possibly a bit hazy depending on temperature and possibly lighting and container used for observations. The haze is believed to be extracted materials rather than microbial contamination.

In order to remove ethanol, being at 80 proof, or 40% ethanol, heat can be used. Notably, a double boiler or crock pot configuration, or any source of heat that would not burn or otherwise adulterate the sample by high heat, and enough heat to drive off the ethanol before water. When the volume of the extract is reduced by at least 40%, preferably by at least 50%, then the removal of ethanol should be complete.

Two of the 4 jars of extract prepared in this example were placed in a double boiler set up and the volume reduced to about 50% using low heat at about 160 F, using uncovered Ball Jars. The container was switched to a 4 cup Pyrex measuring cup and the volume further reduced in the double boiler set up to just a little under 1 Cup. The solution was split equally between two 1 Cup Ball Jars, and the volume increased to 1 Cup using water leaving about % inch head space, and the Ball Jars sealed. The sealed Ball Jars were heated to about 185 F in a Ball Jar Cooker for about 3 hours to have a "kill step" for pasteurization. The samples in the Ball Jars were orange and hazy when cooled, and stored at room temperature in the dark.

Example 15: Preparation of Wood Extracts for Use in Beer Using Sealed or Open Containers, with Water or Ethanol This non limiting example establishes that the present invention can be used for preparation of wood extracts for use in beer using sealed or open containers, with ethanol or water.

Based on the above experiments, Cherry Wood was selected as the wood to be extracted.

Method of extraction were chosen to be Heat, Dark, and Ethanol or Water.

A. Cherry Wood, Water, Heat, Dark, Sealed Containers

Materials and Methods and Procedures: were as above in Example 13 for the indicated wood, solvent, temperature, light, and whether containers where sealed or open. In this instance, the containers were sealed closed as set forth above. Containers were 1 C (8 oz) Ball Jars. Wood was provided at 10 gm per container. Heating in Double Boiler to between about 150 F and about 170 F. Time up to 70 hours over 10 days. A total of 4×1 Cup (about 1 Qt, or 1 L) in 4 1 Cup Ball jars of extract were made. The resulting extracts were stored with wood at room temperature in the dark.

Results: The visual character of the extracts seemed to have settled to consistency at about 50 hours, with the extract having a medium brown color, the wood sinks, and is clear to slight ppt.

Applications: These extracts can be used in a beer brewing process or other applications, such as but not limited to food and drink (alcoholic and non-alcoholic beverages). For beer, as an example, the extracts can be added to the beer brewing mix any time. As a non-limiting example, the extract can be added to the "beer product" at any time before the start of the fermentation process begins (such as but not limited to before addition of yeast (or other microorganism for fermentation)); at any time with the addition of yeast; at any time after the addition of yeast; at any time before, during, or after storage such as but not limited to by bottling, kegging, or other storage method or container; at any time before, during or after dispensation of beer from such a container; or a combination thereof. In addition, the extract, undiluted or diluted, can be used as the starting water for a brewing process, in whole or in part. It is generally believed by the inventors, and not being bound to any proposed mechanism, that the later the extract is added during the brewing process, that there will be less interference with flavorings due to the action of yeast or with other components of beer, but that may not be the case. The same may be true for the timing of the addition of extract to a food or during the preparation process.

B. Cherry Wood, Water, Heat, Dark, Open Containers

Materials and Methods and Procedures: were as above for the indicated wood, solvent, temperature, light, and whether containers where sealed or open. In this instance, the containers were left open without the sealing lids. Containers were 1 C (8 oz) Ball Jars. Heating in Double Boiler. During the extraction process, the volume of the extraction liquid was refreshed or topped off with fresh extraction liquid. Time up to 70 hours over 10 days. A total of 4×1 Cup (about 1 Qt, or 1 L) in 4 1 Cup Ball jars of extract were made. The resulting extracts were stored with wood at room temperature in the dark.

Results: The visual character of the extracts seemed to have settled to consistency at about 50 hours, with the extract having a medium brown color, the wood sinks, and is clear to slight. The contents of the jars showed clear signs of microbial contamination after about 7 days of storage and were not pursued further.

Applications: See Example 15 A.

C. Cherry Wood, Ethanol, Heat, Dark, Sealed Containers

Materials and Methods and Procedures: were as above for the indicated wood, solvent, temperature, light, and whether containers where sealed or open. In this instance, the containers were sealed closed as set forth above. Containers were 1 C (8 oz) Ball Jars. Heating in Double Boiler. Time up to 70 hours over 10 days. A total of 4×1 Cup (about 1 Qt, or 1 L) in 4 l Cup Ball jars of extract were made. The resulting extracts were stored with wood at room temperature in the dark.

Results: The visual character of the extracts seemed to have settled to consistency at about 50 hours, with the extract having a medium brown color, the wood sinks, and is clear to slight ppt.

Applications: See Example 15 A.

D. Cherry Wood, Ethanol, Heat, Dark, Open Containers

Materials and Methods and Procedures: were as above for the indicated wood, solvent, temperature, light, and whether containers where sealed or open. In this instance, the containers were left open without the sealing lids. Containers were 1 C (8 oz) Ball Jars. Heating in Double Boiler. During the extraction process, the volume of the extraction liquid was refreshed or topped off with fresh extraction liquid. Time up to 70 hours over 10 days. A total of 4×1 Cup (about 1 Qt, or 1 L) in 4 l Cup Ball jars of extract were made. The resulting extracts were stored with wood at room temperature in the dark.

Results: The visual character of the extracts seemed to have settled to consistency at about 50 hours, with the extract having a medium brown color, the wood sinks, and is clear to slight ppt. However, after 70 hours the extract may be a lit darker, and maybe a bit hazier after cooling.

Applications: See Example 15 A.

Example 16: Preparation of Wood Extracts for Use in Beer Using Semi-Sealed Crock Pot, with Water or Ethanol This non limiting example establishes that the present invention can be used for the preparation of wood extracts for use in beer using semi-sealed crock pot, with water or ethanol.

A. Cherry Wood, Ethanol, Heat, Dark, Semi-Sealed Container (Covered Crock Pot)

Materials and Methods and Procedures: were as above for the indicated wood, solvent, temperature, light, and whether containers where sealed or open. In this instance, rather than using containers and double boilers, the 1 L of extraction liquid with the appropriate amount of wood (40 gm) where placed in a Slow Cooker Crock Pot Model SCV700SS, covered, and set on low to get to temperature than to high and planned for 72 hours of extraction. The temperature, though somewhat difficult to measure in a closed Crock Pot Configuration, was apparently between about 150 F and about 180 F on high setting, being similar to the double boiler configuration. The Crock Pot configuration is considered to be "semi sealed" or "semi closed" as a weak condensation barrier is formed that can be readily "bubbled through" by vapors/pressure/etc. escaping from the hot liquid in the Crock Pot.

The process was stopped after 6 hours as the extract seems very done at that point in time and all ethanol seemed driven off earlier than that as detected by odor and the reduction in volume of the extraction solution. The resulting extracts were stored without wood in sealed Ball Jars under refrigeration in the dark.

Results: The resulting extract was collected separate from the wood, and measured about 1 cup to fill up 1×8 oz sealed Ball Jar. The extracts were orange, very turbid or hazy, no ethanol detected by odor, and very bitter in flavor, which is generally believed to be tannins.

Applications: See Example 15 A.

B. Cherry Wood, Water, Heat, Dark, Semi-Sealed Container (Covered Crock Pot)

Materials and Methods and Procedures: were as above for the indicated wood, solvent, temperature, light, and whether containers where sealed or open. In this instance, rather than using containers and double boilers, the 1 L of extraction liquid with the appropriate amount of wood (40 gm) where placed in a Slow Cooker Crock Pot Model SCV700SS, covered, and set on low to get to temperature than to high and planned for 72 hours of extraction. The temperature, though somewhat difficult to measure in a closed Crock Pot Configuration, was apparently between about 150 F and about 180 F on high setting, being similar to the double boiler configuration. The Crock Pot configuration is considered to be "semi sealed" or "semi closed" as a weak condensation barrier is formed that can be readily "bubbled through" by vapors/pressure/etc. escaping from the hot liquid in the Crock Pot.

The process was stopped after 24 hours as the extract seems very done at that point in time as determined by reduction in volume and comparison to the ethanol extracts above. The resulting extracts were stored without wood in sealed Ball Jars under refrigeration in the dark.

Results: The resulting extract was collected separate from the wood, and measured about 1 cup to fill up 1×8 oz sealed Ball Jar. The extracts were orange, very turbid or hazy, no ethanol detected by odor, and very bitter in flavor, which is generally believed to be tannings.

Applications: See Example 15 A.

Example 17: Taste Tests of Extracts in Example 14 and Example 16

Following taste testing use samples from Examples 14 and Example 16 were taste tested undiluted and diluted in beer.

Samples and Example Reference

1. Cherry Wood, Ethanol, Sealed, Heat, Dark
   Example 14, Sealed Jars, Ethanol NOT removed
2. Cherry Wood, Ethanol, Sealed, Heat, Dark, Reduced Volume, Up to Original
   Volume with Water
   Example 14, Ethanol REMOVED by heat
3. Cherry Wood, Ethanol, Semi-Sealed Crock Pot, Heat, Dark.
   Example 16 A
4. Cherry Wood, Water, Semi-Sealed Crock Pot, Heat Dark
   Example 16 B Taste Testing:

Samples 1 through 4 were tasted need or diluted in beer, Ragnabock from Longship Brewery, San Diego, a Double Bock beer at about 8.4 ABV. A dilution of 1:20 for example is 1 part extract and 20 parts beer.

| Sample | Dilution | Diluent | Comments |
|---|---|---|---|
| 1 | None | N/A | Cherry and wood flavors, hot ethanol flavor |
| 1 | 1:20 | Beer | Cherry and wood flavors, boozy |
| 2 | None | N/A | Cherry and wood flavors noted |
| 2 | 1:20 | Beer | Cherry and wood flavors noted |
| 3 | None | N/A | Cherry and wood flavors noted, Bitter |
| 3 | 1:20 | Beer | Cherry and wood flavors noted, Unique |
| 4 | None | N/A | Cherry and wood flavors noted, less bitter than 3 |
| 4 | 1:20 | Beer | Cherry and wood flavors, less than 3. |

Rankings:
  Brewer 2>3>4>1
  Brewery Worker 2>1>3>4
  Taster 1 2>3>4>1
  Taster 2 1>3>2=4
  All tasters felt each had merit to move forward to a product.
Applications: See Example 15 A.

Example 18: Beer with Added Wood Extract

This example establishes that the present invention can be utilized as an additive to flavor beer after fermentation is complete or substantially complete and before bottling.
Materials and Methods and Procedures:
  Wood Extract: Cherry Wood Extracts in Water, Sealed Containers. As made in Example 15 A (Cherry Wood, Water, Heat, Dark, Sealed Containers) where 4×1 Cup jars of extract were made, for a total of about 1 L or about 1 Qt.
  Beer: A Pretzel Stout was made as a 5 gallon batch and split in two (control and experimental samples, 2.5 gallons each) before bottling. The Control sample was untreated, and to the Experimental sample was the Control Sample PLUS 1 Ball Jar (8 oz or 1 Cup) of extract was added to 2.5 gallons to a dilution of 1 Cup: 2.5 gallons, being a dilution of 1 Cup: 16 Cup/gallon× 2.5 gallons, being 1 Cup: 40 Cups, or 1:40 dilution, being twice the dilution for taste tests of 1:4 to 1:20 done in the Examples above (some data not reported, notably that when added to finished beer, flavorings in the extract came through at about a dilution of 1:20 in preliminary taste tests in order to estimate dilutions to be used with beer experiments). The beer was bottled and stored in the dark at room temperature for about 2 months before tasting.
  Results: The Control sample proved to be a high quality salted stout of about 8% ABV (alcohol by volume). The Experimental sample was unexpectedly of the character of a barrel aged beer, with strong cherry wood notes and tannin notes as well. Both the Control and Experimental Beers were determined to be of sufficient quality or better to be served in a small brewery in San Diego, Calif.
Applications: See Example 15 A.

Example 19: Wood Extracts Made Using Jack Daniel's® Used Barrel Wood Chips in Sealed Containers with Water, Heat, and Dark, from Used Jack Daniel's® Barrels This non limiting example establishes that the present invention can be used for the preparation of wood extracts using wood chips from used Jack Daniel's Barrels for use in beer.

A. Effects of Time on Sealed Container, Water, Heat, and Dark on Extraction of Used Barrel Wood from Jack Daniel's®
Materials and Methods and Procedures: were as above for sealed containers for the indicated wood, solvent, temperature, light, and whether containers where sealed. See generally Example 15. In this instance, the containers were sealed closed as set forth above. Containers were 1 C (8 oz) Ball Jars. Heating in Ball Jar Cooker. Time up to 6 days without break. The resulting extracts were stored with wood at room temperature in the dark. Wood was Jack Daniel's® Barrel Wood Chips, sold for use for BBQ. Jars were 1 Cup Ball Jars. Solvent was water. Temperature was 185 F. Twelve jars were made with 10 gm wood each, and 1 jar removed every 12 hours for a total of 6 days.
Extraction:
  Containers were evaluated for color and clarity and the like when the 1 jar was removed every 12 hours, the results were as follows:

| Sample | Time (Days) | Comments |
|---|---|---|
| 1 | 0.5 | Light Brown, wood sinks, clear, slight haze |
| 2 | 1.0 | Slightly darker brown |
| 3 | 1.5 | About the same as sample 2 |
| 4 | 2.0 | About the same as sample 3 |
| 5 | 2.5 | About the same as sample 4 |
| 6 | 3.0 | About the same as sample 5 |
| 7 | 3.5 | Darker than sample 6 |
| 8 | 4.0 | Maybe a little darker than sample 7 |
| 9 | 4.5 | About the sample as sample 8 |
| 10 | 5.0 | About the sample as sample 9 |
| 11 | 5.5 | About the same as sample 10, maybe some "snow globe" effect with ppt. |
| 12 | 6.0 | A little darker than sample 11 |

Taste Tests:
  Samples were taste tested as in Example 17, using Ragnabock Double Bock beer 8.4 ABV. Not all samples were tasted.

| Sample | Dilution | Diluent | Comments |
|---|---|---|---|
| 1 | 1:20 | Beer | Some flavor of Jack Daniel's® and wood. |
| 4 | 1:20 | Beer | Much more Jack Daniel's® and wood flavor Compared to sample 1 |
| 6 | 1:20 | Beer | Some wood and Jack Daniel's® flavors, less than sample 12 |
| 6 | 1:10 | Beer | About the same as 1:20 dilution |
| 8 | 1:20 | Beer | Better than Sample 6 at same dilution |
| 8 | 1:10 | Beer | Better than Sample 6 at same dilution |
| 10 | 1:20 | Beer | Similar to Samples 8 and 10 at same dilution |
| 10 | 1:10 | Beer | Similar to Samples 8 and 10 at same dilution |
| 12 | 1:20 | Beer | Some wood and Jack Daniel's® flavors |
| 12 | 1:10 | Beer | Pronounced wood and Jack Daniel's® flavors |

Rankings:
  Brewer 8>6>10>12
  All samples were thought to be sellable products by a brewer.
Applications: See Example 15 A.
B. Effects of Soaking Jack Daniel's Barrel Wood Chips in Jack Daniels Bourbon Before Extraction in Water, Sealed Containers, Heat, and Dark
Procedures:
  Generally as per Example 19 A, Except:
  6 jars, Ball Jars 1 Cup, with 5 gm, 10 gm, 15 gm, 20 gm, 25 gm, or 30 gm of Jack Daniel's® Barrel Wood Chips.

Cover wood chips with Jack Daniel's® Bourbon Seal containers and let set for 24 hours at room temperature.
Store at room temperature until extraction (very little delay) Remove Jack Daniels liquid by decanting so that no or few "drips" remaining
Bring volume of contents of Ball Jars to within about/inch of top of jar with water
Place in Ball Jar Cooker and raise to 185 F.
Observe Ball Jars over three days.
Remove Ball Jars and store at room temperature in the dark until use.

Extraction:
Containers were evaluated for color and clarity and the like every 24 hours, the results were as follows:

| Wood (gm) | Time (Days) | Comments |
|---|---|---|
| 5 | 1 | Light Brown, wood sinks, snow globe effect |
| 10 | 1 | Light Brown, wood sinks, snow globe effect |
| 15 | 1 | Medium Brown, wood sinks, snow globe effect |
| 20 | 1 | Medium Brown, wood sinks, snow globe effect |
| 25 | 1 | Dark Brown, wood sinks, snow globe effect |
| 30 | 1 | Dark Brown, wood sinks, snow globe effect |
| 5 | 2 | Light Brown, wood sinks, snow globe effect |
| 10 | 2 | Light Brown, wood sinks, snow globe effect |
| 15 | 2 | Medium Brown, wood sinks, snow globe effect |
| 20 | 2 | Dark Brown, wood sinks, snow globe effect |
| 25 | 2 | Dark Brown, wood sinks, snow globe effect |
| 30 | 2 | Dark Brown, wood sinks, snow globe effect |
| 5 | 3 | Light Brown, wood sinks, snow globe effect |
| 10 | 3 | Light Brown, wood sinks, snow globe effect |
| 15 | 3 | Medium Brown, wood sinks, snow globe effect |
| 20 | 3 | Dark Brown, wood sinks, snow globe effect |
| 25 | 3 | Dark Brown, wood sinks, snow globe effect |
| 30 | 3 | Dark Brown, wood sinks, snow globe effect |

Taste Tests:
Samples were taste tested as in Example 17, using Ragnabock Double Bock beer 8.4 ABV. Not all samples were tasted.

| Sample | | Dilution | Diluent | Comments |
|---|---|---|---|---|
| 1 | 30 gm 3 days | 1:20 | Beer | Very good, wood and Jack Daniels ® flavors |
| 2 | 30 gm 3 days | 1:10 | Beer | More intense flavors, may be too strong in flavor for beer |
| 3 | 10 gm 3 days | 1:20 | Beer | Very good |
| 4 | 10 gm 3 days | 1:10 | Beer | Good, stronger than 1:20 |
| 5 | 5 gm 3 days | 1:20 | Beer | Slight Jadck Daniels and wood flavors |
| 6 | 5 gm 3 days | 1:10 | Beer | More wood and Jack Daniels flavors |

Rankings:
Brewer 3>4>5>6
Brewer 5 with a bit more extract is the best
Many samples were thought to be sellable products by a brewer.
Applications: See Example 15 A.

Example 20: Wood Extracts Made Using Cherry Wood Chips Pre-Treated with Johnny Walker® Scotch or Jack Daniel's® Bourbon in Sealed Containers, Water, Heat, and Dark This non limiting example establishes that the present invention can be used for the preparation of wood extracts using cherry wood chips pre-treated with Johnny Walker Scotch® or Jack Daniel's® Bourbon for use in beer.

Procedures:
Generally as per Example 19 B, Except:
6 jars, Ball Jars 1 Cup, with 5 gm or 10 gm cherry wood chips.

SAMPLE KEY
1. 5 gm cherry wood, no pretreatment
2. 5 gm cherry wood, pretreatment by soaking 24 hours in Jack Daniel's®
3. 5 gm cherry wood, pretreatment by soaking 24 hours in Johnny Walker®
4. 10 gm cherry wood, no pretreatment
5. 10 gm cherry wood, pretreatment by soaking 24 hours in Jack Daniel's®
6. 10 gm cherry wood, pretreatment by soaking 24 hours in Johnny Walker®

Seal containers and let set for 24 hours at room temperature.
Store at room temperature until extraction (very little delay)
Remove Jack Daniel's® or Johnny Walker® liquid by decanting so that no or few "drips" remaining
Bring volume of contents of Ball Jars to within about ¼ inch of top of jar with water
Place in Ball Jar Cooker and raise to 185 F.
Observe Ball Jars over three days.
Remove Ball Jars and store at room temperature in the dark until use.

Extraction:
Containers were evaluated for color and clarity and the like every 24 hours, the results were as follows:

| Sample | Wood | Spirit | Days | Comments |
|---|---|---|---|---|
| 1 | 5 gm | None | 1 | Light brown, wood sinks |
| 2 | 5 gm | Bourbon | 1 | Light brown, wood sinks |
| 3 | 5 gm | Scotch | 1 | Light brown, wood sinks |
| 4 | 10 gm | None | 1 | Medium brown, wood sinks |
| 5 | 10 gm | Bourbon | 1 | Medium brown, wood sinks |
| 6 | 10 gm | Scotch | 1 | Medium brown, wood sinks |
| 1 | 5 gm | None | 2 | Medium brown, wood sinks |
| 2 | 5 gm | Bourbon | 2 | Medium brown, wood sinks |
| 3 | 5 gm | Scotch | 2 | Medium brown, wood sinks |
| 4 | 10 gm | None | 2 | Medium brown, wood sinks |
| 5 | 10 gm | Bourbon | 2 | Medium brown, wood sinks |
| 6 | 10 gm | Scotch | 2 | Medium brown, wood sinks |
| 1 | 5 gm | None | 3 | Same as 2 days, snow globe |
| 2 | 5 gm | Bourbon | 3 | Same as 2 days, snow globe |
| 3 | 5 gm | Scotch | 3 | Same as 2 days, snow globe |
| 4 | 10 gm | None | 3 | Same as 2 days, snow globe |
| 5 | 10 gm | Bourbon | 3 | Same as 2 days, snow globe |
| 6 | 10 gm | Scotch | 3 | Same as 2 days, snow globe |
| 1 | 5 gm | None | 4 | Same as 3 days, hazy when cool |
| 2 | 5 gm | Bourbon | 4 | Same as 3 days, hazy when cool, heavy haze |
| 3 | 5 gm | Scotch | 4 | Same as 3 days, light haze |
| 4 | 10 gm | None | 4 | Same as 3 days, hazy when cool |
| 5 | 10 gm | Bourbon | 4 | Same as 3 days, hazy when cool |
| 6 | 10 gm | Scotch | 4 | Same as 3 days, hazy when cool, heavy haze |

Taste Tests:

Samples were taste tested as in Example 19, using Ragnabock Double Bock beer 8.4 ABV.

| Sample | Dilution | Diluent | Comments |
|---|---|---|---|
| 1 | 0 | None | Wood and cherry flavors |
| 2 | 0 | None | Less flavor than 1, no Bourbon flavors |
| 3 | 0 | None | Between 1 and 2 for flavors, no Scotch flavors |
| 4 | 0 | None | Same as 5 and 6, a little wood and cherry flavors, maybe "cleaner" flavors than 5 or 6 |
| 5 | 0 | None | Same as 6, a little wood and cherry flavors, no Bourbon flavors noted |
| 6 | 0 | None | Flavors, a bit of wood and cherry, no Scotch flavors noted |

Taste Tests:

Samples were taste tested as in Example 19, using the indicated Beer from Longship Brewery, San Diego, Calif.

| Sample | Dilution | Diluent | Comments |
|---|---|---|---|
| 4 | 1:20 | Beer | Wood and cherry flavors |
| 5 | 1:20 | Beer | Different from 4, bright, some cherry and wood and some Bourbon flavors. Very good. |
| 6 | 1:20 | Beer | Close to 5, maybe a little bitterness. A bit of wood and cherry flavors |

Applications: See Example 15 A.

Example 21: Wood Extracts Made Using Apple Wood Chips or Hickory Wood Chips Pre-Treated with Red Wine or White Wine in Sealed Containers, Water, Heat, and Dark This non limiting example establishes that the present invention can be used to extract flavors from wood pretreated with wine for use in beer, though other natural products or food or drink or used.

Procedures:
Generally as per Example 20, Except:
  6 jars, Ball Jars 1 Cup, with 20 gm of the indicated wood chips.
  SAMPLE KEY
    1. 20 gm apple wood, no pretreatment
    2. 20 gm apple wood, pretreatment by soaking 24 hours in Red Wine
    3. 20 gm apple wood, pretreatment by soaking 24 hours in White Wine
    4. 20 gm hickory wood, no pretreatment
    5. 20 gm hickory wood, pretreatment by soaking 24 hours in Red Wine
    6. 20 gm cherry wood, pretreatment by soaking 24 hours in White Wine
  Red Wine: Cabernet Sauvignon, Chile 2018, Black Box
  White Wine: Chardonnay, California 2018, Black Box
    Seal containers and let set for 24 hours at room temperature.
  Store at room temperature until extraction (very little delay)
  Remove Red Wine or White Wine liquid by decanting so that no or few "drips" remaining
  Bring volume of contents of Ball Jars to within about ¾ inch of top of jar with water
  Place in Ball Jar Cooker and raise to 185 F.
  Observe Ball Jars over three days.
  Remove Ball Jars and store at room temperature in the dark until use.

Extraction:
Containers were evaluated for color and clarity and the like every 24 hours, the results were as follows:

| Sample | Wood | Wine | Days | Comments |
|---|---|---|---|---|
| 1 | Apple | None | 1 | Medium brown, clear |
| 2 | Apple | Red | 1 | Medium brown, clear |
| 3 | Apple | White | 1 | Light brown, clear |
| 4 | Hickory | None | 1 | Medium brown, clear |
| 5 | Hickory | Red | 1 | Light brown, clear |
| 6 | Hickory | White | 1 | Light brown, clear |
| 1 | Apple | None | 2 | Dark brown, snow globe |
| 2 | Apple | Red | 2 | Medium brown, snow globe |
| 3 | Apple | White | 2 | Light brown, snow globe |
| 4 | Hickory | None | 2 | Medium brown, snow globe |
| 5 | Hickory | Red | 2 | Light brown, snow globe |
| 6 | Hickory | White | 2 | Light brown, snow globe |

Taste Tests:

Samples were taste tested as in Example 19, using the indicated Beer from Longship Brewery, San Diego, Calif.

| Sample | Dilution | Diluent | Comments |
|---|---|---|---|
| 1 | 1:20 | Beer | Good, crisp, some fruit and wood flavors |
| 2 | 1:20 | Beer | Ok, some flavor clashing noted |
| 3 | 1:20 | Beer | Good, white wine, apple and wood flavors |
| 4 | 1:20 | Beer | Good, wood and sweetness noted |
| 5 | 1:20 | Beer | Good, unique, wood and wine noted |
| 6 | 1:20 | Beer | Good, refreshing white wine and wood Flavors noted |

Applications: See Example 15 A.

Example 22: Extraction of Natural Products Other than Wood for Use in the Present Invention This non limiting example establishes that the present invention can be used to extract natural products other than wood using the methods of the present invention.

A. Extraction of Dried Fruit and Nuts in Water, Sealed Containers, Heat, and Dark This non limiting example establishes that the present invention can be used to extract natural products other than wood using the methods of the present invention.

Procedures:
Generally as per Example 20, Except:
  6 jars, Ball Jars 1 Cup, with 20 gm of the indicated fruit or nut.
  Sample Key
    1. 20 gm Cranberries, dried, whole
    2. 20 gm Apricots, dried, whole
    3. 20 gm Banana, dried, whole
    4. 20 gm Cherries, dried, whole
    5. 20 gm Mango, dried, whole
    6. 20 gm Almonds, raw, whole, no salt
  Bring volume of contents of Ball Jars to within about ¼ inch of top of jar with water
  Place in Ball Jar Cooker and raise to 185 F.
  Observe Ball Jars over three days.
  Remove Ball Jars and store at room temperature in the dark until use.

Extraction:

Containers were evaluated for color and clarity and the like every 24 hours, the results were as follows:

| Sample | Fruit/Nut | Days | Comments |
|---|---|---|---|
| 1 | Cranberries | 1 | Hydrated fruit, turbid, pink |
| 2 | Apricots | 1 | Hydrated fruit, clear, yellow |
| 3 | Banana | 1 | Hydrated fruit, turbid, light brown |
| 4 | Cherry | 1 | Hydrated fruit, turbid, red |
| 5 | Mango | 1 | Hydrated fruit, turbid, yellow |
| 6 | Almonds | 1 | Very turbid, brown |
| 1 | Cranberries | 2 | Hydrated fruit, turbid, pink |
| 2 | Apricots | 2 | Hydrated fruit, clear, yellow |
| 3 | Banana | 2 | Hydrated fruit, cloudy, grey |
| 4 | Cherry | 2 | Hydrated fruit, red, snow globe |
| 5 | Mango | 2 | Hydrate fruit, cloudy, yellow |
| 6 | Almonds | 2 | Whole nuts, very turbid, brown |

Taste Tests:

Samples were taste tested as in Example 19, using the indicated Beer from Longship Brewery, San Diego, Calif.

| Sample | Dilution | Diluent | Comments |
|---|---|---|---|
| 1 | 1:20 | Beer(A) | Good, cranberry flavor noted |
| 2 | 1:20 | Beer(B) | Good, apricot flavors, quite nice |
| 3 | 1:20 | Beer(C) | No banana flavor, that flavor may be heat labile |
| 4 | 1:20 | Beer(D) | Very good, cherry flavor, maybe a bit sweet |
| 5 | 1:20 | Beer(E) | Very nice, crisp, mango flavors |
| 6 | 1:20 | Beer(F) | Woody flavors, maybe from skin of nut, Some almond flavors |

(A)Pilsner, Sunstone
(B)Pale Ale, Odison #5
(C)Brown Ale, Battle Axe
(D)Oatmeal Stout
(E)Tropical IPA, Asgard
(F)Carmel Stout, Rollo B. Extraction of Nuts and Spices in Water, Sealed Containers, Heat, and Dark This non limiting example establishes that the present invention can be used to extract natural products other than wood using the methods of the present invention.

Procedures:

Generally as per Example 20, Except:
 6 jars, Ball Jars 1 Cup, with 20 gm of the indicated nut or spice.
 Sample Key
  1. 20 gm Walnuts, without shell, no salt
  2. 20 gm Sunflowers, without shell, no salt
  3. 20 gm Cumin seeds, whole
  4. 20 gm Cardamom pods, whole
  5. 20 gm Coriander seeds, whole
  6. 20 gm Black Pepper corns, whole
Bring volume of contents of Ball Jars to within about % inch of top of jar with water
Place in Ball Jar Cooker and raise to 185 F.
Observe Ball Jars over three days.
Remove Ball Jars and store at room temperature in the dark until use.

Extraction:

Containers were evaluated for color and clarity and the like every 24 hours, the results were as follows:

| Sample | Nut/Spice | Days | Comments |
|---|---|---|---|
| 1 | Walnuts | 2 | Whole nuts, chocolate milk like |
| 2 | Sunflower | 2 | Whole nuts, cloudy, yellow |
| 3 | Cumin | 2 | Whole seeds, cloudy, light brown |
| 4 | Cardamom | 2 | Whole seeds, cloudy, yellow |
| 5 | Coriander | 2 | Whole seeds, clear, dark brown |
| 6 | Black Pepper | 2 | Whole seeds, black. |

Appearance was about the same after 24 hours

Taste Tests:

Samples were taste tested as in Example 19, using the indicated Beer from Longship Brewery, San Diego, Calif.

| Sample | Dilution | Diluent | Comments |
|---|---|---|---|
| 1 | 1:20 | Beer(A) | No added flavors noted |
| 2 | 1:20 | Beer(B) | Good, sunflower seed odor and taste |
| 3 | 1:20 | Beer(C) | Good, subtle spice flavors |
| 4 | 1:20 | Beer(D) | Spice flavors at end, strong flavors. |
| 5 | 1:20 | Beer(E) | Good, sweet with no citrus noted |
| 6 | 1:20 | Beer(F) | Good, pepper flavors noted |

Brown Ale, Battle Axe
(A)English Mild, 793
(B)Belgian Whitbeer, Loki's Wit
(C)Brown Ale, Battle Axe
(D)Pale Ale, Odinson #5
(E)Red Ale, Erik the Red Applications: See Example 15 A.

C. Extraction of Fruits and Spices, Fresh and Dried, in Water, Sealed Containers, Heat, and Dark This non limiting example establishes that the present invention can be used to extract natural products other than wood using the methods of the present invention.

Procedures:

Generally as per Example 20, Except:
 6 jars, Ball Jars 1 Cup, with 20 gm of the indicated nut or spice.
 SAMPLE KEY
  1. 20 gm Ginger root, fresh
  2. 20 gm Lemon, Myers, zest only, fresh
  3. 20 gm Lemon Peel, dried
  4. 7 gm Mint, dried
  5. 14 gm Mint, fresh
  6. 20 gm Cinnamon stick, dried
Bring volume of contents of Ball Jars to within about % inch of top of jar with water
Place in Ball Jar Cooker and raise to 185 F.
Observe Ball Jars over three days.
Remove Ball Jars and store at room temperature in the dark until use.

Extraction:

Containers were evaluated for color and clarity and the like every 24 hours, the results were as follows:

| Sample | Nut/Spice | Days | Comments |
|---|---|---|---|
| 1 | Ginger, fresh | 1 | Cloudy, light yellow |
| 2 | Lemon, fresh | 1 | Clear, light yellow |
| 3 | Lemon, dried | 1 | Fully hydrated, fills jar |
| 4 | Mint, dried | 1 | Clear, brown, tea color |

-continued

| Sample | Nut/Spice | Days | Comments |
|---|---|---|---|
| 5 | Mint, fresh | 1 | Clear, yellow/green |
| 6 | Cinnamon | 1 | Cloudy, dark brown |

Taste Tests:

Samples were taste tested as in Example 19, using the indicated Beer from Longship Brewery, San Diego, Calif.

| Sample | Dilution | Diluent | Comments |
|---|---|---|---|
| 1 | 1:20 | Beer(A) | Good, ginger flavors noted |
| 2 | 1:20 | Beer(B) | Nice, lemon flavors, strong finish |
| 3 | 1:20 | Beer(C) | Nice, but a bit bitter at times |
| 4 | 1:20 | Beer(D) | Very good |
| 5 | 1:20 | Beer(E) | Some mint flavors |
| 6 | 1:20 | Beer(F) | Good odor and flavors of cinnamon |

(A)Belgian Whit, Loki's Wit
(B)Wet Hop IPA, Whetstone
(C)Pilsner, Sunstone
(D)Belgian Weissen, Blood Oath
(E)Double Hazy IPA, Rolling Fog
(F)Red Ale, Eric the Red Applications: See Example 15 A.

D. Extraction of Dried Spices, Chilies, and Jim Beam® Barrel Wood Chips, in Water, Sealed Containers, Heat, and Dark This non limiting example establishes that the present invention can be used to extract natural products other than wood using the methods of the present invention.

Procedures:
Generally as per Example 20, Except:
6 jars, Ball Jars 1 Cup, with 20 gm of the indicated nut or spice.
SAMPLE KEY
1. 10 gm Star Anise, slices, dried
2. 10 gm Cloves, whole, dried
3. 10 gm Crushed Chili, dried
4. 10 gm Chile de Arbol, whole, dried
5. 10 gm Guajillo Chili, whole, dried
6. 10 gm Jim Beam Barrel Aged Smoking Chips
Bring volume of contents of Ball Jars to within about ¼ inch of top of jar with water
Place in Ball Jar Cooker and raise to 185 F.
Observe Ball Jars over three days.
Remove Ball Jars and store at room temperature in the dark until use.

Extraction:
Containers were evaluated for color and clarity and the like every 24 hours, the results were as follows:

| Sample | Nut/Spice | Days | Comments |
|---|---|---|---|
| 1 | Star Anis | 1 | Hydrated, medium brown, cloudy |
| 2 | Cloves | 1 | Hydrated, very dark |
| 3 | Crushed Chili | 1 | Red, cloudy |
| 4 | Chili de Arbol | 1 | Clear, light red |
| 5 | Guajillo Chilli | 1 | Clear, light red |
| 6 | Jim Beam Wood | 1 | Clear, medium brown, snow globe |

Taste Tests:

Samples were taste tested as in Example 19, using the indicated Beer from Longship Brewery, San Diego, Calif.

| Sample | Dilution | Diluent | Comments |
|---|---|---|---|
| 1 | 1:20 | Beer(A) | Good, very pleasant flavors and aromas |
| 2 | 1:20 | Beer(B) | Very strong clove aroma and flavors |
| 3 | 1:20 | Beer(C) | Good, nice hot pepper finish |
| 4 | 1:20 | Beer(D) | Pepper start and hot pepper finish |
| 5 | 1:20 | Beer(E) | Good, a bit of hot pepper start and finish |
| 6 | 1:20 | Beer(F) | Wood flavors noted, no Bourbon flavors. |

(A)English Mild, 793
(B)Imperial Stout, Althing
(C)Berliner Weiss, Blood Oath
(D)Salted Carmel Stout, Rollo
(E)Pilsner, Sunstone
(F)Double Bock, Ragnabock Applications: See Example 15 A.

Example 23: Combining Multiple Natural Product Extracts into a Single Food or Drink Product This non limiting example establishes that the present invention can be used for two or more natural product extracts, such as but not limited to wood, to be added to a single food or drink product, such as but not limited to beer product.

A. Single Extract

A single extract with multiple components are made using the methods of these examples.

Procedures:
Generally as per Example 20, Sealed containers Ball Jars 8 oz, water, dark, heat at 185 F in Ball Jar cooker.
SAMPLE KEY
1. (Mango, Dried, 10 gm) and
   (Crushed Chili, 10 gm)
2. (Jack Daniels® Barrel Wood, 10 gm) and
   (Mint, Dried, 2 gm)
3. (Mesquite Wood, 10 gm) and
   (Chile de Arbol, 2 gm)

Extraction:
Containers were evaluated for color and clarity and the like every 24 hours, the results were as follows:

| Sample | Days | Comments |
|---|---|---|
| 1 | 1 | Red, cloudy |
| 2 | 1 | Medium brown, clear |
| 3 | 1 | Medium brown, clear |
| 1 | 2 | Red, cloudy |
| 2 | 2 | Medium brown, clear |
| 3 | 2 | Medium brown, clear |

Taste Tests:

Samples were taste tested as in Example 19, using the indicated Beer from Longship Brewery, San Diego, Calif.

| Sample | Dilution | Diluent | Comments |
|---|---|---|---|
| 1 | 1:20 | Beer(A) | A bit of chili flavor at the end, no mango noted |
|  | 1:10 | Beer(A) | Mango noted, and chili a bit strong |
| 2 | 1:20 | Beer(B) | Mint noted with crisp wood end, good |
| 3 | 1:20 | Beer(C) | Mesquite noted, chili a bit strong, good |

(A)Pale Ale, Odison #5
(B)Brown Ale, Battle Axe
(C)Brown Ale, Battle Axe

Applications: See Example 15 A.

B. Multiple Extracts

Rather than a single extract, multiple extracts are made per prior examples above, notably but not limited to Example 22 and mixed into a single beer sample SAMPLE KEY
1. (Cranberries, Dried) and (Cardamom, Whole)
2. (Mint, Fresh) and (Cranberries, Dried)
3. (Mint, Dried) and (Ginger, Fresh)
4. (Mint, Dried) and (Jack Daniels with Apple Wood)
   A Mint Julip Mimetic or a
   Old Fashioned Mimetic
5. (Mango, Dried) and (Ginger, Fresh)
6.

Taste Tests:

Samples were taste tested as in Example 19, using the indicated Beer from Longship Brewery, San Diego, Calif.

| Sample | Dilution* | Diluent | Comments |
|---|---|---|---|
| 1 | 1:20 | Beer(A) | A bit unusual |
| 2 | 1:20 | Beer(B) | Some mint and some cranberry flavors |
| 3 | 1:20 | Beer(C) | Quite Good |
| 4 | 1:20 | Beer(D) | Good but some flavor clashing, possibly between mint and hops, may be better with non-hopped products. |
| 4A | 1:20 | Beer(E) | Very Good, Concept of Mint Julip or Old Fashioned noted |
| 4B | 1:20 | Beer(F) | Very good, Concept of Mint Julip or Old Fashioned noted |
| 5 | 1:20 | Beer(G) | Very Good |

(A)Pilsner, Sunstone
(B)Double Hazy IPA, Rolling Fog
(C)Pale Ale, Odison #5
(D)Pale Ale, Odison #5
(E)Pilsner, Sunstone
(F)English Mild, 793
(G)Tropical IPA, Asgard Ale
*Dilution of EACH component individually and not cumulative.

Applications: See Example 15 A.

Example 24 A: Extraction of *Cannabis* Material Using Methods of the Present Invention and Use Thereof This non limiting example establishes that the present invention can be used for the extraction of *Cannabis* materials and use thereof. The *Cannabis* materials can be any material from that plant (flower, leaf, stem, stalk, seeds, roots, whole plant, and a combination thereof), and any of the members of the Cannabaceae family and *Cannabis* genus, including but not limited to *Cannabis sativa, Cannabis indica, Cannabis ruderalis*, the like, or combinations thereof. *Cannabis* materials include what are referred to as "hemp" and also "marijuana."

Procedures:
Generally as per Example 20, Sealed containers Ball Jars 8 oz, water only, dark, heat at 185 F in Ball Jar cooker.

SAMPLE KEY
1. *Cannabis* flower, Bubba Kush, Indica, (*Cannabis sativa, Cannabis* indica, or a hybrid thereof) dried and cured, ground, heat activated in oven at 240 F for 60 minutes, 4 grams.

Extraction:
Containers were evaluated for color and clarity and the like every 24 hours, the results were as follows:

| Sample | Days | Comments |
|---|---|---|
| 1 | 1 | Light brown, cloudy, distinct but mild and pleasant Cannabis scent |

Taste Tests:
Samples were taste tested as in Example 19, tasted neet and evaluated for *Cannabis* type response and compared to un-extracted materials.

| Sample | Dilution | Diluent | Comments |
|---|---|---|---|
| 1 | 0 | None | Ingested about 16 ml (sublingual followed by ingestion) of extract over 1 hour. |

NOTES: Some *Cannabis* effect noted, similar to starting flower material by same route of administration (sublingual followed by ingestion, swallowing). Effects weaker than with starting flower material, which may be due to type and concentration of materials in the extract, the inventors not being desired to be bound by any mechanism or possible or proposed mechanism, here in this section or otherwise. Effects consistent with THC, CBD, CBN, and Terpenes were noted. The extracts of this example were likely a bit more on the "stimulant" side of effects as opposed to the "narcotic" side relative to the flower that was used to make the extract. It is believed that this water only based extraction process for *Cannabis* materials can be used to produce extracts for use in food or beverage, which has become rather commonplace in appropriate circumstances. These results are unexpected as the desirable components of *Cannabis* (cannabinoids and terpenes) are in many cases hydrophobic rather than hydrophilic and the extraction took place using water only as opposed to organic solvents or oils, fats, combinations thereof, and the like which are routinely used for such extractions for medicinal or recreational use, and for cooking in some instances.

Note:
In addition to water or ethanol solvents for extractions, oils and emulsifiers can be used as well for all aspects of the present invention, though more applicable to extraction of resins and such, such as for *cannabis* and hops. Preferable oils include but are not limited to vegetable derived oil, animal derived oil, olive oil, coconut oil, or a combination thereof. Lecithin can also be used to enhance extraction. Preferable lecithins include but are not limited to sunflower lecithin.

Applications:
See Example 15 A. Also, the extracts can be used for medicinal purposes, recreational purposes, or a combination thereof.

Example 24 B: Extraction of Hops Material Using Methods of the Present Invention and Use Thereof This non limiting example establishes that the present invention can be used for the extraction of hops materials and use thereof. The hops materials can be any material from that plant (flower, leaf, stem, stalk, seeds, roots, whole plant, and a combination thereof), and any of the members of the Cannabaceae family and *Humulus* genus, including but not limited to *Humulus lupulus*, the like, or combinations thereof. Note that both *cannabis* and hops are from the same family, Cannabaceae, and that both have desirable components in a resinous form. Thus, the methods of the present invention can include hops as well as *cannabis*, and other compounds that have characteristic of being resinous, hydrophobic, or a combination thereof.

Generally as per Example 24 A, Sealed containers Ball Jars 8 oz are extacted in, water only, dark, heat at 185 F in Ball Jar cooker.

Extraction:
Containers are evaluated for color and clarity and the like every 24 hours. the results were as follows:

Taste Tests:
Samples are taste tested as in Example 24 A, tasted neet and evaluated for hop type flavorings and compared to un-extracted materials.

Note:
In addition to water or ethanol solvents for extractions, oils and emulsifiers can be used as well for all aspects of the present invention, though more applicable to extraction of resins and such, such as for *cannabis* and hops. Preferable oils include but are not limited to vegetable derived oil, animal derived oil, olive oil, coconut oil, or a combination thereof. Lecithin can also be used to enhance extraction. Preferable lecithins include but are not limited to sunflower lecithin.

Applications: See Example 15 A.

Example 25: Scale-Up Preparation of Wood Extracts for Use in Beer Using Sealed Containers, Heat, Dark, Water This non limiting example establishes that the present invention can be scaled up and used for preparation of wood extracts for use in keg beer using sealed containers, heat, dark, with water.

Based on the above experiments, Cherry Wood was selected as the wood to be extracted. Method of extraction were chosen to be heat, dark, and water, following the general procedures of Example 15 A.

A. Extracts for Keg Beer With Extract of Cherry Wood, Water, Heat, Dark, Sealed Containers Materials and Methods and Procedures:
Generally as above in Example 15 A for the indicated wood, solvent, temperature, light, and whether containers where sealed. In this instance, the containers were sealed closed as set forth above. Containers were 1 Qt Ball Jars. Wood was provided at 40 gm per container. Heating in a Ball Jar Cooker to about 185 F. Time as indicated straight through. A total of 6×1 Qt in 1 Qt Cup Ball jars of extract were made. One container was removed from the Ball Jar Cooker after 24 hours, 4 containers removed after 48 hours, and the last container removed after 72 hours. After such removal, the containers were allowed to cool to room temperature, and then refrigerated. The resulting extracts were stored with wood under refrigeration in the dark.

Extraction:
Containers are evaluated for color and clarity and the like every 24 hours, the results were as follows:

| Containers | Days | Comments |
|---|---|---|
| 1 | 1 | Wood sinks, clear golden brown when hot. When cooled to room temperature, color still golden brown but hazy. When cooled to refrigeration, about the same as with room temperature but a bit more hazy. |
| 2-5 | 2 | When hot, about the same as Container 1. When at room temperature, much like 1 with some snow globe effect. When refrigerated, about the same as 1. |
| 6 | 3 | About the same as containers 2-5 |

Containers were stored under refrigeration.
Applications: See Example 15 A.

B. Keg Beer with Extract of Cherry Wood, Water, Heat, Dark, Sealed Containers Using Extracts from this Example Kegging:
In General: To 1 keg of beer, Strong Ale, Abomination, Longship Brewery, San Diego, Calif. (5.16 gallons) are added between about 1 Qt and about 6 Qt of the extract of this example. A starting point for such dosing can be a dilution of 1:20, based on taste testing of extract added to finished beer, and a dilution of 1:40 is noted as desirable in a prior example for a similar extract on a smaller scale as described herein. The mixture is optionally allowed to age for about 1 week to 2 months, and taste tested along the way. Additional beer or extract can optionally be added during the ageing process in order to optimize and adjust flavorings.

Specific Example: After 1 month of storage under refrigeration, the contents of three×1 Qt Containers without wood from Section A (Jars 2, 4, and 6), were added to a 5.16 Gal. beer keg and brought up to full appropriate volume with carbonated and finished Abomination Beer (Longship Brewery, San Diego, Calif.), an American Strong Ale with ABV of about 9.3%. The keg was stored under refrigeration. The dilution of extract to beer was calculated to be about 1:5.88 (1 part beer mixed with 5.88 parts beer).

Taste Tests of Kegged Beer:
Samples were taste tested, the results being a desirable product having fruit and wood flavorings.

Applications: See Example 15 A.

Example 26: Effects of Temperature on Extraction of Cherry Wood and Jack Daniel's® Barrel Wood Chips, Using Sealed Containers, Dark, Water, and the pH and ppm of the Resulting Products This non limiting example establishes the effects of temperature of the reaction conditions of cherry wood and Jack Daniel's® Barrel Wood Chips, and the resulting pH and ppm of the final products.

Materials and Methods and Procedures: were as above for sealed containers for the indicated wood, solvent, temperature, light, and whether containers where sealed. See generally Example 15. In this instance, the containers were sealed closed as set forth above. Containers were 1 C (8 oz) Ball Jars. Solvent was water, purified, as before. Heating in Ball Jar Cooker at 185 F. Time was 24 hours without break. The resulting extracts were stored with wood at room temperature in the dark. Wood was Jack Daniel's® Barrel Wood Chips, sold for use for BBQ, or Cherry Wood Chips as before, with 10 gm wood per container. Containers were 1 Cup Ball Jars. Solvent was water.

A. Cherry Wood Chips
Extraction:
Containers were evaluated for color and clarity and the like when the containers were removed from cooking after 24 hours, and allowed to cool to room temperature, then stored under refrigeration:

| Sample | T (F.) | Comments |
|---|---|---|
| 1 | 100 | Wood sinks/floats, very light brown, slight turbid |
| 2 | 120 | About the same as 1, a little darker light brown |
| 3 | 140 | About the same as 2, a little darker light brown |
| 4 | 160 | Wood sinks/floats, medium brown, turbidity, snowglobe |
| 5 | 170 | About the same as 4, but a little darker medium brown, more turbid at RT, more turbid under refrigeration |
| 6 | 180 | Wood sinks, about the same as 5, a little darker medium brown, more turbid at RT, more turbid under refrigeration |
| 7 | 190 | About the same as 6, more turbid at RT, more turbid under refrigeration |
| 8 | 200 | Wood sinks, golden brown, tubidity and snowglobe, lighter brown than 7, more turbid at RT, more turbid under refrigeration |
| 9 | 205 | About the same as 8, more turbid at RT, more turbid under refrigeration |
| 10 | Room Temp | Control, no wood, only water | pH and ppm:
When ready for taste testing, containers were warmed to room temperature and the pH and ppm taken.
Taste Tests:
Samples were taste tested as is (not in beer or otherwise diluted).

| Sample | T (F.) | pH | ppm | Taste Test |
|---|---|---|---|---|
| 1 | 100 | 4.44 | 35 | wood flavor |
| 2 | 120 | 4.31 | 34 | about like 1 |
| 3 | 140 | 4.13 | 34 | a bit more wood flavor |
| 4 | 160 | 4.16 | 40 | a bit more wood flavor, bitter |
| 5 | 170 | 4.16 | 25 | a bit like 4 |
| 6 | 180 | 4.19 | 45 | stronger wood flavor, bitter |
| 7 | 190 | 4.13 | 45 | stronger than 6, wood/bitter flavors |
| 8 | 200 | 3.96 | 61 | stronger than 7, wood/bitter flavors |
| 9 | 205 | 4.03 | 84 | stronger than 8, wood/bitter |
| 10 | Room Temp | 7.82 | 5 | Water, control |

Rankings:
Preferred temperature between about 180 F and about 190 F. Use 185 F to 190 F for future experiments, noting that 180 F is beginning of "kill step" or pasteurizing temperature. All samples were thought to be sellable products, particularly matched with appropriate beer and/or food.
Applications: See Example 15 A.
B. Jack Daniel's® Barrel Wood Chips or Cherry Wood Chips
Extraction:
Containers were evaluated for color and clarity and the like when the containers were removed from cooking after 24 hours, and allowed to cool to room temperature, then stored under refrigeration:

| Sample | Wood | T (F.) | Comments |
|---|---|---|---|
| 1 | Cherry | 180 | Wood sinks/floats, gold/orange/brown, turbid, snow globe |
| 2 | JD | 180 | Wood sinks, gold/brown, turbid, show globe |
| 3 | Cherry | 185 | About the same as 1, a little darker, more hazy at RT, more hazy under refrigeration |
| 4 | JD | 185 | About the same as 2, a little darker |
| 5 | Cherry | 190 | About the same as 3, a little darker, more hazy at RT, more hazy under refrigeration |
| 6 | JD | 190 | About the same as 4, a little darker |
| 7 | Cherry | 195 | About the same as 5, a little darker, more hazy at RT, more hazy under refrigeration, more hazy under refrigeration |
| 8 | JD | 195 | About the same as 6, a little darker |
| 9 | Cherry | 200 | About the same as 7, a little darker, more hazy at RT |
| 10 | JD | 200 | About the same as 8, a little darker | pH and ppm:
When ready for taste testing, containers were warmed to room temperature and the pH and ppm taken.
Taste Tests:
Samples were taste tested as is (not in beer or otherwise diluted).

| Sample | Wood | T (F.) | pH | ppm | Taste Test |
|---|---|---|---|---|---|
| 1 | Cherry | 180 | 3.82 | 47 | wood and cherry flavor |
| 2 | JD | 180 | 3.64 | 54 | wood and JD flavors |
| 3 | Cherry | 185 | 3.47 | 48 | like 1 but stronger flavors |
| 4 | JD | 185 | 3.55 | 54 | like 2 but stronger flavors |
| 5 | Cherry | 190 | 3.65 | 49 | like 3 but stronger flavors |
| 6 | JD | 190 | 3.55 | 68 | like 4 but stronger flavors |
| 7 | Cherry | 195 | 3.53 | 50 | like 5 but stronger flavors, bitter |
| 8 | JD | 195 | 3.62 | 65 | like 6 but stronger flavors, maybe off flavors |
| 9 | Cherry | 200 | 3.62 | 50 | like 7 but stronger flavors, bitter |
| 10 | JD | 200 | 3.59 | 76 | like 8 but stronger flavors, maybe off flavors |

Rankings:
Preferred temperature between about 180 F and about 190 F. Use 185 F to 190 F (preferably 190 F to aid extraction and to keep at a pasteurizing temperature, preferably throughout extraction process, though that need not be the case) for future experiments, noting that 180 F is beginning of "kill step" or pasteurizing temperature. Increased bitterness to a level that may not be desirable in all uses was noted at over 190 F. All samples were thought to be sellable products, particularly matched with appropriate beer and/or food.
Applications: See Example 15 A.

Example 27: Effects of Ppm on Extraction of Cherry Wood and Jack Daniel's® Barrel Wood Chips, Using Sealed Containers, Dark, Water, and the pH and ppm of the Initial Reaction Solution and the Resulting Products This non limiting example establishes the effects of pH and ppm of the reaction conditions of cherry wood and Jack Daniel's® Barrel Wood Chips, and the resulting pH and ppm of the final products.
Materials and Methods and Procedures: were as above for sealed containers for the indicated wood, solvent, temperature, light, and whether containers where sealed. See generally Example 15. In this instance, the containers were sealed closed as set forth above. Containers were 1 C (8 oz) Ball Jars. Solvent was water, purified, as before. Heating in Ball Jar Cooker at 185 F. Time was 24 hours without break. The resulting extracts were stored with wood at room temperature in the dark. Wood was Jack Daniel's® Barrel Wood Chips, sold for use for BBQ, or Cherry Wood Chips as before, with 10 gm wood per container. Containers were 1 Cup Ball Jars. Solvent was water (purified water unless noted otherwise).

Extraction:
- Containers were evaluated for color and clarity and the like when the containers were removed from cooking after 24 hours, and allowed to cool to room temperature, then stored under refrigeration.
- Water was purified water (H2O), tap water (Tap), or a 1:1 dilution of purified water:tap water (H2O:Tap)
- Tap water from San Diego, Calif., which is known for hard water, without use of a water softener.

| Sample | Water | Wood | T (F.) | Time | Comments |
|---|---|---|---|---|---|
| 1 | H2O | N/A | 190 | 24 hr. | After cooking, water |
| 2 | H2O | Cherry | 190 | 24 hr. | Medium brown/orange, slight turbidity, snow globe at RT, more turbidity in refrigerator |
| 3 | H2O | JD | 190 | 24 hr. | Medium brown, slight turbidity, snow globe at RT. |
| 4 | H2O: Tap | N/A | 190 | 24 hr. | After cooking, water |
| 5 | H2O: Tap | Cherry | 190 | 24 hr. | Medium brown/orange, slight turbidity, snow globe at RT, more turbidity in refrigerator, more turbid than 2 |
| 6 | H2O: Tap | JD | 190 | 24 hr. | Medium brown, slight turbidity, snow globe at RT. |
| 7 | Tap | N/A | 190 | 24 hr. | After cooking, water |
| 8 | Tap | Cherry | 190 | 24 hr. | Medium brown/orange, slight turbidity, snow globe at RT, more turbidity in refrigerator, more turbid than 5. |
| 9 | Tap | JD | 190 | 24 hr. | Medium brown, slight turbidity, snow globe at RT. |
| 10 | H2O | N/A | RT | 0 | Before cooking, water |
| 11 | H2O: Tap | N/A | RT | 0 | Before cooking, water |
| 12 | Tap | N/A | RT | 0 | Before cooking, water | pH and ppm:
- When ready for taste testing, containers were warmed to room temperature and the pH and ppm taken.

Taste Tests:
- Samples were taste tested as is (not in beer or otherwise diluted).

| Sample | Water | Wood | T (F.) | pH | ppm | Taste Test (undiluted/Neet) |
|---|---|---|---|---|---|---|
| 1 | H2O | N/A | 190 | 7.82 | 17 | water |
| 2 | " | Cherry | " | 4.40 | 70 | wood and cherry flavors, best of cherry |
| 3 | " | JD | " | 3.96 | 61 | wood and JD flavors, best of JD |
| 4 | H2O:Tap | N/A | " | 7.42 | 130 | water |
| 5 | " | Cherry | " | 4.32 | 128 | about the same as 2, a little bitter |
| 6 | " | JD | " | 3.95 | 132 | about the same as 3, a little bitter |
| 7 | Tap | N/A | " | 7.17 | 205 | water |
| 8 | " | Cherry | " | 4.53 | 184 | about the same as 5, more bitter |
| 9 | " | JD | " | 4.04 | 192 | about the same as 6, a little more bitter |
| 10 | H2O | N/A | RT | 6.79 | 16 | Measurements before cooking, water |
| 11 | H2O:Tap | N/A | RT | 6.19 | 142 | Measurements before cooking, water |
| 12 | Tap | N/A | RT | 6.10 | 232 | Measurements before cooking, water |

Rankings:
    Preferred ionic strength is around purified H2O or 1:1 purified H2O:Tap water. pH seems dependent upon the wood. The wood itself seems to impart lower pH and higher ppm. All samples were thought to be sellable products, particularly matched with appropriate beer and/or food.
Applications: See Example 15 A.

Example 28: Effects of pH on Extraction of Cherry Wood and Jack Daniel's® Barrel Wood Chips, Using Sealed Containers, Dark, Water, and the pH and ppm of the Initial Reaction Solution and the Resulting Products This non limiting example establishes the effects of pH and ppm of the reaction conditions of cherry wood and Jack Daniel's® Barrel Wood Chips, and the resulting pH and ppm of the final products.
Materials and Methods and Procedures: were as above for sealed containers for the indicated wood, solvent, temperature, light, and whether containers where sealed. See generally Example 15. In this instance, the containers were sealed closed as set forth above. Wood was 10 gm per container. Containers were 1 C (8 oz) Ball Jars. Solvent was water, purified, as before. Heating in Ball Jar Cooker at 185 F. Time was 24 hours without break. The resulting extracts were stored with wood at room temperature in the dark for initial evaluation, then under refrigeration. Wood was Jack Daniel's® Barrel Wood Chips, sold for use for BBQ, or Cherry Wood Chips as before, with 10 gm wood per container. Containers were 1 Cup Ball Jars. Solvent was water.
    A. Moderate ppm Reaction Conditions (Purified H2O:Tap Water at 1:1)
Extraction:
    Containers were evaluated for color and clarity and the like when the containers were removed from cooking after 24 hours, and allowed to cool to room temperature, then stored under refrigeration.
    Water was a 1:1 dilution of purified water:tap water (H2O:Tap)
        Tap water from San Diego, Calif., which is known for hard water, without use of a water softener.
    pH adjusting solutions: General Hydroponics pH Up and pH Down

| Sample | Water | Wood | pH(*) | T (F.) | Time | Comments |
|---|---|---|---|---|---|---|
| 1 | H2O:Tap | N/A | 3 | 190 | 24 hr. | Water, clear, not cooked |
| 2 | " | Cherry | " | " | " | Golden brown, clear, ppt, snow Globe, more turbid at RT, more turbid under refrigeration |
| 3 | " | JD | " | " | " | Light brown, clear, ppt, snow globe |
| 4 | " | N/A | 5 | " | " | Water, clear, not cooked |
| 5 | " | Cherry | " | " | " | About the same as 2, a little darker, more turbid at RT, more turbid under refrigeration |
| 6 | " | JD | " | " | " | About the same as 3, a little darker |
| 7 | " | N/A | 7 | " | " | Water, clear, not cooked |
| 8 | " | Cherry | " | " | " | About the same as 5, a little darker, more turbid at RT, more turbid under refrigeration |
| 9 | " | JD | " | " | " | Dark brown, clear, ppt, snow globe |
| 10 | " | N/A | 9 | " | " | Water, slight turbidity, not cooked |
| 11 | " | Cherry | " | " | " | About the same as 8, a little darker, more turbid at RT, more turbid under refrigeration |
| 12 | " | JD | " | " | " | About the same as 9, slightly lighter in color |

(*)pH indicated is approximate pH of starting solution for extraction.

When ready for taste testing, containers were warmed to room temperature and the pH and ppm taken.
Taste Tests:
    Samples were taste tested as is (not in beer or otherwise diluted).
    Sample

| (pH*) | Water | Wood | pH() | ppm() | Comments |
|---|---|---|---|---|---|
| 1(3) | H2O: Tap | N/A | 3.30 | 235 | Water, not cooked |
| 2(3) | " | Cherry | 3.78 | 197 | Wood and cherry flavors |
| 3(3) | " | JD | 4.00 | 235 | Wood and JD flavors |
| 4(5) | " | N/A | 5.08 | 99 | Water, not cooked |
| 5(5) | " | Cherry | 4.00 | 145 | About the same as 2 |
| 6(5) | " | JD | 4.40 | 151 | About the same as 3, best JD |
| 7(7) | " | N/A | 6.98 | 181 | Water, not cooked |
| 8(7) | " | Cherry | 4.90 | 165 | About the same as 5, stronger flavors, best cherry |
| 9(7) | " | JD | 5.02 | 170 | Woody, no JD, not as good as 3 or 6 |
| 10(9) | " | N/A | 9.30 | 175 | Water, not cooked |

| (pH*) | Water | Wood | pH() | ppm() | Comments |
|---|---|---|---|---|---|
| 11(9) | " | Cherry | 5.30 | 151 | About the same as 8 |
| 12(9) | " | JD | 5.47 | 142 | About the same as 9, not as good as 3 or 6 |

(*)pH indicated is approximate pH of starting solution for extraction.
(**)pH and ppM indicates pH of final product Rankings and Comments:
Used purified H2O or 1:1 purified H2O:Tap water as wanting something for the buffer in the pH Up and pH Down to work on. Maybe try using purified H2O to address high ppm of starting solution. pH and ppm seems dependent upon the wood. The wood itself seems to impart lower pH and higher ppm. Increase in pH results in increase of dry feel on tongue, which may be the result of tannins in the extract. For JD samples, pH above 5 resulted in loss of JD flavors. Note the pH and ppm levels, where increased ppm levels at the outer pH levels, probably due to the pH adjusting solutions. Thus, the pH and ppm have both have an effect on the extraction product and should be taken into account. All samples were thought to be sellable products, particularly matched with appropriate beer and/or food.

Applications: See Example 15 A.

B. Lower ppm Reaction Conditions (Purified H2O)

Extraction:
Containers were evaluated for color and clarity and the like when the containers were removed from cooking after 24 hours, and allowed to cool to room temperature, then stored under refrigeration.

Water was purified water.

pH adjusting solutions:
  a. pH up, Sodium Bicarbonate (Arm and Hammer Baking Soda) at 1 T per 500 ml water
  b. pH down, Citric Actid (Milliard for use in food) at 1 T per 500 ml water

| Sample | Water | Wood | pH(*) | T (F.) | Time | Comments |
|---|---|---|---|---|---|---|
| 1 | H2O | N/A | 3 | 190 | 24 hr. | Water, clear, not cooked |
| 2 | " | Cherry | " | " | " | Golden brown, clear, ppt, snow globe, more turbid at RT, more turbid under refrigeration |
| 3 | " | JD | " | " | " | Light brown, clear, ppt, snow globe |
| 4 | " | N/A | 5 | " | " | Water, clear, not cooked |
| 5 | " | Cherry | " | " | " | About the same as 2, a little darker, more turbid at RT, more turbid under refrigeration |
| 6 | " | JD | " | " | " | About the same as 3, a little darker |
| 7 | " | N/A | 7 | " | " | Water, clear, not cooked |
| 8 | " | Cherry | " | " | " | About the same as 5, a little darker, more turbid at RT, more turbid under refrigeration |
| 9 | " | JD | " | " | " | Dark brown, clear, ppt, snow globe |
| 10 | " | N/A | 8 | " | " | Water, clear, not cooked |
| 11 | " | Cherry | " | " | " | About the same as 8, a little darker, |
| 12 | " | JD | " | " | " | About the same as 9, slightly darker |

(*)pH indicated is approximate pH of starting solution for extraction.

When ready for taste testing, containers were warmed to room temperature and the pH and ppm taken. Starting pH and ppm of water samples, not cooked, are as follows:

| Indicated pH | Initial pH | Initial ppm |
|---|---|---|
| 3 | 3.09 | 148 |
| 5 | 5.02 | 20 |
| 7 | 6.95 | 277 |
| 8 | 8.00 | 561 |

Taste Tests:
Samples were taste tested as is (not in beer or otherwise diluted).

Sample

| (pH*) | Water | Wood | pH() | ppm() | Comments |
|---|---|---|---|---|---|
| 1(3) | H2O | N/A | 3.19 | 114 | Water, not cooked, acidic taste |
| 2(3) | " | Cherry | 3.56 | 104 | Wood and cherry flavors, tannin heavy |
| 3(3) | " | JD | 3.66 | 145 | Wood and JD flavors, acidic |
| 4(5) | " | N/A | 5.28 | 15 | Water, not cooked |
| 5(5) | " | Cherry | 4.15 | 72 | About the same as 2, but less flavors |
| 6(5) | " | JD | 4.20 | 50 | About the same as 3, but less flavors |
| 7(7) | " | N/A | 6.91 | 247 | Water, not cooked |
| 8(7) | " | Cherry | 6.07 | 208 | About the same as 5, but less flavors |
| 9(7) | " | JD | 6.37 | 197 | Woody, no JD flavors |
| 10(8) | " | N/A | 8.03 | 541 | Water, not cooked |
| 11(8) | " | Cherry | 6.65 | 484 | About the same as 8, but less flavors |
| 12(8) | " | JD | 6.69 | 492 | Woody, no JD flavors |

(*)pH indicated is approximate pH of starting solution for extraction.
(**)pH and ppM indicates pH of final product Rankings and Comments:
The pH and ppm of the product seems dependent upon the wood. The wood itself seems to impart lower pH and higher ppm. For JD samples, pH above 5 resulted in loss of JD flavors. Note the pH and ppm levels, where increased ppm levels at the outer pH levels, probably due to the pH adjusting solutions. Thus, the pH and ppm have both have an effect on the extraction product and should be taken into account. All samples were thought to be sellable products, particularly matched with appropriate beer and/or food.

Applications: See Example 15 A.

Example 29: Effects of Pressure and Temperature on Extraction of Cherry Wood and Jack Daniel's® Barrel Wood Chips, Using Sealed or Open Containers, Dark, Water, in Instant Pot Ultra Pressure Cooker This non limiting example establishes the effects of pressure and temperature of the reaction conditions of cherry wood and Jack Daniel's® Barrel Wood Chips, and the resulting pH and ppm of the final products.

Materials and Methods and Procedures: were as above for sealed containers for the indicated wood, solvent, temperature, light, and whether containers where sealed. Unsealed containers were also used. See generally Example 15. Containers were 1 C (8 oz) Ball Jars. Solvent was water, purified, as before. Instant Pot Ultra 60 (6 Qt, SKU: ULTRA-60-NA, MODEL: ULTRA 60) was used for cooking. Setting was Pressure Cook, Low Pressure or High Pressure, for indicated times. Manufactures instructions were followed. Pressure release was "natural" or "slow" rather than rapid, though remaining pressure was tested by short release of pressure valve. Jars were placed in Instant Pot on a rack with appropriate amount of water in the instant Pot. The resulting extracts were stored with wood at room temperature in the dark for initial evaluation, then stored under refrigeration. Wood was Jack Daniel's® Barrel Wood Chips, sold for use for BBQ, or Cherry Wood Chips as before, with 10 gm wood per container. Containers were 1 Cup Ball Jars. Solvent was water.

Instant Pot Ultra Pressure and Temperature Settings

| Pressure Cook Setting | Pressure (psi) | Temperature (F.) |
|---|---|---|
| Low | 5.8-7.2 | 229-233 |
| High | 10.2-11.6 | 239-244 |

A. Initial Tests, Cherry Wood Chips and Jack Daniel's Barrel Wood Chips in Open and Sealed Containers, Water, Pressure Cook Setting at Low or High for 30 Minutes to 120 Minutes Extraction:
Containers were evaluated for color and clarity and the like when the containers were removed from cooking while still hot and if unsealed/open, were sealed with cap and rim for Ball Jars, and allowed to cool to room temperature, then stored under refrigeration. Water was purified water as before

| Sample | Wood | Setting | Pressure and Temp Setting | Time | Open or Sealed | Comments |
|---|---|---|---|---|---|---|
| 1 | Cherry | Pressure Cook | Low | 30" | Open | Clear, light golden brown, wood wood sinks, slight haze, snowglobe, more hazy at RT, more hazy under refrigeration |
| 2 | JD | " | " | " | " | Clear, light brown, wood sinks, slight haze, snowglobe, more hazy at RT, more hazy under refrigeration |
| 3 | Cherry | " | High | " | " | Clear, light golden brown, wood sinks, light haze, snowglobe, about like 1, more hazy at RT, more hazy under refrigeration |
| 4 | JD | " | " | " | " | Clear, light brown, wood sinks, slight haze, snowglobe, about the same as 2, more hazy at RT, more hazy under refrigeration. |
| 5 | Cherry | " | Low | " | Sealed | Clear, very light yellow/brown, wood floats, lots of small bubbles, slight haze, slight snowglobe, more hazy at RT, more hazy under refrigeration |

-continued

| Sample | Wood | Setting | Pressure and Temp Setting | Time | Open or Sealed | Comments |
|---|---|---|---|---|---|---|
| 6 | JD | " | " | " | " | Clear, very light yellow/brown, wood floats/sinks, lots of small bubbles, slight haze, slight snowglobe, more hazy at RT, more hazy under refrigeration |
| 7 | Cherry | " | High | " | " | Clear, light yellow/brown, wood floats/sinks, lots of small bubbles, slight haze, slight snowglobe, more hazy at RT, more hazy under refrigeration |
| 8 | JD | " | " | " | " | Clear, light yellow/brown, wood floats/sinks. Lots of small bubbles, slight haze, slight snowglobe, more hazy at RT, more hazy under refrigeration |
| 9 | Cherry | " | High | 60" | Open | Clear, medium golden brown, wood sinks, slight haze, showglobe, more hazy at UR, more hazy under refrigeration |
| 10 | JD | " | " | " | " | Clear, medium brown, wood sinks, slight haze, snowglobe, more hazy at RT, more hazy under refrigeration |
| 11 | Cherry | " | " | 120" | " | Clear, medium golden brown, wood sinks, slight haze, snowglobe, loss of some volume from container (about 2 T), more hazy at RT, more hazy under refrigeration |
| 12 | JD | " | " | " | " | Clear, medium brown, wood sinks, slight haze, snowglobe, loss of some volume (about 2 T), more hazy at RT, more hazy under refrigeration. |

When ready for taste testing, containers were warmed to room temperature and the pH and ppm taken.

Taste Tests:

Samples were taste tested as is (not in beer or otherwise diluted).

| Sample | Wood | Setting | Pressure/Temp | Time | Open/Sealed | pH* | ppm* | (Comments) |
|---|---|---|---|---|---|---|---|---|
| 1 | Cherry | Pressure Cook | Low | 30" | Open | 4.01 | 48 | |
| | | (Cherry and wood flavors, good) | | | | | | |
| 2 | JD | " | " | " | " | 3.87 | 32 | |
| | | (Wood flavors, some JD, good) | | | | | | |
| 3 | Cherry | " | High | " | " | 3.85 | 37 | |
| | | (Cherry and wood vlavors, weaker than 1, ok product) | | | | | | |
| 4 | JD | " | " | " | " | 3.48 | 36 | |
| | | (Wood flavors, weaker than 2, ok product) | | | | | | |
| 5 | Cherry | " | Low | " | Sealed | 4.20 | 25 | |
| | | (Watery, some cherry and wood flavors, weak) | | | | | | |
| 6 | JD | " | " | " | " | 3.61 | 26 | |
| | | (Weak, some wood flavors) | | | | | | |
| 7 | Cherry | " | High | " | " | 4.03 | 33 | |
| | | (Cherry and wood flavors, good) | | | | | | |
| 8 | JD | " | " | " | " | 3.52 | 28 | |
| | | (Watery, some wood flavors) | | | | | | |
| 9 | Cherry | " | High | 60" | Open | 3.78 | 35 | |
| | | (Cherry and wood flavors, good) | | | | | | |
| 10 | JD | " | " | " | " | 3.34 | 38 | |
| | | (Wood flavors, some JD, good) | | | | | | |
| 11 | Cherry | " | " | 120" | " | 3.61 | 34 | |
| | | (Cherry and wood flavors, good) | | | | | | |
| 12 | JD | " | " | " | " | 3.08 | 56 | |
| | | (Wood flavors, weak) | | | | | | |

*pH and ppm indicates pH and ppm of final product

Rankings and Comments:
    Cherry wood: All useable with some standouts.
    JD wood: All useable with some standouts.
    Open containers seem better than closed containers.
    For Time of cooking, 30", 60", and 120" show differences. See also later examples, for 2 hr and 4 hr.
    Low and High Temperatures show differences. See also later examples.
Applications: See Example 15 A.

Example 30: Wood Extracts in Beer in Take Away Pressurized Growler with Point of Sale Dispensed Beer This non-limiting example establishes that an extract of the present invention can be added to a point of use pressurized Growler for use over time. This configuration is different from extract being added to the beer prior to bottling or kegging and then allowed to age as the beer can be used immediately, or allowed to age before use, or aged during use of the pressurized keg.
Materials and Methods and Procedures: were as above for sealed containers for the indicated wood, solvent, temperature, light, and whether containers where sealed. Unsealed containers were also used. See generally Example 15. Containers were 1 C (8 oz) Ball Jars. Solvent was water, purified, as before. Instant Pot Ultra 60 (6 Qt, SKU: ULTRA-60-NA, MODEL: ULTRA 60) was used for cooking. Setting was Pressure Cook, High Pressure, for indicated time of 2 hours. Manufactures instructions were followed. Pressure release was "natural" or "slow" rather than rapid, though remaining pressure was tested by short release of pressure valve. Jars were placed in Instant Pot on a rack with appropriate amount of water in the instant Pot. Jars were kept open during cooking, and sealed upon opening of the Instant Pot after the cooking and pressure release were completed The resulting extracts were evaluated when hot, then stored with wood at room temperature in the dark for initial evaluation, then stored under refrigeration. Wood was Cherry Wood Chips as before, with 10 gm wood per container. Containers were 1 Cup Ball Jars. Solvent was water. Growler as Growler-Werks, CO2 pressurized 64 oz container.

| Sample | Wood | Setting | Pressure and Temp Setting | Time | Open or Sealed | Comments |
| --- | --- | --- | --- | --- | --- | --- |
| 1 & 2 | Cherry | Pressure Cook | High | 2 hr. | Open | Volume maintained in containers, when hot liquid is orange/bold/brown, haze noted, and snowglobe effect. More hazy at RT. More hazy under refrigeration. Taste tests undiluted: good and consistent with prior cherry wood extracts under similar conditions, wood and cherry/fruit flavors. |

High Temperature and Pressure=10.2-11.6 psi, 239-244 F
    Once cooled to refrigeration temperature, jars were shaken and the liquid separated from wood by straining and/or decanting into a fresh container. Wood was rinsed in purified water and that rinse solution was used to raise the volume to the original volume. New jars were sealed with cap and band and cooed in Instant Pot for 30" sealed at low pressure under pressure cook setting to pasteurize or sterilize for storage under refrigeration
    The two jars of extracts (2×1 cup) were added to the 64 oz pressurized growler, which was increased to volume with Odinson #5 beer (Pale Ale, 4.9% ABV, 30 IBU, Longship Brewery, San Diego, Calif.). This represents 2 parts extract added to 6 parts beer for 8 parts total, or a 2:6 dilution, or a 1:3 dilution.
    Beer with extract made in this way was found to be a sellable good product, fruit flavors at the start and wood flavors at the finish. The extract flavors blended or diminished over time. When growler was cleaned, there was some pink/orange light precipitate in the bottom of the growler, but would not be expected to be clogging or otherwise detrimental to the product.
    Applications: See Example 15 A.

Example 31: Scale Up of Wood Extracts Made in Pressure Cooker (1 Gallon Batches) and Use in Beer This non limiting example establishes that the processes are scalable to 1 Gal in an Instant Pot Pressure Cooker.
Materials and Methods and Procedures: Rather than using jars (1 cup, sealed or unsealed), the pressure cooker was used without jars, the water and wood being added into the pressure cooker, the pressure cooker programmed and run. Upon completion of the cooking run, while still hot, at least two 1 cup samples of liquid only were placed in 1 cup Ball Jars, which were then sealed and observed at hot temperature, RT, and under refrigeration. Such jars were stored under refrigeration. Generally, solvent was water, purified, as before. Instant Pot Ultra 60 (6 Qt, SKU: ULTRA-60-NA, MODEL: ULTRA 60) was used for cooking. Setting was Pressure Cook, High or Low Pressure, for indicated time.
    Wood was as indicated, being 64 gm per gallon (which is less than before (being 160 gm per gallon equivalent which is used in later examples)) or 160 gm per gallon, or other as indicated.
    Wood was placed in a folding out vegetable steamer having open and closed configurations. The vegetable steamer, when used, was placed on top of the Instant Pot steamer rack. In the past, when a Crock Pot was used, it seemed that the wood chips in direct contact with the variably heated lower surface of the Crock Pot resulted in hot spots and perhaps inconstant product, and could be the result of oxidation, though the inventors are not wishing to be bound by any mechanism, proposed or otherwise.
    Manufactures instructions were followed. Pressure release was "natural" or "slow" rather than rapid, though remaining pressure was tested by short release of pressure valve. The resulting extracts were evaluated when hot, then stored at room temperature in the dark for initial evaluation, then stored under refrigeration. Solvent was water. Growler as GrowlerWerks, CO2 pressurized 64 oz container, when used.

A. Jack Daniel's® Barrel Wood Chips, 64 gm Per Gallon of Water, Open Configuration Vegetable Steamer, High Pressure Cook Setting, 2 Hours, Natural/Slow Pressure Release Note: The closed vegetable steamer configuration was used as striving to make a "tea bag" of sorts for the wood chips. The open vegetable steamer configuration is believed to allow a greater overall flow through of solvent.

Note: 160 gm wood per Gallon of Water is a concentration that is consistent with higher quality products from past examples. 64 gm per Gallon or ⅝ Gallon were relatively low concentration.

| Sample | Wood | Setting | Pressure and Temp Setting | Time | pH | ppm | (Comments) |
|---|---|---|---|---|---|---|---|
| 1 & 2 | JD | Pressure Cook | High | 2 hr. | 3.68 | 26 | |

When hot, clear, green/brown/yellow, hazy, snowglobe. At RT, more hazy. Under refrigeration, more hazy. No heavy precipitate was noted, as opposed to that noted in the Crock Pot. Taste Test: Appears to be a high quality product, no Bourbon odor, which may have been loss to steam or the storage bag for the wood chips being opened and closed many times. Flavor of wood, some JD flavors, a little watery but good, very desirable color JD wood in bag was getting a bit old and less JD odors noted over time, presumably as the bag was being opened and closed too many times.

High Temperature and Pressure=10.2-11.6 psi, 239-244 F

Low Temperature and Pressure=5.8-7.2 psi, 229-233 F

Applications: See Example 15 A.

B. Cherry Wood Chips, 64 gm Per ⅝ Gallon of Water, Closed Configuration Vegetable Steamer, High Pressure Cook Setting, 2 Hours, Natural/Slow Pressure Release Note: The closed vegetable steamer configuration was used as striving to make a "tea bag" of sorts for the wood chips. The open vegetable steamer configuration is believed to allow a greater overall flow through of solvent.

Note: 160 gm wood per Gallon of Water is a concentration that is consistent with higher quality products from past examples. 64 gm per Gallon or ⅝ Gallon were relatively low concentration.

| Sample | Wood | Setting | Pressure and Temp Setting | Time | pH | ppm | (Comments) |
|---|---|---|---|---|---|---|---|
| 1 & 2 | Cherry | Pressure Cook | High | 2 hr. | 3.98 | 18 | |

When hot, clear, light yellow/brown, hazy, snowglobe. Lighter than color than other Cherry wood extracts. At RT, more hazy. Under refrigeration, more hazy. No heavy precipitate was noted, as opposed to that noted in the Crock Pot. Taste Test: Cherry/fruit and wood flavors, a good product.

High Temperature and Pressure=10.2-11.6 psi, 239-244 F

Low Temperature and Pressure=5.8-7.2 psi, 229-233 F

Applications: See Example 15 A.

C. Cherry Wood Chips, 64 gm Per Gallon of Water, Open Configuration Vegetable Steamer, High Pressure Cook Setting, 2 Hours, Natural/Slow Pressure Release Note: The closed vegetable steamer configuration was used as striving to make a "tea bag" of sorts for the wood chips. The open vegetable steamer configuration is believed to allow a greater overall flow through of solvent.

Note: 160 gm wood per Gallon of Water is a concentration that is consistent with higher quality products from past examples. 64 gm per Gallon or ⅝ Gallon were relatively low concentration.

| Sample | Wood | Setting | Pressure and Temp Setting | Time | pH | ppm | (Comments) |
|---|---|---|---|---|---|---|---|
| 1 & 2 | Cherry | Pressure Cook | High | 2 hr. | 3.92 | 15 | |

When hot, clear, light yellow/brown, hazy, snowglobe. At RT, more hazy. Under refrigeration, more hazy. No heavy precipitate was noted, as opposed to that noted in the Crock Pot. Taste Test: Cherry/fruit and wood flavors, flavors a bit subtle, a good product.

High Temperature and Pressure=10.2-11.6 psi, 239-244 F

Low Temperature and Pressure=5.8-7.2 psi, 229-233 F

Applications: See Example 15 A.

D. Cherry Wood Chips, 64 gm Per Gallon of Water, No Vegetable Steamer, High Pressure Cook Setting, 2 Hours, Natural/Slow Pressure Release Note: The closed vegetable steamer configuration was used as striving to make a "tea bag" of sorts for the wood chips. The open vegetable steamer configuration is believed to allow a greater overall flow through of solvent. In this example, no vegetable steamer was used, and no Instant Pot steamer rack was used as well.

Note: 160 gm wood per Gallon of Water is a concentration that is consistent with higher quality products from past examples. 64 gm per Gallon or ⅝ Gallon were relatively low concentration.

| Sample | Wood | Setting | Pressure and Temp Setting | Time | pH | ppm | (Comments) |
|---|---|---|---|---|---|---|---|
| 1 & 2 | Cherry | Pressure Cook | High | 2 hr. | 3.94 | 18 | |

When hot, clear, light gold/yellow brown, hazy, snowglobe. At RT, more hazy. Under refrigeration, more hazy. No heavy precipitate was noted, as opposed to that noted in the Crock Pot. Taste Test: Cherry/fruit and wood flavors, a good product.

High Temperature and Pressure=10.2-11.6 psi, 239-244 F

Low Temperature and Pressure=5.8-7.2 psi, 229-233 F

Applications: See Example 15 A.

E. Cherry Wood Chips, 160 gm Per Gallon of Water, No Vegetable Steamer, High Pressure Cook Setting, 2 Hours, Natural/Slow Pressure Release Note: The closed vegetable steamer configuration was used as striving to make a "tea bag" of sorts for the wood chips. The open vegetable steamer configuration is believed to allow a greater overall flow through of solvent. In this example, no vegetable steamer was used, and no Instant Pot steamer rack was used as well.

Note: 160 gm wood per Gallon of Water is a concentration that is consistent with higher quality products from past examples. 64 gm per Gallon or ⅝ Gallon were relatively low concentration.

| Sample | Wood | Pressure Setting | Pressure and Temp Setting | Time | pH | ppm | (Comments) |
|---|---|---|---|---|---|---|---|
| 1 & 2 | Cherry | Pressure Cook | High | 2 hr. | 3.70 | 34 | |

When hot, clear, yellow/brown, hazy, snowglobe. At RT, more hazy. Under refrigeration, more hazy. No heavy precipitate was noted, as opposed to that noted in the Crock Pot. Taste Test: Cherry/fruit and wood flavors, tannins, a good product, like the preferred products for closed containers cooked in Ball Jar Cooker.

High Temperature and Pressure=10.2-11.6 psi, 239-244 F
Low Temperature and Pressure=5.8-7.2 psi, 229-233 F
Applications: See Example 15 A.

F. Cherry Wood Chips, 160 gm Per Gallon of Water, No Vegetable Steamer, High Pressure Cook Setting, 4 Hours, Natural/Slow Pressure Release Note: The closed vegetable steamer configuration was used as striving to make a "tea bag" of sorts for the wood chips. The open vegetable steamer configuration is believed to allow a greater overall flow through of solvent. In this example, no vegetable steamer was used, and no Instant Pot steamer rack was used as well.

Note: 160 gm wood per Gallon of Water is a concentration that is consistent with higher quality products from past examples. 64 gm per Gallon or ½ Gallon were relatively low concentration.

| Sample | Wood | Pressure Setting | Pressure and Temp Setting | Time | pH | ppm | (Comments) |
|---|---|---|---|---|---|---|---|
| 1 & 2 | Cherry | Pressure Cook | High | 4 hr. | 3.54 | 41 | |

When hot, clear, yellow/brown, hazy, no pronounced snowglobe. At RT, more hazy.

Under refrigeration, more hazy. No heavy precipitate was noted, as opposed to that noted in the Crock Pot. Taste Test: Cherry/fruit and wood flavors, tannins, a good product, like the preferred products for closed containers cooked in Ball Jar Cooker.

High Temperature and Pressure=10.2-11.6 psi, 239-244 F
Low Temperature and Pressure=5.8-7.2 psi, 229-233 F
Product in Point of Sale Beer: 1 part extract (one 8 oz jar of extract) was added to 7 parts beer (1 part is 1 cup) for a total of 8 cups. Thus, a 1:7 dilution of extract:beer in the pressurized 64 oz GrowlerWerks pressurized keg. Beer was Sunstone, a Pilsner from Longship Brewery, San Diego, Calif. Beer product was found to be quite flavorful and wood and fruit flavors came though well.
Applications: See Example 15 A.

G. Cherry Wood Chips, 160 gm Per Gallon of Water, No Vegetable Steamer, Low Pressure Cook Setting, 4 Hours, Natural/Slow Pressure Release Note: The closed vegetable steamer configuration was used as striving to make a "tea bag" of sorts for the wood chips. The open vegetable steamer configuration is believed to allow a greater overall flow through of solvent. In this example, no vegetable steamer was used, and no Instant Pot steamer rack was used as well.

Note: 160 gm wood per Gallon of Water is a concentration that is consistent with higher quality products from past examples. 64 gm per Gallon or ½ Gallon were relatively low concentration.

| Sample | Wood | Pressure Setting | Pressure and Temp Setting | Time | pH | ppm | (Comments) |
|---|---|---|---|---|---|---|---|
| 1 & 2 | Cherry | Pressure Cook | Low | 4 hr. | 2.25 | 32 | |

When hot, clear, yellow/brown, hazy, snowglobe. At RT, more hazy. Under refrigeration, more hazy. No heavy precipitate was noted, as opposed to that noted in the Crock Pot. Taste Test: Cherry/fruit and wood flavors, tannins, a good product, like the preferred products for closed containers cooked in Ball Jar Cooker.

High Temperature and Pressure=10.2-11.6 psi, 239-244 F

Low Temperature and Pressure=5.8-7.2 psi, 229-233 F

Applications: See Example 15 A.

Example 32: Effects of the Presence of Volatiles in Extract Preparation in Pressure Cooker This non limiting example establishes the effects of the presence of volatiles in the reaction mixture when a pressure cooker is used for extraction procedures. Pre-soaking of wood chips in spirits was used to add volatiles to the reaction mixture.

Materials and Methods and Procedures: As before, 1 cup ball jars were used, sealed or unsealed, with 10 gm of indicated wood, cooked in Instant Pot pressure cooker at indicate temperature/pressure and time. Upon completion of the cooking run, while still hot, any open containers were sealed with cap and rim for Ball Jars. All jars were observed at hot temperature, RT, and under refrigeration. Such jars were stored under refrigeration. Generally, solvent was water, purified, as before. Instant Pot Ultra 60 (6 Qt, SKU: ULTRA-60-NA, MODEL: ULTRA 60) was used for cooking. Setting was Pressure Cook, High or Low Pressure, for indicated time. Manufactures instructions were followed. Pressure release was "natural" or "slow" rather than rapid, though remaining pressure was tested by short release of pressure valve. The resulting extracts were evaluated when hot, then stored at room temperature in the dark for initial evaluation, then stored under refrigeration. Solvent was water. Growler as GrowlerWerks, CO2 pressurized 64 oz container, when used. Pre-soaking of wood was done for 24 hours in the indicated containers with wood, the wood being just covered with the indicated spirit. After overnight, the spirit was removed by decanting, the volume in the jar increased to desired level with purified water, the containers sealed or unsealed as indicated, and cooked as indicated.

A. Jack Daniel's® Barrel Wood Chips, Pre-Soaked in Jack Daniel's® Bourbon, 10 gm Per Cup of Water, Open/Closed Ball Jar Containers, Low Pressure Cook Setting, 1 Hour, Natural/Slow Pressure Release

| Sample | Wood | Setting | Pressure and Temp Setting | Open or Closed | Time | pH | ppm | (Comments) |
|---|---|---|---|---|---|---|---|---|
| 1 | JD | Pressure Cook | Low | Open | 1 hour | 3.57 | 33 | |
| | When hot, clear, light brown, hazy, snowglobe noted. At RT, more hazy. Under refrigeration, more hazy. Taste Test: some JD odor, wood flavor, a little JD flavor. | | | | | | | |
| 2 | JD | Pressure Cook | Low | Closed | 1 hour | 3.39 | 28 | |
| | When hot, clear, light brown, hazy, snowglobe noted. At RT, more hazy. Under refrigeration, more hazy. Taste Test: some JD odor, wood flavor, a little JD flavor. | | | | | | | |

JD wood in bag was getting a bit old and less JD odors noted over time, presumably as the bag was being opened and closed too many times.

High Temperature and Pressure=10.2-11.6 psi, 239-244 F
Low Temperature and Pressure=5.8-7.2 psi, 229-233 F It may be that sealed jars in Ball jar Cooker is the best for samples with volatiles, such as ethanol based pre-soak or "wet" barrel wood and the like. Prior examples showed that heat may kill off spirts, ethanol, and flavors, which could be due to temperature or venting. A pressure cooker would tend to be expected to have more venting than a closed Ball Jar during cooking. Temperatures of between about 180 and about 190 F may be preferable for such volatiles.

Applications: See Example 15 A.

B. Jack Daniel's® Barrel Wood Chips or Cheery Wood Chips or Mesquite Wood Chips, Optionally Pre-Soaked in Jim Beam® Bourbon, 10 gm Per Cup of Water, Sealed/Closed Ball Jar Containers, Ball Jar Cooker, 1 Hour,

| Sample | Wood | Jim Beam Pre-Soak | Temp (F.) | Open Or Closed | Time | pH | ppm |
|---|---|---|---|---|---|---|---|
| | | | | (Comments) | | | |
| 1 | JD | No | 185-190 | Closed | 24 hours | 3.56 | 45 |
| | When hot, clear, yellow/brown, hazy, snowglobe noted. At RT, about the same. Under refrigeration, about the same. Taste Test: wood and Bourbon flavors | | | | | | |
| 2 | JD | Yes | 185-190 | Closed | 24 hours | 3.35 | 33 |
| | When hot, clear, yellow/brown, hazy, snowglobe noted. At RT, about the same. Under refrigeration, about the same. Taste Test: about the same as 1, but more Bourbon flavors than 1 | | | | | | |
| 3 | Cherry | No | 185-190 | Closed | 24 hours | 3.52 | 42 |
| | When hot, clear, yellow/brown/orange, hazy, snowglobe noted. At RT, about the same. Under refrigeration, more hazy. Taste Test: wood and fruit flavors. | | | | | | |
| 4 | Cherry | Yes | 185-190 | Closed | 24 hours | 3.83 | 20 |
| | When hot, clear, yellow/brown/orange, hazy, snowglobe noted. At RT, about the same. Under refrigeration, about the same. Taste Test: less flavorings than 3, but some Bourbon flavors | | | | | | |
| 5 | Mesquite | No | 185-190 | Closed | 24 hours | 4.15 | 97 |
| | When hot, clear, dark brown, hazy, snowglobe noted. At RT, more hazy. Under refrigeration, more hazy. Taste Test: wood and smoky flavors | | | | | | |
| 6 | Mesquite | Yes | 185-190 | Closed | 24 hours | 4.09 | 101 |
| | When hot, clear, medium brown, hazy, snowglobe noted. At RT, more hazy. Under refrigeration, more hazy. Taste Test: wood and some smoky flavors, with some Bourbon flavors. | | | | | | |

JD wood in bag was getting a bit old and less JD odors noted over time, presumably as the bag was being opened and closed too many times.

High Temperature and Pressure=10.2-11.6 psi, 239-244 F
Low Temperature and Pressure=5.8-7.2 psi, 229-233 F It may be that sealed jars in Ball jar Cooker is the best for samples with volatiles, such as ethanol based pre-soak or "wet" barrel wood and the like. Prior examples showed that heat may kill off spirts, ethanol, and the associated flavors, which could be due to temperature or venting upon release of pressure from the pressure cooker. Other possibilities are temperature degradation of flavors, or oxidization, or a combination thereof, though applicants are not limited to a particular mechanism of action and provide such proposed mechanisms as a possibility rather than as an admission or otherwise being a limitation or bound interpretation. A pressure cooker would tend to be expected to have more venting than a closed Ball Jar during cooking. Temperatures of between about 180 and about 190 F may be preferable for such volatile compounds.

Product in Point of Sale Beer: I part extract (Mesquite Wood Pre-Soaked in Jim Beam Bourbon) were added to 7 parts beer (Sunstone, a Pilsner, from Longship Brewery, San Diego, Calif.). Wood and Bourbon flavors were noted, with some smoky flavors. Treated beer is mellower than starting beer. Rather good, and flavors build when in the glass.

Applications: See Example 15 A.

Example 33: Large Volume Extracts of Wood in Pressure Cooker, Taste Tests of Extracts in a Variety of Commercial Beers in Pressurized Container Over Time This non limiting example establishes that large volumes of extracts can be made and used to dose (add material to beer, like a dose of a drug to a patient in need) commercially available beers available from local craft breweries in San Diego, Calif.

Materials and Methods and Procedures: Generally as per Example 31. Extraction of 160 gm wood in 1 gallon of purified water, extraction made using an Instant Pot on Low or High Pressure cycle, from between about 1 hour and about 4 hours. The first Apple wood extract was made at High Pressure Setting for 4 hours**. Later extracts were made as indicated below. Beer was purchased to fill a 64 oz GrowlerWerks pressurized growler, and taken home. About 3 cups of beer were decanted and the extract dosed into the beer. The volume of the beer in the growler was topped off from the decanted beer. The growler was pressurized under carbon dioxide per manufacture instructions for the growler and stored under refrigeration. Samples of the dosed beer in the growler were observed for clarity and color in a clear glass after dispensing from the growler, and tasted over time, between about 1 hour and about 5 days. In most if not all instances, over time the beer was clarified (turbidity when present from the extract had settle out, and the extracts seem to have the ability to clarify beer, perhaps as a compound or structure that promotes aggregation, flocculation, precipitation, the like, or a combination thereof in a beer product, the invention not being limited in any way to any mechanism proposed) and reached a consistent flavor profile and clarity at day 1 or 2, and the unique flavors were noted upon mixing an extract with beer at day 0. Rarely would such settling and reaching consistent flavor profile would extend past 2 or 3 days' time.

| Wood | Dose* | Beer | Comments |
|---|---|---|---|
| Apple** | 1:7 | Pilsner, Sunstone Longship Brewery, SD, CA | Wood and fruit flavors are quite noticeable. |
| Apple** | 1:7 | Red Ale, Eric the Red Longship Brewery, | Product mellowing noted, as well as fruit and wood flavors. |
| Apple** | 1:7 | Stout - Salted Caramel, Rollo, Longship Brewery | Good wood flavors, though a little weak. |
| Apple** | 1:3 | Stout - Salted Caramel, Rollo, Longship Brewery | Mellowing of flavors of base beer, wood and fruit noted, a very good product, sellable. |
| Apple** | 1:3 | Ragnabock, Dopplebock Longship Brewery | Mellowing of flavors of base beer, a very good product, sellable, fantastic. |
| Apple** | 1:3 | American Strong Ale, Abomination, Longship | Mellowing of flavors of base beer, a very good product, sellable, fantastic. |
| Apple** | 1:7 | English Mild, 793 Longship Brewery | Mellowing of flavors of base beer, strong wood and fruit flavors noted. |
| Apple** | 1:3 | American Stout, Beast Mode, Protector Brewery San Diego, CA | Fruit and wood flavors come through well, brewers surprised at the amount and quality of flavors. |
| Apple** | 1:3 | Anchor Down Amber Ale 32 North Brewery, SD, CA | Fruit and wood flavors came through well and product mellowed relative to base beer. |
| Cherry*** | 1:3 | Wookie Roar Amber Ale Duck Foot Brewery, SD, CA | Good fruit and wood flavors, but a little weak in flavors. |
| Cherry*** | 1:3 | Ragnabock, Dopplebock Longship Brewery | Very good fruit and wood flavors, clarified, consistent with prior batches. |
| Jim Beam*** | 1:3 | Ragnabock, Dopplebock Longship Brewery | Very nice wood finish, complexity at the end of the flavor profile, takes a while to settle. |
| Mesquite*** | 1:3 | Ragnabock, Dopplebock Longship Brewery | Mellowed, unique flavors, wood flavors noted, good product. |

*1:3 means one part extract into 3 parts beer, for a total of 4 parts, as an example
The first Apple wood extract was made at High Pressure Setting for 4 hours, which was used for all other woods for later extracts in *, except for Jack Daniel's Barrel Wood Chips, which have residual Bourbon, or being "wet," which was extracted at Low Pressure Setting for 1 hour, in order to strive to better preserve the Bourbon flavors, which may be volatile, heat labile, or a combination thereof, noting that the invention is not limited to any proposed mechanism and is not intended to be so.
*Additional 1 Gal extracts of the following woods were made under conditions set forth herein at . The woods being Apple, Cherry, Mesquite, Hickory, Jim Beam ® Barrel Wood Chips, and Jack Daniel's ® Barrel Wood Chips. Not all data is shown.

NOTE: The 1 Gal extract was stored under refrigeration and sealed in plastic water bottles (recycle #2 symbol noted) and was used over time, and was not topped off when samples were removed. The flavor profile did not diminish over about 2 months' time and there was no indication of contamination or increase or decrease in haziness, change of color, change in odor, or other visual or other sensory perceptions NOTE: The extracts can act as a "clarifier" at times in apparently aiding in settling out of suspended solids such as haze of particulates in beer, such as but not limited to by action of flocculation, precipitation, or other such mechanism, the present invention not being limited to any proposed or actual mechanism of action. This is not noted in most water based extracts where the haze when present does not seem to settle readily. It also may be that the extracts are reacting with the beer rather than just adding flavors, though the inventors are not bound by any proposed mechanism of action. It was noted that over time the product changed flavors, as the beer settled and possibly reacted with the components of the extract. It has been proposed that beer, wine, spirits, and such age in barrels by extracting flavors from the wood, but also the reaction of the bulk solution with the extracted materials.

Example 34: Large Volume Extracts of Wood in Pressure Cooker, Taste Tests of Extracts in Food and Non-Alcoholic Drink This non limiting example establishes that large volumes of extracts can be made and used to dose food and non-alcoholic drink.

Materials and Methods and Procedures: Generally as per Example 31. Extraction of 160 gm wood in 1 gallon of purified water, run through an Instant Pot cycle at Low or High Pressure, from between about 1 hour and about 4 hours.

Food: Miso soup was made using water that was dosed 1:3 with the Apple wood extract of Example 33. As compared to soup made without the extract, the treated soup had mellower flavors and wood flavors were noted, though somewhat subtle.

Non-Alcoholic Drink: Tea (hot, herb tea, Bigelow Ginger and Peach Herbal Tea) was made with water dosed 1:4 with the Apple wood extract of Example 33. As compared to tea made without the extract, the treated tea had noticeable wood and fruit flavors.

Example 35: Extracts of Wood in an Autoclave

This non limiting example establishes that large volumes of extracts can be made using an autoclave.

The temperature and pressure ranges of an autoclave, such as but not limited to a steam autoclave, can overlap in whole or in part those of a pressure cooker, such as but not limited to an Instant Pot. In that way, an autoclave can be used as a pressure source in the present invention. An autoclave would have an advantage of larger volumes to be processed at a time as compared to Instant Pots or Ball Jars and such, and provide additional benefits as well. The autoclave is to be operated as intended, taking care when appropriate to have containers including a liquid to be vented while being autoclaved, and then sealed when cooled, other appropriate methods, procedures, and apparatus, which are well known in the appropriate fields of study and commercial endeavor that utilize autoclaves, such as medicine and biological research. As such, a wide variety of autoclaves are commercially available. In this aspect of the present invention, the autoclave provides an additional benefit of sterilizing the reaction mixture. Also, the size of autoclaves can be quite variable, from small table top models for small medical offices, to more industrial sized for research, medical, and commercial purposes, which provides a variety of platforms for use in the present invention. Furthermore, autoclaves when used can be adjusted as to time, temperature, and pressure, along with other potential variables, which provides a certain amount of flexibility.

All publications, including patent documents and scientific articles, referred to in this application and the bibliography and attachments are incorporated by reference in their entirety for all purposes to the same extent as if each individual publication were individually incorporated by reference.

All headings and titles are for the convenience of the reader and should not be used to limit the meaning of the text that follows the heading, unless so specified.

What is claimed is:

1. A method of making a flavored beer product, comprising:
   a) providing at least one sample of wood;
      wherein said at least one sample of wood comprises fruit tree wood, nut tree wood, BBQ wood, oak wood, or a combination thereof;
      further wherein said at least one sample of wood has not been previously extracted with and aqueous solution that includes water, ethanol, or a combination thereof;
   b) providing at least one aqueous solvent;
      wherein said at least one aqueous solvent does not include ethanol;
   c) providing at least one sealed container;
   d) providing at least one heat source;
   e) providing at least one pressure source;
   f) contacting said at least one sample of wood with said at least one aqueous solvent in said at least one sealed container to provide at least one reaction mixture comprising at least one bulk aqueous solvent;
      wherein said at least one reaction mixture does not include ethanol;
      wherein said at least one bulk aqueous solvent does not include ethanol;
   g) exposing said at least one container with said at least one reaction mixture to at least one of:
      1) heat from said at least one heat source;
      2) pressure from said at least one pressure source;
   h) reacting said at least one reaction mixture under a regime of conditions comprising at least two of:
      1) temperature,
      2) pressure, and
      3) time;
   to provide at least one flavored extract of wood that does not include ethanol; and
   i) combining at least one base beer product with said at least one flavored extract of wood to provide at least one flavored beer product.

2. The method of claim 1,
   wherein said at least one sample of wood comprises untreated wood, treated wood, charred wood, bulk wood, chipped wood, sawdust, or a combination thereof.

3. The method of claim 1,
   wherein said at least one sample of wood comprises cherry wood, mesquite wood, apple wood, hickory wood, cedar wood, pine wood, avocado wood, or a combination thereof.

4. The method of claim 1,
   wherein said at least one sample of wood does not comprise oak wood.

5. The method of claim 1,
   wherein said at least one aqueous solvent is water.

6. The method of claim 1,
   wherein said at least one aqueous solvent is filtered water, purified water, tap water, or a combination thereof.

7. The method of claim 1,
   wherein said at least one sealed container is substantially airtight, airtight, or a combination thereof, when in operation.

8. The method of claim 1,
   wherein said at least one sealed container comprises a pressure cooker.

9. The method of claim 1,
   wherein said at least one heat source is a light source, a hot water source, a steam source, an electric source, a gas source, or a combination thereof.

10. The method of claim 1,
    wherein said at least one pressure source is a pressure cooker, an autoclave, a sealed container, said at least one sealed container, air pressure, water pressure, steam pressure, heat generated pressure, or a combination thereof.

11. The method of claim 1,
    wherein said temperature is between about 185 F and about 300 F.

12. The method of claim 1,
    wherein said temperature within said sealed container is between about 229 F and about 244 F.

13. The method of claim 1,
    wherein said pressure is between about 0.5 atmospheres and about 10 atmospheres.

14. The method of claim 1,
wherein said pressure within said sealed container is between about 5.8 psi and about 11.6 psi.

15. The method of claim 1,
wherein said reaction is run at a time between about 1 hour and about 6 days.

16. The method of claim 1,
wherein said base beer product is at least one unfinished beer, partially fermented beer, completely fermented beer, beer with yeast, beer without yeast, finished beer, or a combination thereof.

17. The method of claim 1,
wherein said beer product is aged after said at least one base beer product is combined with said at least one flavored extract of wood.

18. The method of claim 1,
wherein said at least one flavored extract of wood is concentrated.

19. A method of making a flavored extract of wood, comprising:
a) providing at least one sample of wood;
   wherein said at least one sample of wood comprises fruit tree wood, nut tree wood, BBQ wood, oak wood, or a combination thereof;
   further wherein said at least one sample of wood has not been previously extracted with and aqueous solution that includes water, ethanol, or a combination thereof;
b) providing at least one aqueous solvent;
   wherein said at least one aqueous solvent does not include ethanol;
c) providing at least one sealed container;
d) providing at least one heat source;
e) providing at least one pressure source;
f) contacting said at least one sample of wood with said at least one aqueous solvent in said at least one sealed container to provide at least one reaction mixture comprising at least one bulk aqueous solvent;
   wherein said at least one reaction mixture does not include ethanol;
   further wherein said at least one bulk aqueous solvent does not include ethanol;
g) exposing said at least one container with said at least one reaction mixture to at least one of:
   1) heat from said at least one heat source;
   2) pressure from said at least one pressure source;
h) reacting said at least one reaction mixture under a regime of conditions comprising at least two of:
   1) temperature,
   2) pressure, and
   3) time;
to provide at least one flavored extract of wood that does not include ethanol.

20. The method of claim 19,
wherein said at least one sample of wood comprises untreated wood, treated wood, charred wood, bulk wood, chipped wood, sawdust, or a combination thereof.

21. The method of claim 19,
wherein said at least one sample of wood comprises cherry wood, mesquite wood, apple wood, hickory wood, cedar wood, pine wood, avocado wood, or a combination thereof.

22. The method of claim 19,
wherein said at least one sample of wood does not comprise oak wood.

23. The method of claim 19,
wherein said at least one aqueous solvent is water.

24. The method of claim 19,
wherein said at least one aqueous solvent is filtered water, purified water, tap water, or a combination thereof.

25. The method of claim 19,
wherein said at least one sealed container is substantially airtight, airtight, or a combination thereof, when in operation.

26. The method of claim 19,
wherein said at least one sealed container comprises a pressure cooker.

27. The method of claim 19,
wherein said at least one heat source is a light source, a hot water source, a steam source, an electric source, a gas source, or a combination thereof.

28. The method of claim 19,
wherein said at least one pressure source is a pressure cooker, an autoclave, a sealed container, said at least one sealed container, air pressure, water pressure, steam pressure, heat generated pressure, or a combination thereof.

29. The method of claim 19,
wherein said temperature is between about 185 F and about 300 F.

30. The method of claim 19,
wherein said temperature within said sealed container is between about 229 F and about 244 F.

31. The method of claim 19,
wherein said pressure is between about 0.5 atmospheres and about 10 atmospheres.

32. The method of claim 19,
wherein said pressure within said sealed container is between about 5.8 psi and about 11.6 psi.

33. The method of claim 19,
wherein said reaction is run at a time between about 1 hour and about 6 days.

34. The method of claim 19,
wherein said at least one flavored extract of wood is concentrated.

35. A method of making a flavored beer product, comprising:
a) providing at least one sample of wood;
   wherein said at least one sample of wood has not been previously extracted with and aqueous solution that includes water, ethanol, or a combination thereof;
b) providing at least one aqueous solvent;
   wherein said at least one aqueous solvent does not include ethanol;
c) providing at least one sealed container;
d) providing at least one heat source;
e) providing at least one pressure source;
f) contacting said at least one sample of wood with said at least one aqueous solvent in said at least one sealed container to provide at least one reaction mixture comprising at least one bulk aqueous solvent;
   wherein said at least one reaction mixture does not include ethanol;
   wherein said at least one bulk aqueous solvent does not include ethanol;
g) exposing said at least one container with said at least one reaction mixture to at least one of:
   1) heat from said at least one heat source;
   2) pressure from said at least one pressure source;
h) reacting said at least one reaction mixture under a regime of conditions comprising at least two of:

1) temperature,
2) pressure, and
3) time;
to provide at least one flavored extract of wood that does not include ethanol; and
i) combining at least one base beer product with said at least one flavored extract of wood to provide at least one flavored beer product.

36. The method of claim 35,
wherein said at least one sample of wood comprises fruit tree wood, nut tree wood, BBQ wood, oak wood, cherry wood, apple wood, hickory wood, or a combination thereof.

37. The method of claim 36,
wherein said at least one sample of wood comprises untreated wood, treated wood, charred wood, bulk wood, chipped wood, sawdust, or a combination thereof.

38. The method of claim 37,
wherein said at least one aqueous solvent is water.

39. The method of claim 37,
wherein said at least one aqueous solvent is filtered water, purified water, tap water, or a combination thereof.

40. The method of claim 37,
wherein said at least one sealed container is substantially airtight, airtight, or a combination thereof, when in operation.

41. The method of claim 37,
wherein said at least one sealed container comprises a pressure cooker.

42. The method of claim 37,
wherein said at least one heat source is a light source, a hot water source, a steam source, an electric source, a gas source, or a combination thereof.

43. The method of claim 37,
wherein said at least one pressure source is a pressure cooker, an autoclave, a sealed container, said at least one sealed container, air pressure, water pressure, steam pressure, heat generated pressure, or a combination thereof.

44. The method of claim 37,
wherein said temperature is between about 185 F and about 300 F.

45. The method of claim 37,
wherein said temperature within said sealed container is between about 229 F and about 244 F.

46. The method of claim 37,
wherein said pressure is between about 0.5 atmospheres and about 10 atmospheres.

47. The method of claim 37,
wherein said pressure within said sealed container is between about 5.8 psi and about 11.6 psi.

48. The method of claim 37,
wherein said reaction is run at a time between about 1 hour and about 6 days.

49. The method of claim 37,
wherein said base beer product is at least one unfinished beer, partially fermented beer, completely fermented beer, beer with yeast, beer without yeast, finished beer, or a combination thereof.

50. The method of claim 37,
wherein said beer product is aged after said at least one base beer product is combined with said at least one flavored extract of wood.

51. The method of claim 37,
wherein said at least one flavored extract of wood is concentrated.

52. A method of making a flavored extract of wood, comprising:
a) providing at least one sample of wood;
wherein said at least one sample of wood has not been previously extracted with and aqueous solution that includes water, ethanol, or a combination thereof;
b) providing at least one aqueous solvent;
wherein said at least one aqueous solvent does not include ethanol;
c) providing at least one sealed container;
d) providing at least one heat source;
e) providing at least one pressure source;
f) contacting said at least one sample of wood with said at least one aqueous solvent in said at least one sealed container to provide at least one reaction mixture comprising at least one bulk aqueous solvent;
wherein said at least one reaction mixture does not include ethanol;
further wherein said at least one bulk aqueous solvent does not include ethanol;
g) exposing said at least one container with said at least one reaction mixture to at least one of:
1) heat from said at least one heat source;
2) pressure from said at least one pressure source;
h) reacting said at least one reaction mixture under a regime of conditions comprising at least two of:
1) temperature,
2) pressure, and
3) time;
to provide at least one flavored extract of wood that does not include ethanol.

53. The method of claim 52,
wherein said at least one sample of wood comprises fruit tree wood, nut tree wood, BBQ wood, oak wood, cherry wood, apple wood, hickory wood, or a combination thereof.

54. The method of claim 53,
wherein said at least one sample of wood comprises untreated wood, treated wood, charred wood, bulk wood, chipped wood, sawdust, or a combination thereof.

55. The method of claim 54,
wherein said at least one aqueous solvent is water.

56. The method of claim 54,
wherein said at least one aqueous solvent is filtered water, purified water, tap water, or a combination thereof.

57. The method of claim 54,
wherein said at least one sealed container is substantially airtight, airtight, or a combination thereof, when in operation.

58. The method of claim 54,
wherein said at least one sealed container comprises a pressure cooker.

59. The method of claim 54,
wherein said at least one heat source is a light source, a hot water source, a steam source, an electric source, a gas source, or a combination thereof.

60. The method of claim 54,
wherein said at least one pressure source is a pressure cooker, an autoclave, a sealed container, said at least one sealed container, air pressure, water pressure, steam pressure, heat generated pressure, or a combination thereof.

61. The method of claim 54,
wherein said temperature is between about 185 F and about 300 F.

62. The method of claim 54,
wherein said temperature within said sealed container is between about 229 F and about 244 F.

63. The method of claim 54,
wherein said pressure is between about 0.5 atmospheres and about 10 atmospheres.

64. The method of claim 54,
wherein said pressure within said sealed container is between about 5.8 psi and about 11.6 psi.

65. The method of claim 54,
wherein said reaction is run at a time between about 1 hour and about 6 days.

66. The method of claim 54,
wherein said at least one flavored extract of wood is concentrated.

* * * * *